(12) United States Patent
Backus et al.

(10) Patent No.: US 10,912,319 B2
(45) Date of Patent: Feb. 9, 2021

(54) METHOD AND APPARATUS FOR FOOD DEHYDRATION

(71) Applicants: Alan Backus, Los Angeles, CA (US); Iulius Marici, Henderson, NV (US)

(72) Inventors: Alan Backus, Los Angeles, CA (US); Iulius Marici, Henderson, NV (US)

(73) Assignees: Alan Backus, Los Angeles, CA (US); Lulius Marici, Henderson, NV (US)

( * ) Notice: Subject to any disclaimer, the term of this patent is extended or adjusted under 35 U.S.C. 154(b) by 0 days.

(21) Appl. No.: 16/871,585

(22) Filed: May 11, 2020

(65) Prior Publication Data

US 2020/0268024 A1   Aug. 27, 2020

Related U.S. Application Data

(63) Continuation of application No. 15/258,453, filed on Sep. 7, 2016.

(51) Int. Cl.
*A23L 3/40* (2006.01)
*F26B 9/00* (2006.01)
(Continued)

(52) U.S. Cl.
CPC ..................... *A23L 3/40* (2013.01);
*B26B 3/03* (2013.01); *B26B 29/063* (2013.01);
*F26B 3/04* (2013.01);
(Continued)

(58) Field of Classification Search
CPC . A23L 3/40; B26B 3/03; B26B 29/063; F26B 9/066; F26B 9/006; F26B 25/18;
(Continued)

(56) References Cited

U.S. PATENT DOCUMENTS 1,108,412 A  *  8/1914  Vold ..................... A47B 61/00
                                                         312/213
1,410,719 A      3/1922  Rea
(Continued)

FOREIGN PATENT DOCUMENTS

CA       2170903       3/1995
CN     204120151       1/2015
(Continued)

*Primary Examiner* — Jorge A Pereiro
*Assistant Examiner* — Logan P Jones
(74) *Attorney, Agent, or Firm* — Ulmer & Berne LLP

(57) ABSTRACT

Embodiments herein include devices adaptable to dehydrate articles, including foods. Embodiments are shown which can be compacted for reduced storage, and/or shipping requirements and/or for other purposes. Embodiments include simple, inexpensive means for controlling dehydrating conditions, including airflow. Various article holding devices, including devices to hold foods being dehydrated, are also shown. Such devices include vertical, diagonal, and horizontal panels to secure articles. Embodiments shown have variations which include the use of non-motorized convection airflow, as well as devices which incorporate motor driven air movement means. Embodiments are shown which may be used for preparing articles, including foods, for dehydration, including slicing such articles.

12 Claims, 55 Drawing Sheets

(51) Int. Cl.
  *F26B 25/06* (2006.01)
  *F26B 25/08* (2006.01)
  *F26B 25/18* (2006.01)
  *F26B 3/04* (2006.01)
  *F26B 9/06* (2006.01)
  *F26B 23/06* (2006.01)
  *B26B 3/03* (2006.01)
  *B26B 29/06* (2006.01)

(52) U.S. Cl.
  CPC .............. *F26B 9/003* (2013.01); *F26B 9/006* (2013.01); *F26B 9/066* (2013.01); *F26B 23/06* (2013.01); *F26B 25/066* (2013.01); *F26B 25/08* (2013.01); *F26B 25/18* (2013.01); *A23V 2002/00* (2013.01)

(58) Field of Classification Search
  CPC .......... F26B 25/066; F26B 3/04; F26B 25/08; F26B 9/003; F26B 23/06; A23V 2002/00
  See application file for complete search history.

(56) References Cited

U.S. PATENT DOCUMENTS

| | | |
|---|---|---|
| 1,552,210 A | 9/1925 | Bussler |
| 1,718,845 A | 6/1929 | Younger |
| RE20,745 E * | 5/1938 | Hurxthal ............... F26B 9/066 69/21 |
| 2,242,918 A | 5/1941 | Muth et al. |
| 2,288,285 A | 6/1942 | Knight |
| 2,360,930 A | 10/1944 | Brewer |
| 2,371,095 A | 3/1945 | Woodward |
| 2,396,455 A | 3/1946 | Booth |
| 2,412,407 A | 12/1946 | Kilbury |
| 2,414,642 A | 1/1947 | Gary |
| 2,941,463 A | 6/1960 | Di Cuia |
| 3,264,753 A | 8/1966 | Budzien |
| 3,414,982 A | 12/1968 | Oas |
| 3,705,461 A | 12/1972 | Parkes |
| 3,943,842 A | 3/1976 | Bills et al. |
| 4,036,562 A | 7/1977 | Barnes |
| 4,143,592 A | 3/1979 | Kuest et al. |
| 4,189,850 A | 2/1980 | Dieterich et al. |
| 4,236,063 A | 11/1980 | Glucksman |
| 4,245,398 A | 1/1981 | Poisson |
| 4,329,789 A | 5/1982 | Erickson |
| 4,380,127 A | 4/1983 | Roberts |
| 4,385,911 A | 5/1983 | Popeil et al. |
| 4,473,922 A | 10/1984 | Weihe |
| 4,501,074 A | 2/1985 | O'Hare |
| 4,534,188 A | 8/1985 | Cabus et al. |
| 4,535,931 A | 8/1985 | Bartok et al. |
| 4,807,862 A | 2/1989 | Popeil et al. |
| 4,948,106 A | 8/1990 | Popeil et al. |
| 5,017,143 A | 5/1991 | Backus et al. |
| 5,030,027 A | 7/1991 | Bachrach et al. |
| 5,133,788 A | 7/1992 | Backus |
| 5,135,122 A | 8/1992 | Gross et al. |
| 5,166,886 A | 11/1992 | Molnar et al. |
| 5,195,145 A | 3/1993 | Backus et al. |
| 5,197,736 A | 3/1993 | Backus et al. |
| 5,221,962 A | 6/1993 | Backus et al. |
| 5,233,766 A | 8/1993 | Frederiksen et al. |
| 5,261,168 A | 11/1993 | Li |
| 5,282,319 A | 2/1994 | Casquilho et al. |
| 5,324,185 A | 6/1994 | Backus et al. |
| 5,421,713 A | 6/1995 | Backus et al. |
| 5,437,108 A | 8/1995 | Alseth |
| 5,515,990 A | 5/1996 | Popeil et al. |
| 5,720,991 A | 2/1998 | Gildersleeve et al. |
| 5,731,012 A | 3/1998 | Backus et al. |
| 5,802,733 A | 9/1998 | Hougham |
| 5,826,498 A | 10/1998 | Su |
| 5,852,882 A | 12/1998 | Kendall et al. |
| RE36,147 E | 3/1999 | Backus et al. |
| 5,878,508 A | 3/1999 | Knoll et al. |
| 5,882,116 A | 3/1999 | Backus |
| 5,960,560 A | 10/1999 | Stoll |
| 5,974,957 A | 11/1999 | Ysen |
| 6,041,696 A | 3/2000 | Su |
| 6,125,550 A | 10/2000 | Kendall et al. |
| 6,142,064 A | 11/2000 | Backus et al. |
| 6,170,390 B1 | 1/2001 | Backus et al. |
| 6,173,645 B1 | 1/2001 | Backus et al. |
| 6,240,838 B1 | 6/2001 | Backus et al. |
| 6,250,214 B1 | 6/2001 | Backus et al. |
| 6,253,665 B1 | 7/2001 | Backus et al. |
| 6,311,411 B1 | 11/2001 | Clark |
| 6,330,855 B2 | 12/2001 | Backus et al. |
| 6,393,972 B1 | 5/2002 | Backus et al. |
| 6,408,742 B1 | 6/2002 | Backus et al. |
| 6,422,136 B1 | 7/2002 | Backus et al. |
| 6,436,380 B1 | 8/2002 | Pond et al. |
| 6,450,087 B2 | 9/2002 | Backus et al. |
| 6,468,573 B1 | 10/2002 | Herrick et al. |
| 6,536,334 B2 | 3/2003 | Backus et al. |
| 6,568,315 B2 | 5/2003 | Backus et al. |
| 6,568,316 B1 | 5/2003 | Backus et al. |
| 6,578,470 B2 | 6/2003 | Backus et al. |
| 6,658,991 B2 | 12/2003 | Backus et al. |
| 6,688,018 B2 | 2/2004 | Soucy |
| 6,742,445 B2 | 6/2004 | Backus et al. |
| 6,743,007 B2 | 6/2004 | Backus et al. |
| 6,782,805 B2 | 8/2004 | Backus et al. |
| 6,782,806 B2 | 8/2004 | Backus et al. |
| 6,814,957 B1 | 11/2004 | Pond et al. |
| 6,837,150 B2 | 1/2005 | Backus et al. |
| 6,840,161 B2 | 1/2005 | Backus et al. |
| 6,874,408 B2 | 4/2005 | Backus et al. |
| 6,965,095 B1 | 11/2005 | Popeil et al. |
| 6,988,445 B1 | 1/2006 | Backus et al. |
| 7,021,203 B2 | 4/2006 | Backus et al. |
| 7,021,204 B2 | 4/2006 | Backus et al. |
| 7,028,415 B2 | 4/2006 | Heinzen et al. |
| 7,065,883 B2 | 6/2006 | Popeil et al. |
| 7,138,609 B2 | 11/2006 | Popeil et al. |
| 7,153,120 B2 | 12/2006 | Backus et al. |
| 7,225,729 B2 | 6/2007 | Backus et al. |
| 7,225,730 B2 | 6/2007 | Backus et al. |
| 7,325,484 B1 | 2/2008 | Backus et al. |
| 7,395,602 B2 | 7/2008 | Backus et al. |
| 7,424,849 B2 | 9/2008 | Backus et al. |
| 7,500,428 B2 | 3/2009 | Backus et al. |
| 7,514,651 B2 | 4/2009 | Popeil et al. |
| 7,626,142 B2 | 12/2009 | Backus et al. |
| 7,681,494 B2 | 3/2010 | Backus et al. |
| 7,739,948 B2 | 6/2010 | Backus et al. |
| 7,878,111 B2 | 2/2011 | Backus et al. |
| 7,998,514 B2 | 8/2011 | Backus et al. |
| 8,017,167 B2 | 9/2011 | Backus et al. |
| 8,151,482 B2 | 4/2012 | Moss et al. |
| 8,186,265 B2 | 5/2012 | Popeil et al. |
| 8,309,151 B2 | 11/2012 | Popeil et al. |
| 8,387,520 B2 | 3/2013 | Backus |
| 8,539,693 B2 | 9/2013 | Perry et al. |
| 8,707,857 B2 | 4/2014 | Popeil et al. |
| 8,745,890 B2 | 6/2014 | Niemann et al. |
| 8,807,022 B2 | 8/2014 | Backus |
| 8,835,810 B2 | 9/2014 | Moon |
| 8,850,965 B2 | 10/2014 | Popeil et al. |
| 8,869,686 B2 | 10/2014 | Backus |
| 2001/0009128 A1 | 2/2001 | Backus et al. |
| 2001/0022140 A1 | 2/2001 | Backus et al. |
| 2001/0032547 A1 | 2/2001 | Backus et al. |
| 2001/0042449 A1 | 6/2001 | Backus et al. |
| 2001/0046337 A1 | 6/2001 | Backus et al. |
| 2001/0006627 A1 | 7/2001 | Pond et al. |
| 2001/0039884 A1 | 11/2001 | Backus et al. |
| 2002/0017201 A1 | 2/2002 | Backus et al. |
| 2002/0023541 A1 | 2/2002 | Sanchez |
| 2002/0023545 A1 | 2/2002 | Backus et al. |
| 2002/0023546 A1 | 2/2002 | Backus et al. |
| 2002/0088350 A1 | 2/2002 | Backus et al. |

(56) References Cited

U.S. PATENT DOCUMENTS

| | | |
|---|---|---|
| 2002/0144607 A1 | 3/2002 | Backus et al. |
| 2002/0108503 A1 | 4/2002 | Backus et al. |
| 2002/0050212 A1 | 5/2002 | Backus et al. |
| 2002/0062742 A1 | 5/2002 | Backus et al. |
| 2002/0069768 A1 | 6/2002 | Backus et al. |
| 2002/0157543 A1 | 6/2002 | Backus et al. |
| 2002/0166458 A1 | 6/2002 | Backus et al. |
| 2002/0108500 A1 | 8/2002 | Backus et al. |
| 2002/0195003 A1 | 12/2002 | Backus et al. |
| 2003/0019368 A1 | 1/2003 | Backus et al. |
| 2003/0126997 A1 | 2/2003 | Backus et al. |
| 2003/0101877 A1 | 6/2003 | Backus et al. |
| 2004/0006876 A1 | 1/2004 | Popeil et al. |
| 2004/0007494 A1 | 1/2004 | Popeil et al. |
| 2004/0144260 A1 | 7/2004 | Backus et al. |
| 2004/0194644 A1 | 10/2004 | Backus et al. |
| 2005/0178275 A1 | 1/2005 | Backus et al. |
| 2005/0056633 A1 | 3/2005 | Backus et al. |
| 2005/0058738 A1 | 3/2005 | Backus et al. |
| 2005/0284306 A1 | 8/2005 | Backus et al. |
| 2006/0144248 A1 | 3/2006 | Backus et al. |
| 2006/0144250 A1 | 3/2006 | Backus et al. |
| 2006/0081594 A1 | 4/2006 | Popeil et al. |
| 2006/0081595 A1 | 4/2006 | Popeil et al. |
| 2007/0028780 A1 | 2/2007 | Popeil et al. |
| 2007/0028781 A1 | 2/2007 | Popeil et al. |
| 2007/0034621 A1 | 2/2007 | Popeil et al. |
| 2007/0145061 A1 | 3/2007 | Backus et al. |
| 2007/0101585 A1 | 5/2007 | Popeil et al. |
| 2007/0256571 A1 | 11/2007 | Popeil et al. |
| 2008/0250940 A1 | 2/2008 | Backus et al. |
| 2008/0075817 A1 | 3/2008 | Backus et al. |
| 2008/0092751 A1 | 4/2008 | Backus et al. |
| 2008/0265594 A1 | 7/2008 | Popeil et al. |
| 2009/0025248 A1 | 1/2009 | Lannon |
| 2009/0173240 A1 | 3/2009 | Backus et al. |
| 2009/0090248 A1 | 4/2009 | Backus et al. |
| 2009/0191322 A1 | 4/2009 | Popeil et al. |
| 2009/0120303 A1 | 5/2009 | Popeil et al. |
| 2010/0071565 A1 | 3/2010 | Backus et al. |
| 2010/0173050 A1 | 3/2010 | Backus et al. |
| 2010/0269712 A1 | 5/2010 | Popeil et al. |
| 2010/0260910 A1 | 6/2010 | Backus et al. |
| 2010/0303973 A1 | 8/2010 | Popeil et al. |
| 2011/0132891 A1 | 2/2011 | Backus et al. |
| 2011/0083565 A1 | 4/2011 | Backus |
| 2011/0083566 A1 | 4/2011 | Backus |
| 2011/0203570 A1 | 8/2011 | Popeil et al. |
| 2012/0167778 A1 | 7/2012 | Popeil et al. |
| 2013/0180415 A1 | 3/2013 | Backus |
| 2013/0326902 A1 | 12/2013 | Barrows |
| 2014/0053424 A1 | 2/2014 | Schreiber et al. |
| 2014/0227411 A1 | 4/2014 | Backus |
| 2015/0101494 A1 | 4/2015 | Saccamanno |
| 2015/0101495 A1 | 4/2015 | Backus |
| 2015/0257431 A1 | 9/2015 | Ha |
| 2016/0324358 A1 | 3/2016 | Backus |
| 2016/0183709 A1 | 6/2016 | Backus |
| 2016/0345610 A1 | 12/2016 | Backus |
| 2017/0074584 A1 | 3/2017 | Backus |
| 2017/0208825 A1 | 7/2017 | Backus |
| 2017/0311757 A1 | 11/2017 | Backus et al. |
| 2018/0000285 A1 | 1/2018 | Backus |
| 2018/0000286 A1 | 1/2018 | Backus |
| 2018/0000287 A1 | 1/2018 | Backus |
| 2018/0049590 A1 | 2/2018 | Backus |
| 2018/0064147 A1 | 3/2018 | Backus |
| 2018/0192825 A1 | 7/2018 | Popeil et al. |
| 2018/0255955 A1 | 9/2018 | Backus |
| 2018/0264241 A1 | 9/2018 | Backus |
| 2019/0093324 A1 | 3/2019 | Backus |
| 2019/0142215 A1 | 5/2019 | Popeil et al. |
| 2019/0142218 A1 | 5/2019 | Popeil et al. |
| 2019/0167027 A1 | 6/2019 | Backus |
| 2019/0281869 A1 | 9/2019 | Backus |
| 2019/0328179 A1 | 10/2019 | Popeil |

FOREIGN PATENT DOCUMENTS

| | | |
|---|---|---|
| CN | 105043073 | 11/2015 |
| WO | WO1995019112 | 7/1995 |
| WO | WO2000052407 | 9/2000 |

* cited by examiner

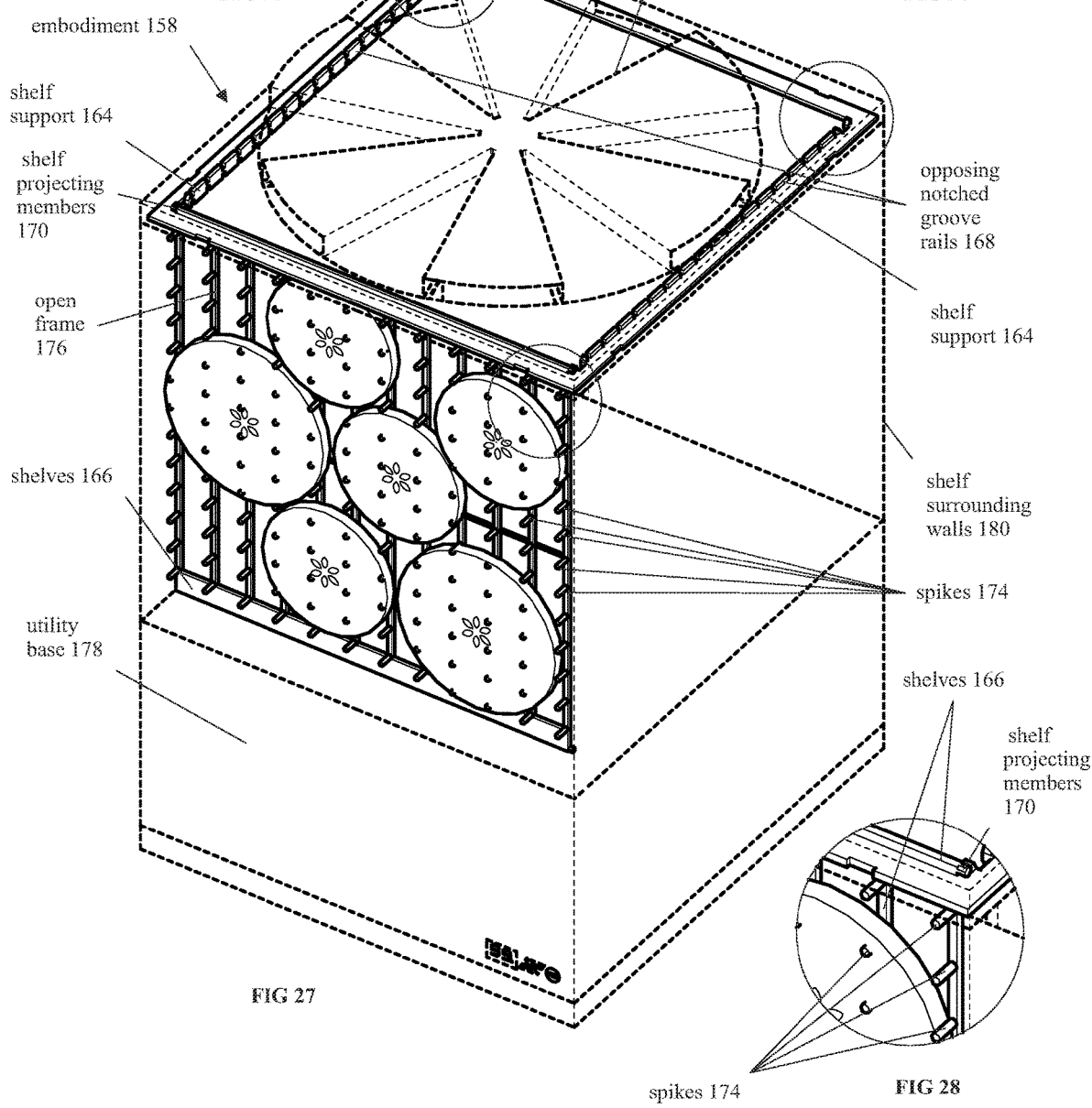

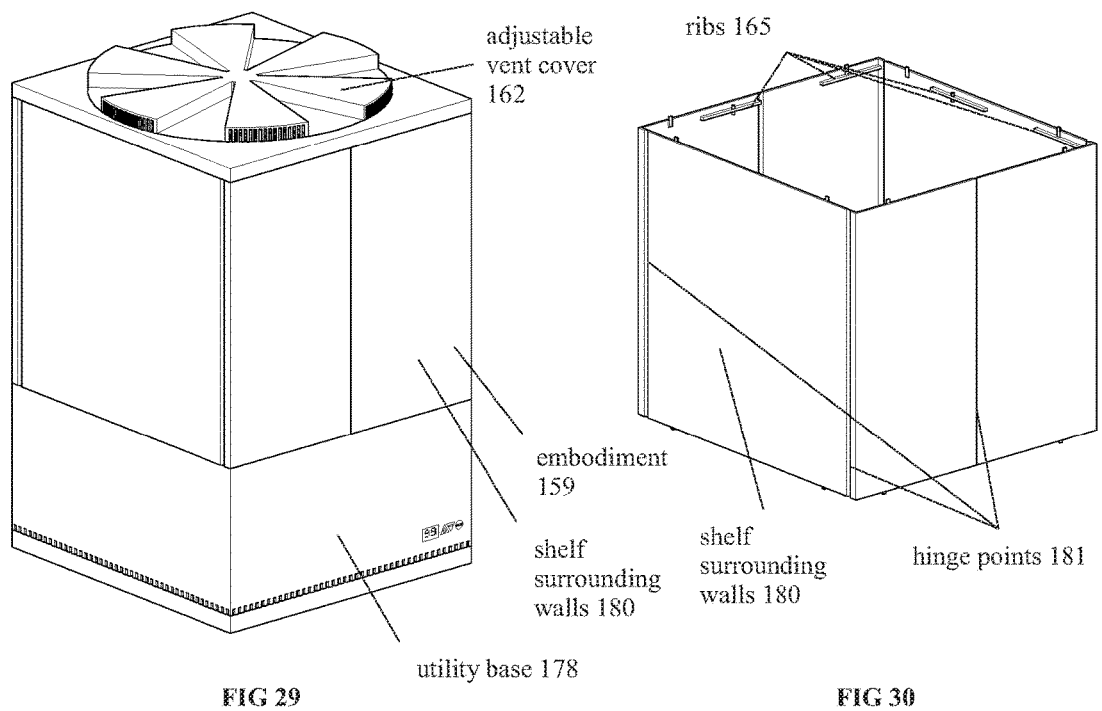
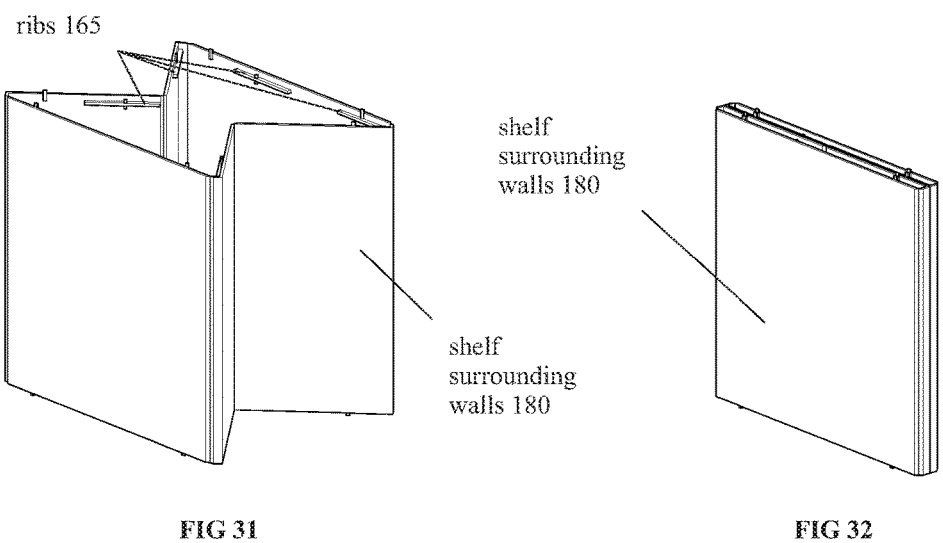
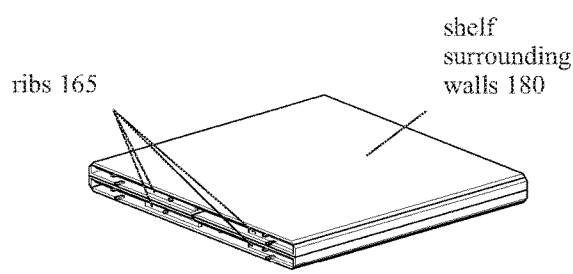

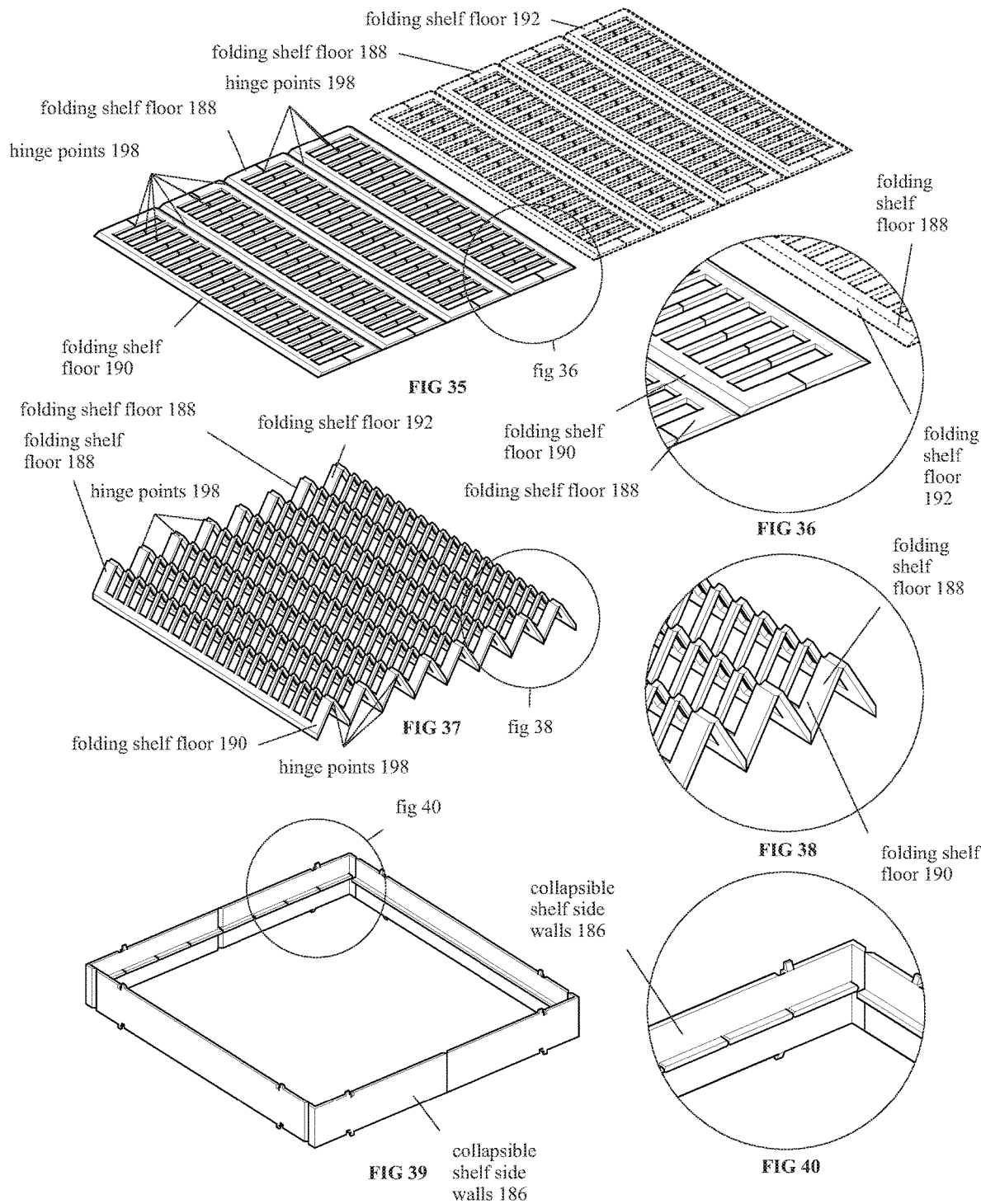

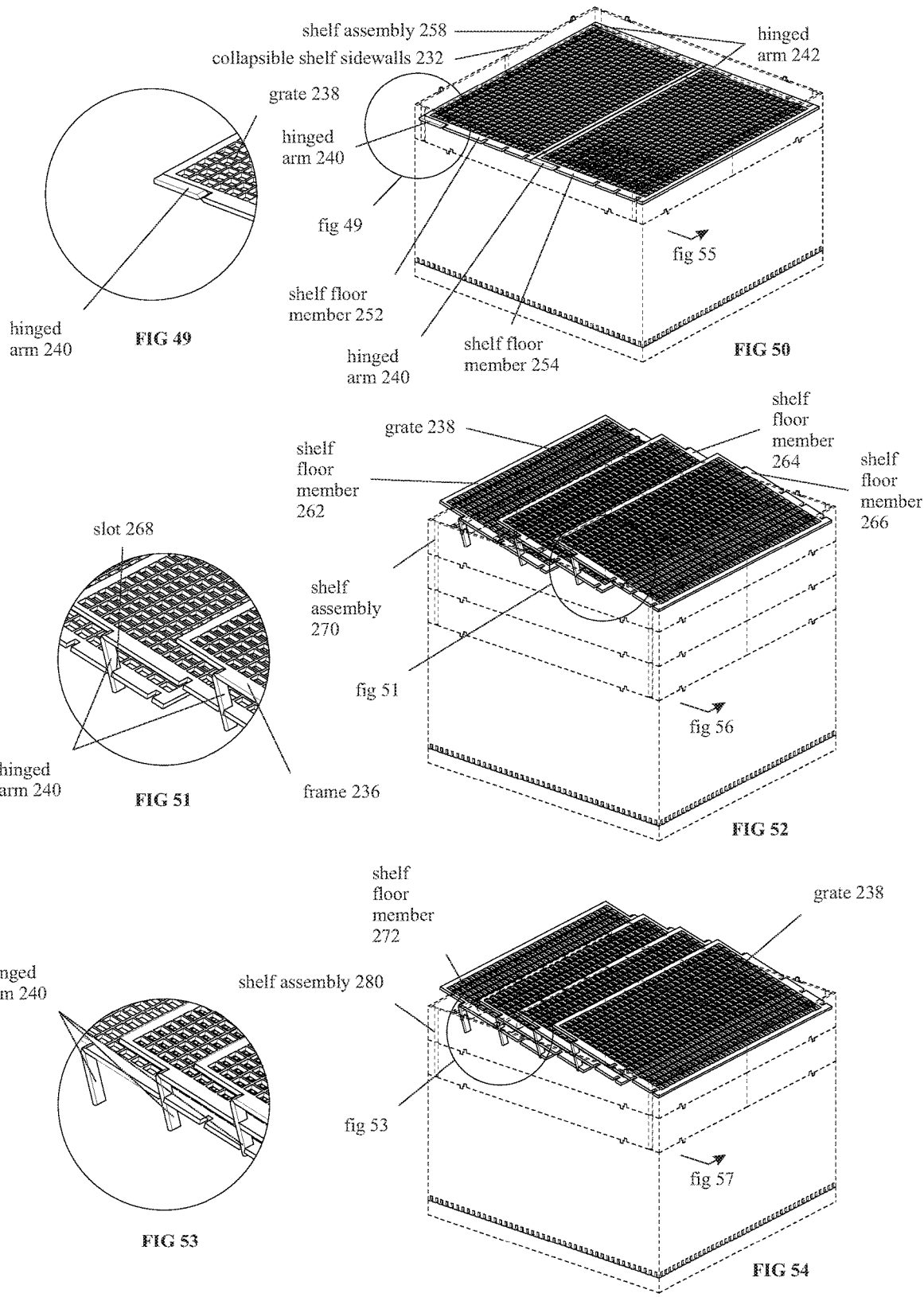

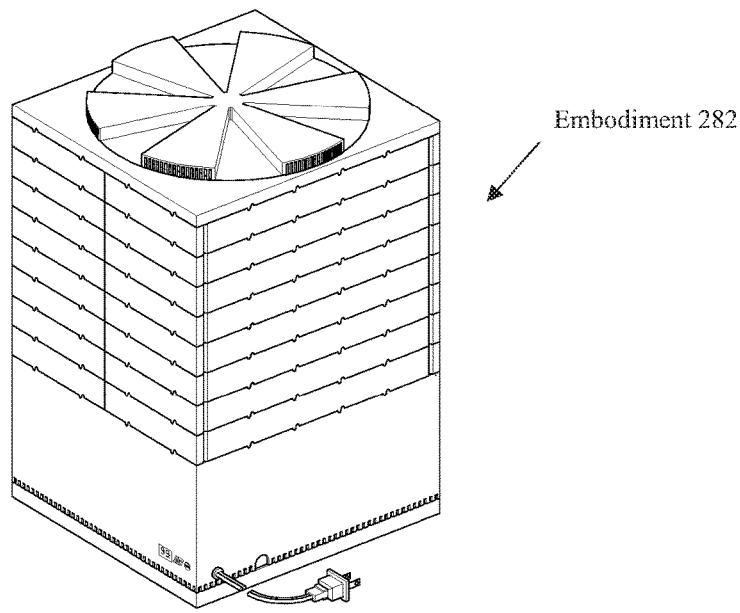
FIG 58
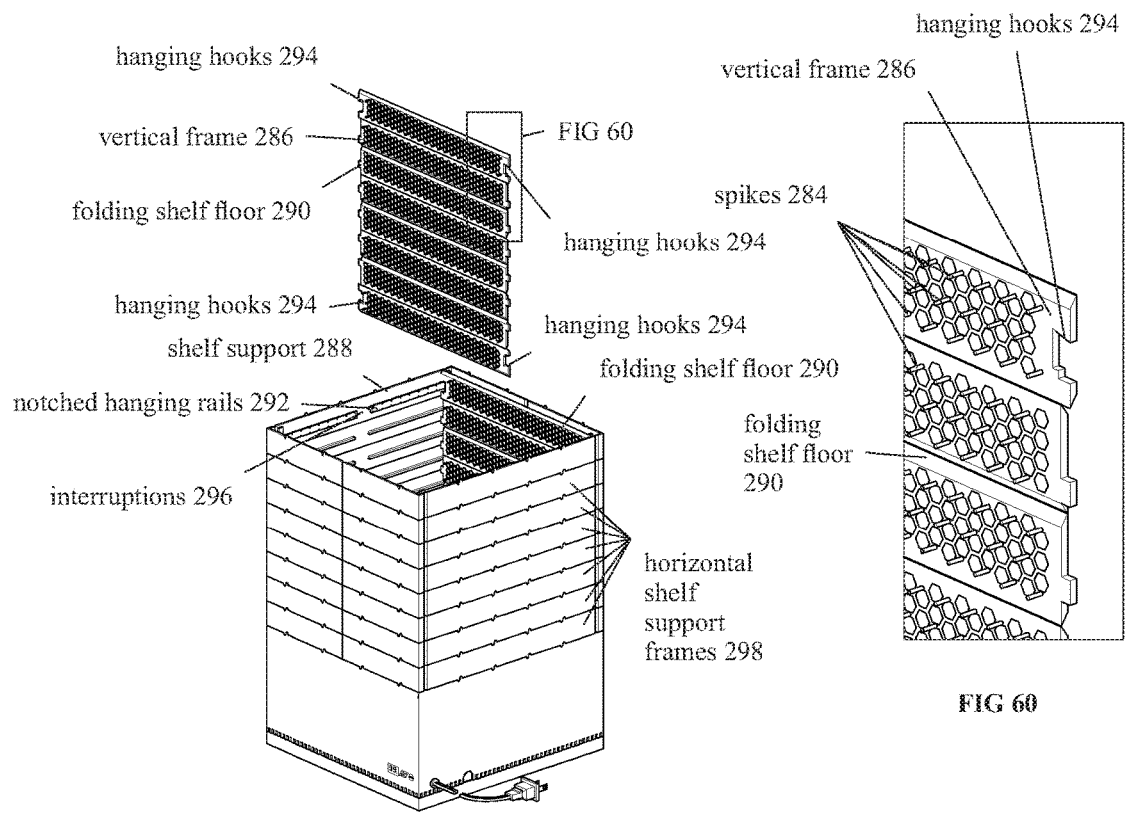
FIG 59
FIG 60

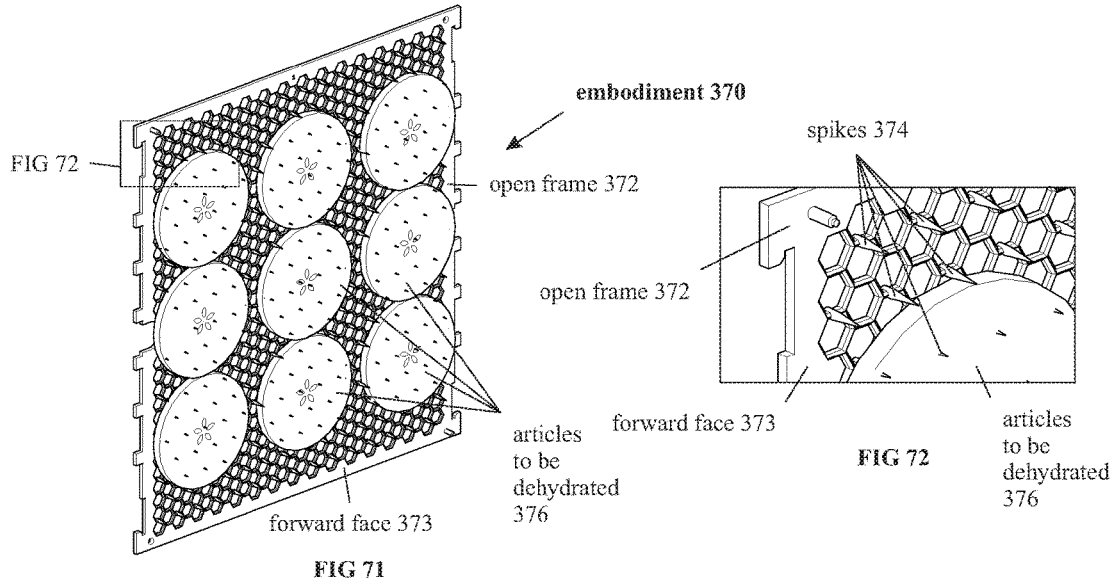
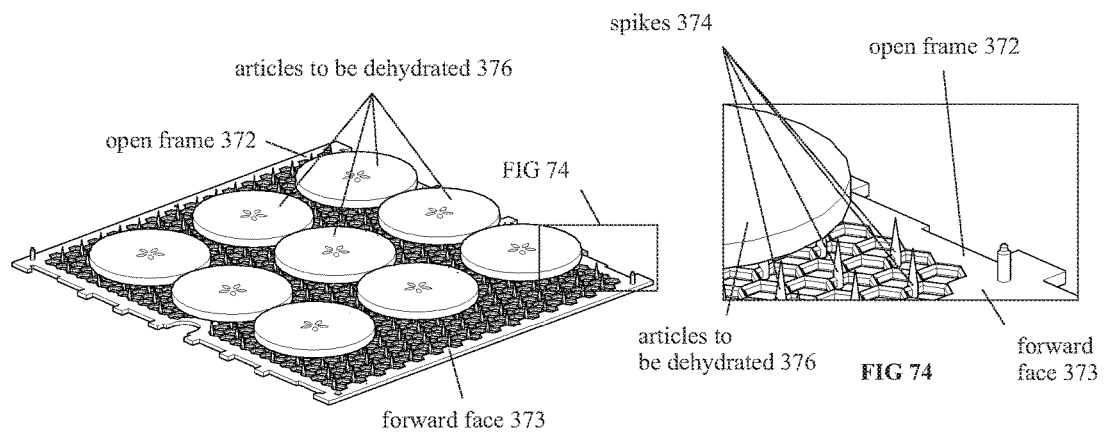
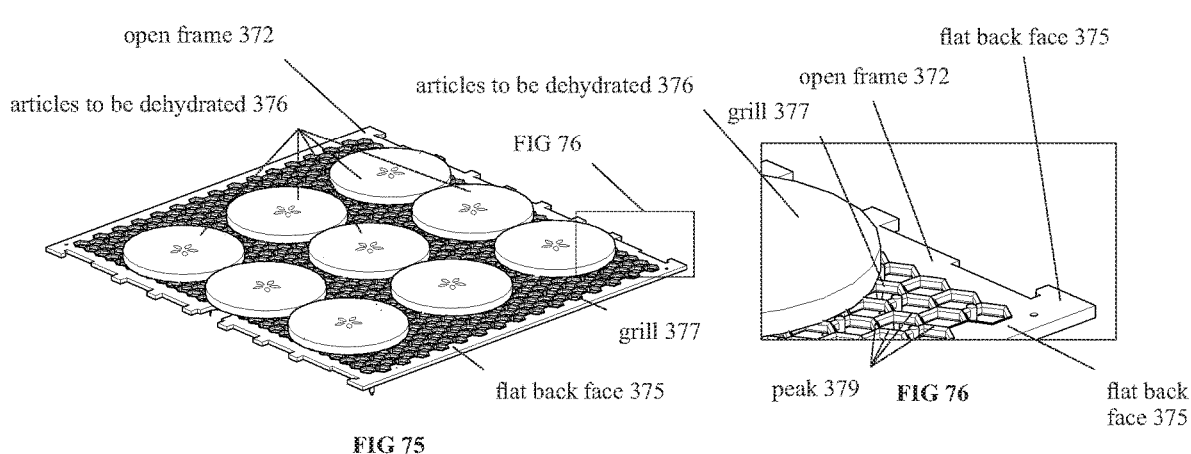

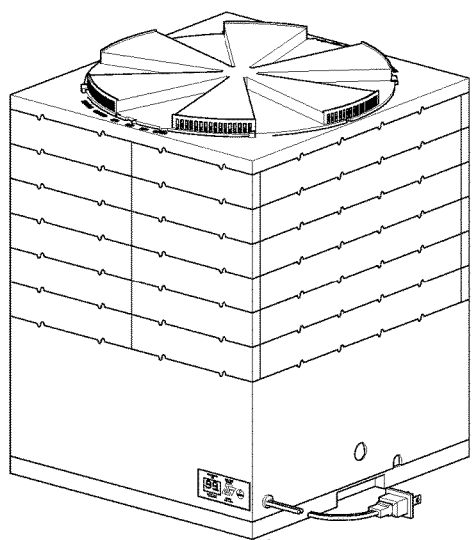
FIG 84
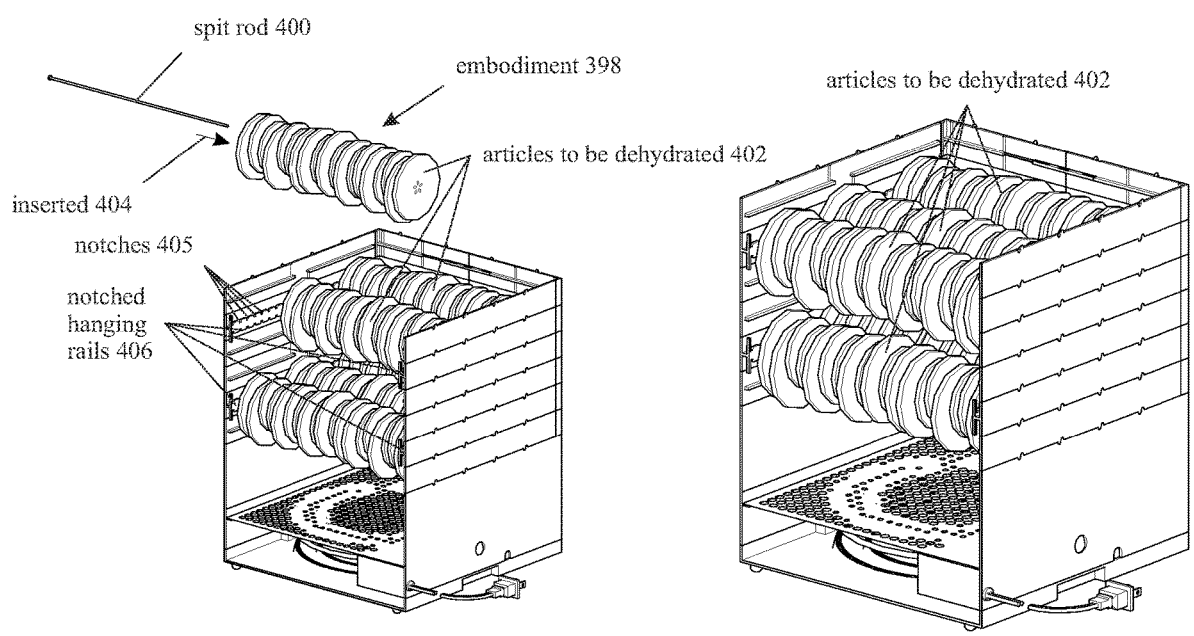
FIG 85
FIG 86

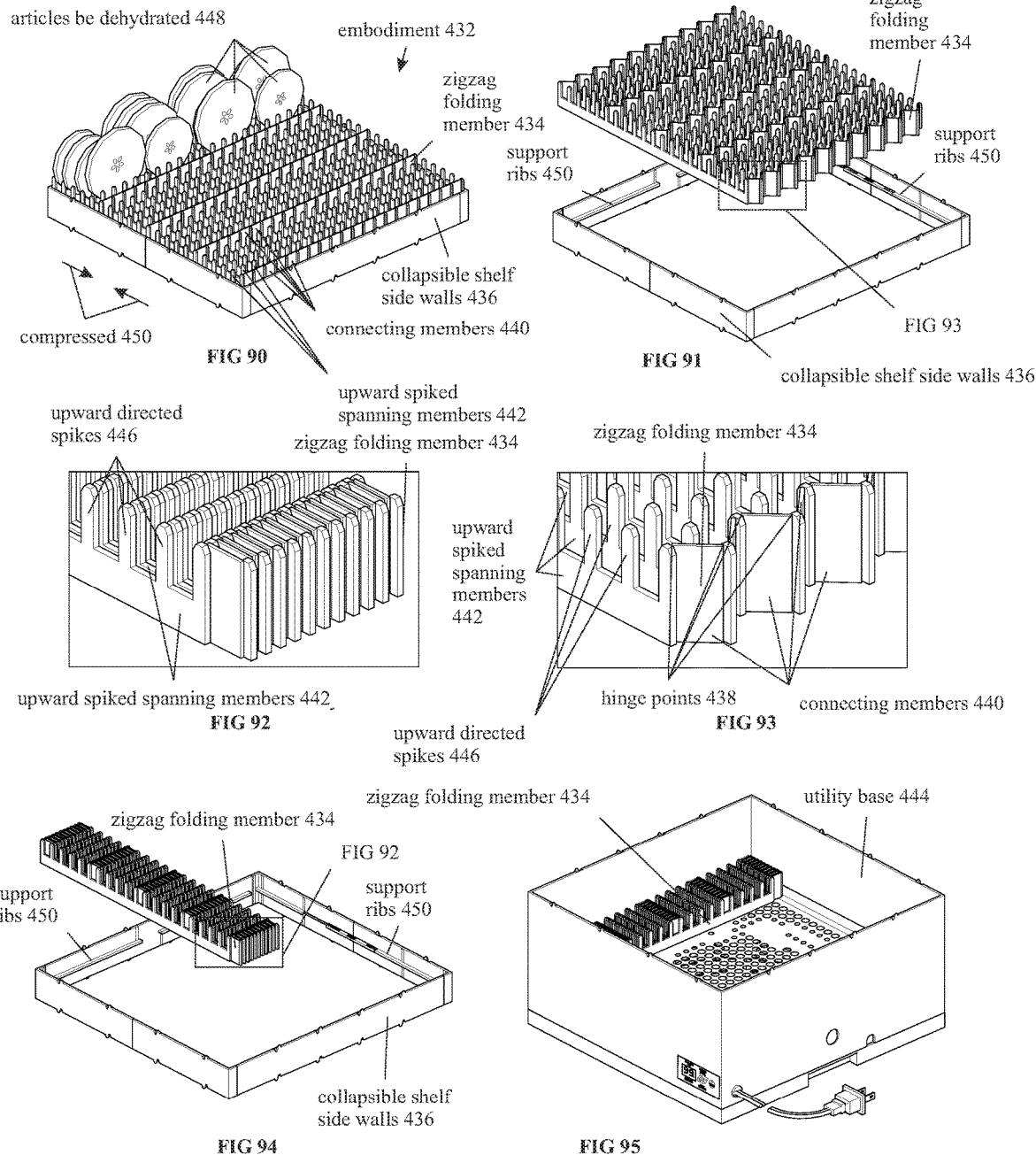

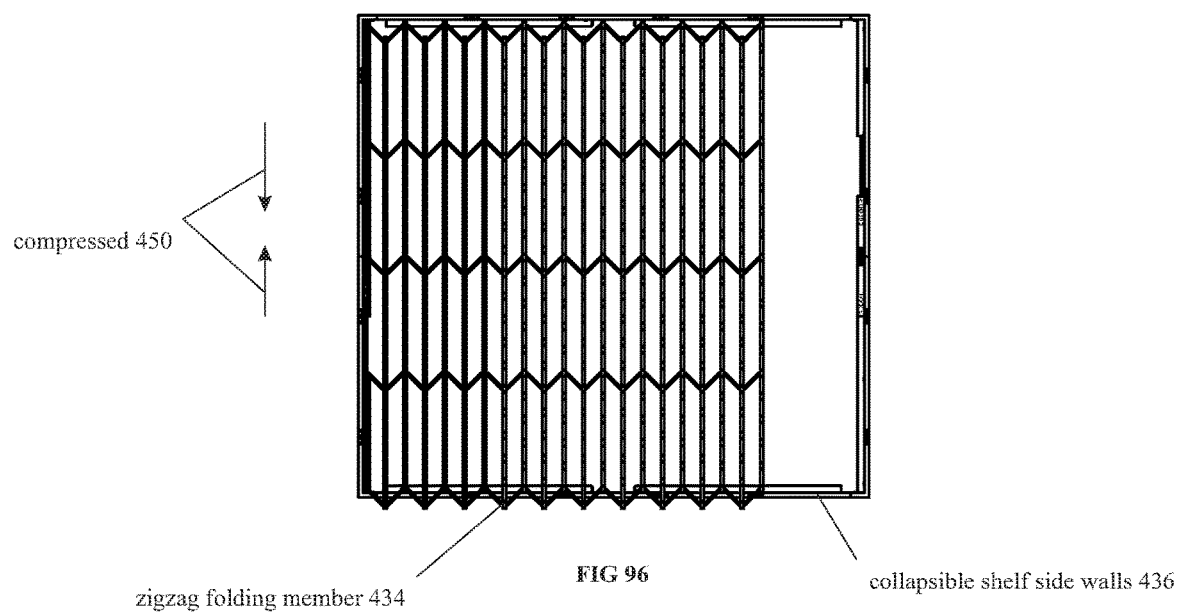
FIG 96
compressed 450
zigzag folding member 434
collapsible shelf side walls 436
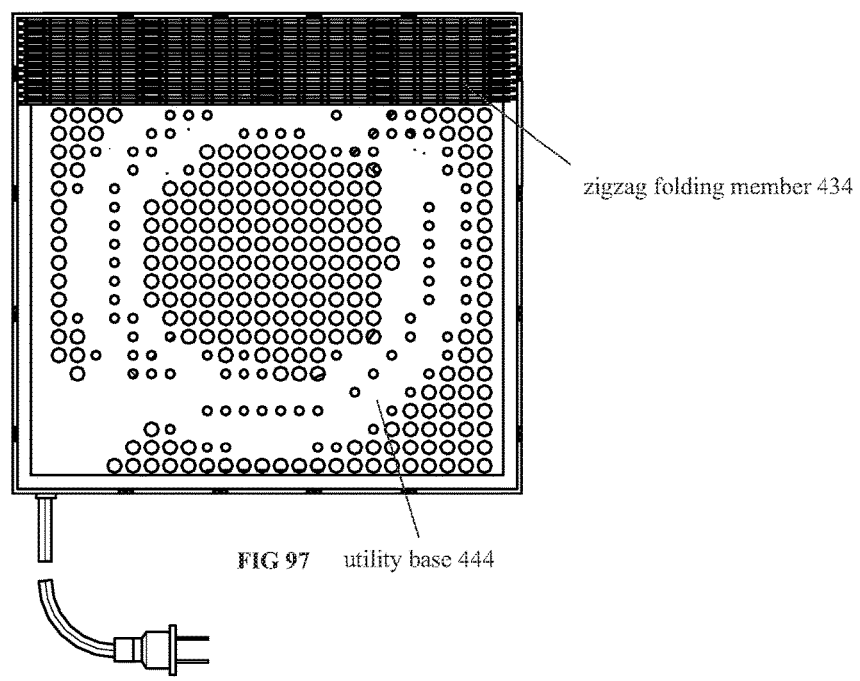
FIG 97  utility base 444
zigzag folding member 434

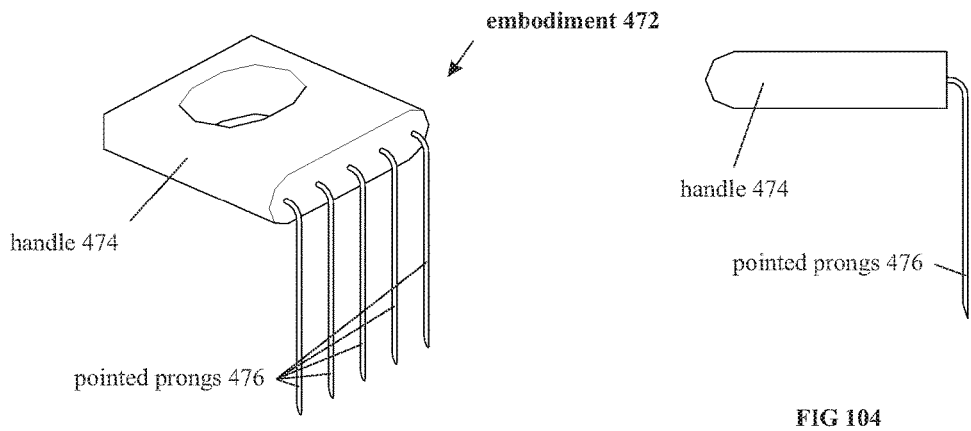
FIG 103
FIG 104
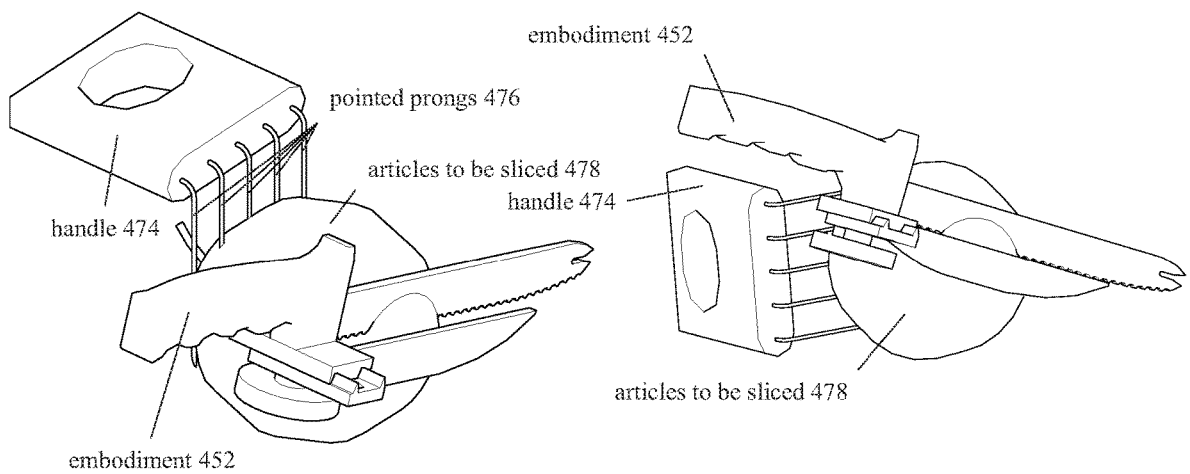
FIG 105
FIG 106
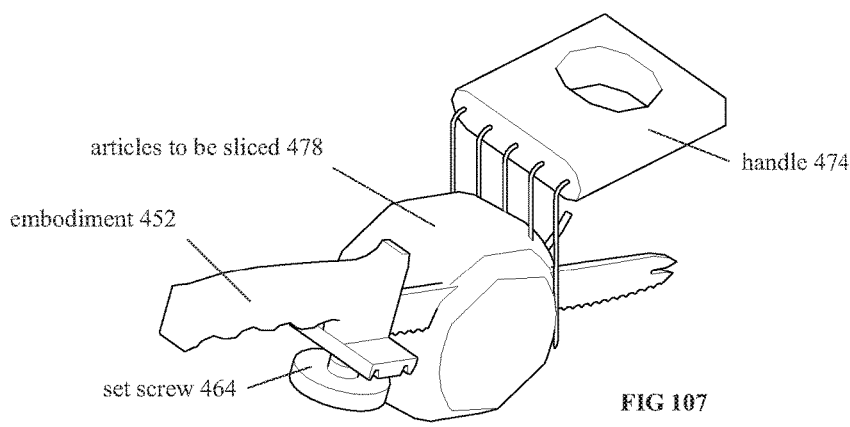
FIG 107

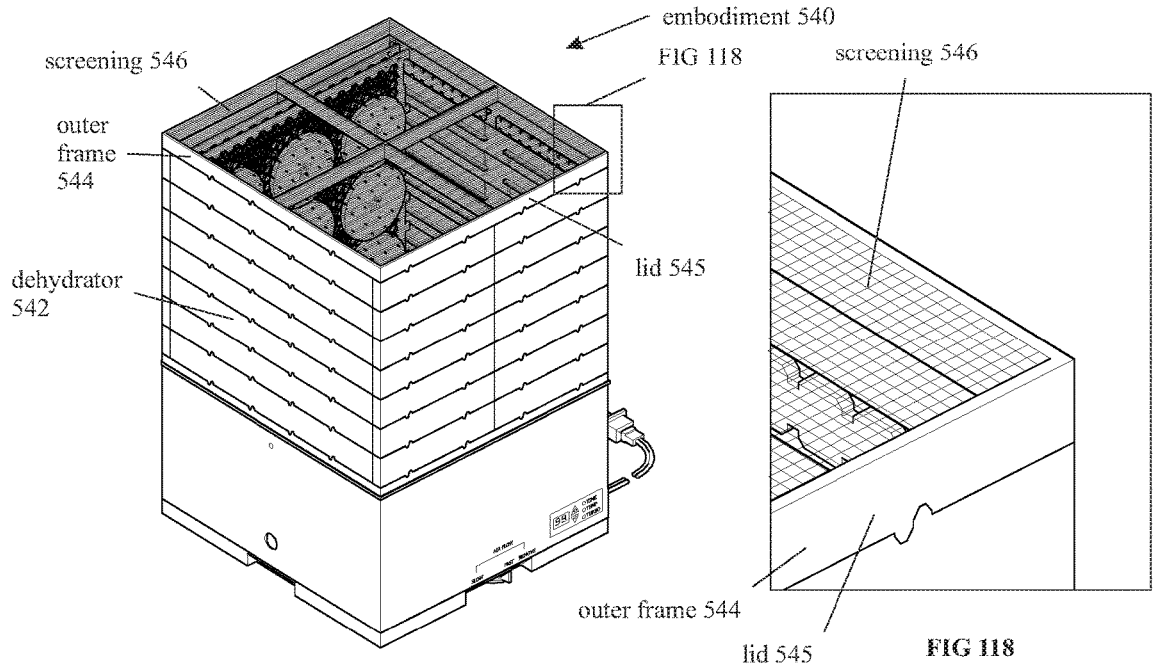
FIG 117
FIG 118
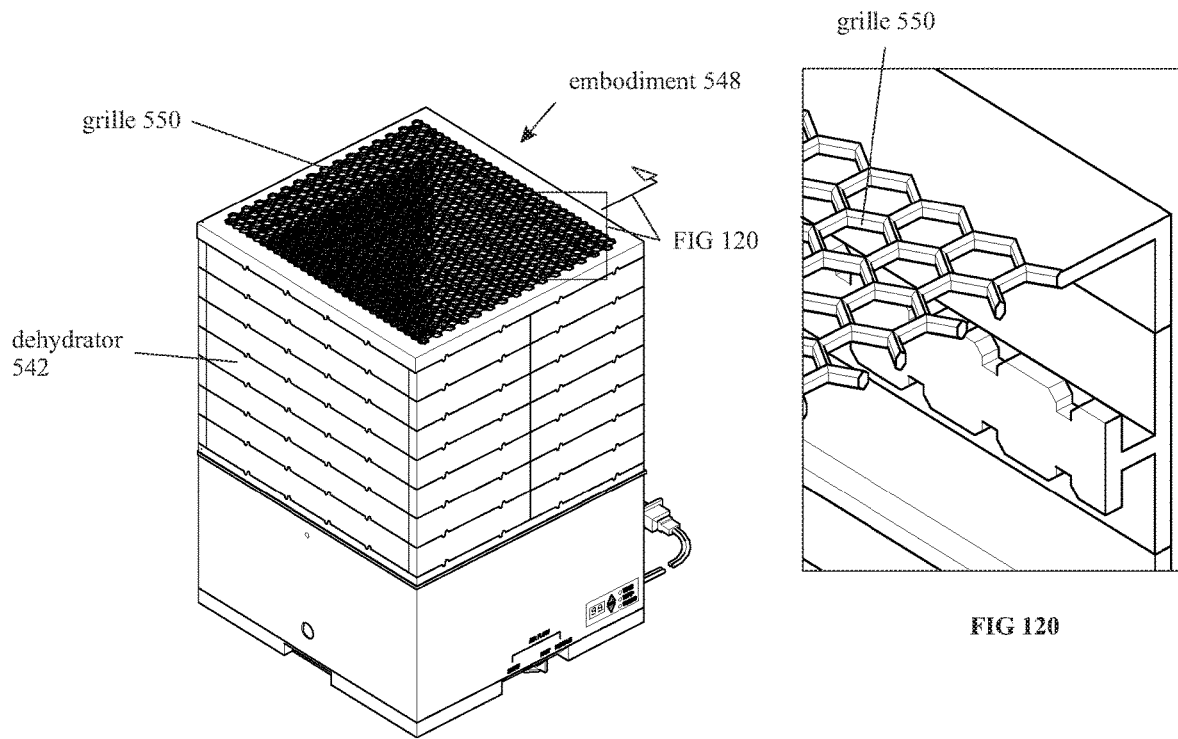
FIG 119
FIG 120

US 10,912,319 B2

METHOD AND APPARATUS FOR FOOD DEHYDRATION

CROSS-REFERENCE TO RELATED APPLICATIONS

This application is a Continuation of U.S. Utility application Ser. No. 15/258,453, filed Sep. 7, 2016, which is incorporated herein by reference.

TECHNICAL FIELD

The present inventions relate to food dehydration equipment and methods and related apparatus.

BACKGROUND

Food dehydration is among the oldest forms of food preservation.

Devices and equipment to remove moisture from foods and other articles indoors are today both numerous and ubiquitous.

However there still remain problems, including, but not limited to: capacity, large storage and shipping size, countertop space consumption, inefficient power usage, difficulty of operation, evenness of drying, complexity of food preparation, product cost, and noise. Inventions herein may address none, some, or all of these problems.

SUMMARY

Embodiments of the present inventions provide, among other things, devices which collapse compactly, and mount articles to be dehydrated in a variety of manners. Further, some embodiments operate efficiently and quietly without utilizing a fan. A few embodiments are shown which aid in dehydrator food preparation. Devices are also shown which aid in food preparation for dehydration.

BRIEF DESCRIPTION OF THE DRAWINGS

FIG. 25 is a detail of FIG. 27, as indicated in FIG. 27.

FIG. 26 is a detail of FIG. 27 as indicated in FIG. 27.

FIG. 27 is a perspective of embodiment 158 with adjustable vent cover 162, lid 160, shelf surrounding walls 180 and utility base 178 indicated in dotted lines.

FIG. 28 is a detail of FIG. 27, as indicated in FIG. 27.

FIG. 29 is a perspective of embodiment 158.

FIG. 30 is a perspective of shelf surrounding walls 180, in their fully open condition.

FIG. 31 is a perspective of shelf surrounding walls 180, in their partially collapsed condition.

FIG. 32 is a perspective of shelf surrounding walls 180 in their fully collapsed condition, and disposed vertically.

FIG. 33 is a perspective of shelf surrounding walls 180 in their fully collapsed condition, and disposed horizontally.

FIG. 34A is an enlargement of a portion of FIG. 34, as indicated in FIG. 34. Will FIG. 35 is a perspective showing folding shelf floor 190 in solid lines, and showing shelf floor 192 in dotted lines.

FIG. 36 is a detail of FIG. 35, as indicated in FIG. 35.

FIG. 37 is a perspective of folding shelf floors 190 and 192 in their zigzag folded condition.

FIG. 38 is a detail of FIG. 37, as indicated in FIG. 37.

FIG. 39 is a perspective of collapsible shelf side walls 186.

FIG. 40 is a detail of FIG. 39, as indicated in FIG. 39.

FIG. 49 is a detail of FIG. 50, as indicated in FIG. 50.

FIG. 50 is a perspective of shelf floor members 252 and 254, with collapsible shelf side walls 232 indicated in dotted lines.

FIG. 51 is a detail of FIG. 52, as indicated in FIG. 52.

FIG. 52 is a perspective of shelf floor members 262, 264, and 266.

FIG. 53 is a detail of FIG. 54, as indicated in FIG. 54.

FIG. 54 is a perspective of shelf floor member 272.

FIG. 58 is a perspective of embodiment 282.

FIG. 59 is a perspective showing folding floor 290 being removed from within horizontal shelf support frames 298.

FIG. 60 is a detail of FIG. 59, as indicated in FIG. 59.

FIG. 63A is a detail of FIG. 63, as indicated in FIG. 63.

FIG. 63B is a detail of FIG. 63, as indicated in FIG. 63.

FIG. 63C is a detail of FIG. 63, has indicated in FIG. 63.

FIG. 71 is a perspective of embodiment 370, with embodiment 370 being vertically disposed.

FIG. 72 is a detail of FIG. 71, as indicated in FIG. 71.

FIG. 73 is a perspective of embodiment 370, with embodiment 370 being horizontally disposed.

FIG. 74 is a detail of FIG. 73, as indicated in FIG. 73.

FIG. 75 is a perspective of embodiment 370, with embodiment 370 being horizontally disposed.

FIG. 76 is a detail of FIG. 75, as indicated in FIG. 75.

FIG. 84 is a perspective of a device holding embodiments 398.

FIG. 85 is a perspective section taken through FIG. 84, as indicated in FIG. 84, with no lid, and showing spit rod 400 and articles to be dehydrated 402, being mounted.

FIG. 86 is identical to FIG. 85 except spit rod 400 and mounted articles to be dehydrated 402 are mounted.

FIG. 90 is a perspective of embodiment 432.

FIG. 91 is a perspective of zigzag folding member 434 and it's partially collapsed condition.

FIG. 92 is a detail of FIG. 94, as indicated in FIG. 94.

FIG. 93 is a detail of FIG. 91, as indicated in FIG. 91.

FIG. 94 is an exploded perspective showing collapsible shelf sidewalls 436 in its open condition, and showing zigzag folding member 434 in its fully collapsed condition.

FIG. 95 is a perspective showing fully collapsed zigzag folding member 434 being stored inside of the upper portion of utility base 444.

FIG. 96 is a top view of FIG. 91.

FIG. 97 is a top view of FIG. 95.

FIG. 103 is a perspective of embodiment 472.

FIG. 104 is a side view of embodiment 472.

FIG. 105 is a perspective of embodiment 472 in use, and including embodiment 452 and articles to be sliced 478.

FIG. 106 is a perspective of embodiment 472 in use, using an alternate method of use to that shown in FIG. 105.

FIG. 107 is a perspective of embodiment 472 in use, using an alternate method of use to those shown in FIGS. 105 and 106.

FIG. 114 is a perspective of embodiment 512 in use.

FIG. 115 is a perspective of embodiment 520 in use.

FIG. 115A is a detail of FIG. 115, as indicated in FIG. 115.

FIG. 116 is a perspective of embodiment 520 in use.

FIG. 117 is a perspective of embodiment 540.

FIG. 118 is a detail of FIG. 117, as indicated in FIG. 117.

FIG. 119 is a perspective of embodiment 548.

FIG. 120 is a detail section of FIG. 119, as indicated in FIG. 119.

FIG. 121 is a perspective taken from below and showing air inlet controller 566.

FIG. 122 is an exploded perspective taken from below, of embodiment 552.

FIG. 123 is an exploded perspective taken from above, of embodiment 552.

FIG. 124 is a perspective of embodiment 592.

Figures 125, 126, 127:
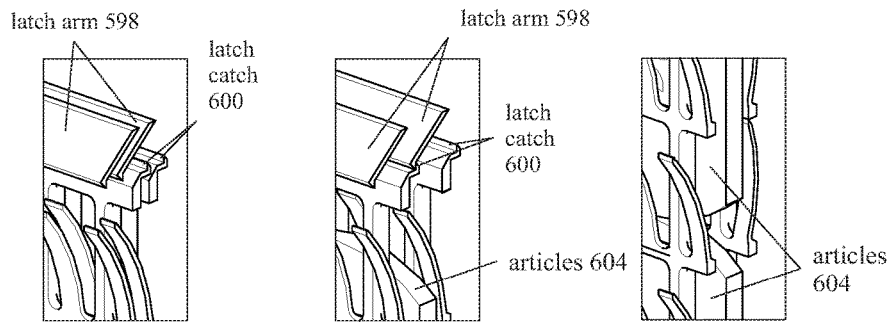
Figure 128:
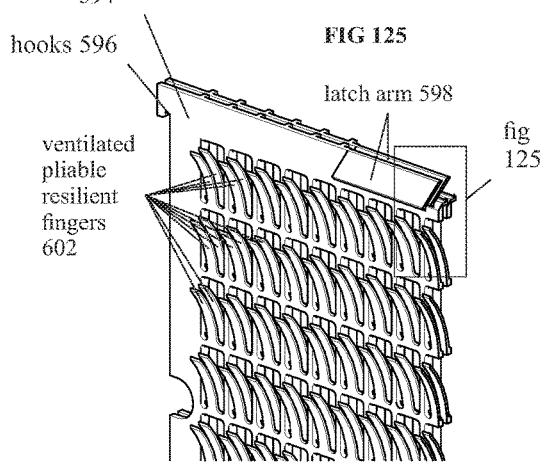

FIG. 125 is a detail of FIG. 128, as indicated in FIG. 128.

Figure 129:
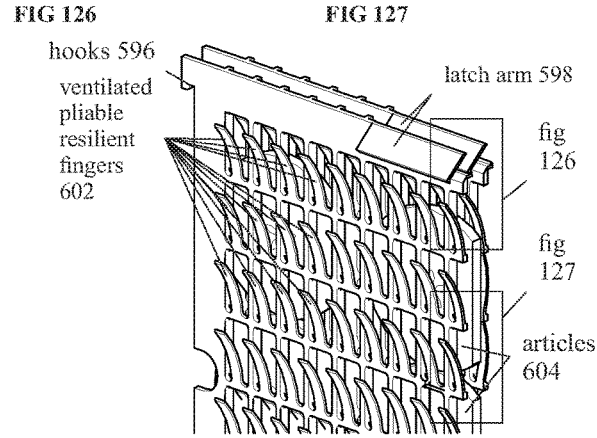

FIG. 126 is a detail of FIG. 129, as indicated in FIG. 129.

Figure 130:
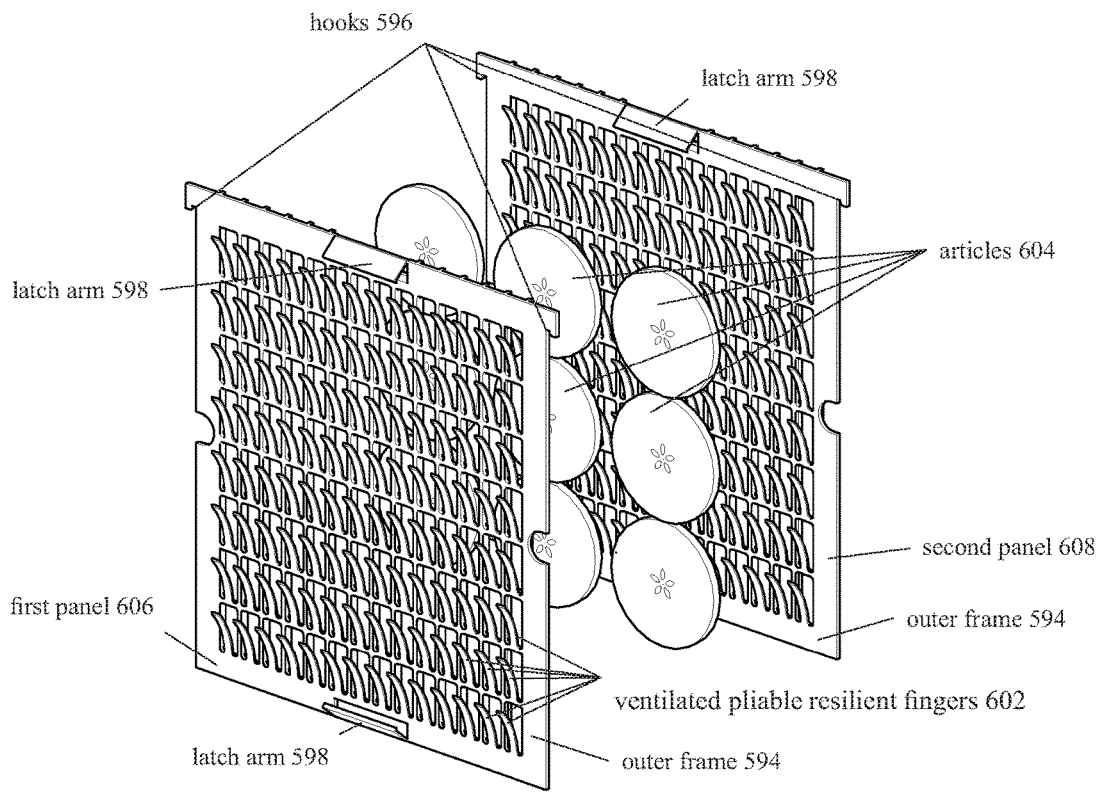

FIG. 127 show how articles 604, as indicated by FIG. 130, can be held between first panel 606, and second panel 608.

FIG. 128 shows how embodiments 592 cna be compactly stacked back-to-front by interleaving into one another.

FIG. 129 shows ventilated pliable resilient fingers 602, on second panel 608, in this face-to-back panel disposition.

FIG. 130 is an exploded perspective of first panel 606, articles 604, and second panel 608.

Figure 131:
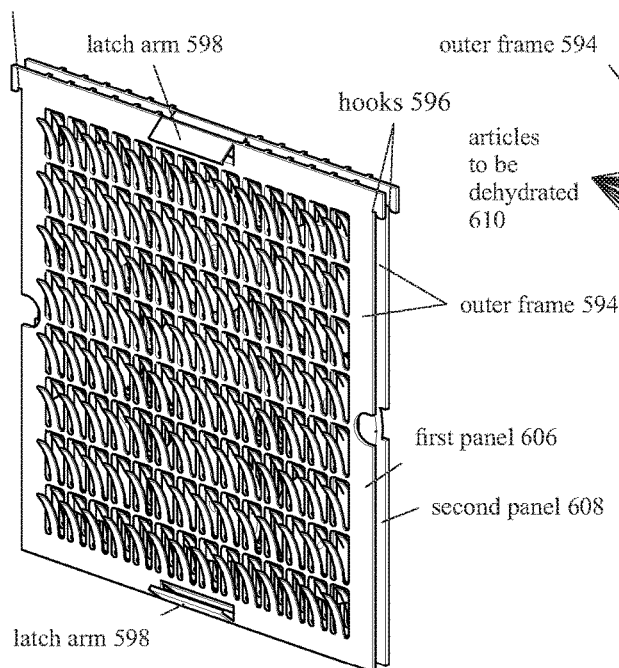

FIG. 131 is a perspective of the elements shown in FIG. 130, with the elements assembled.

Figure 132:
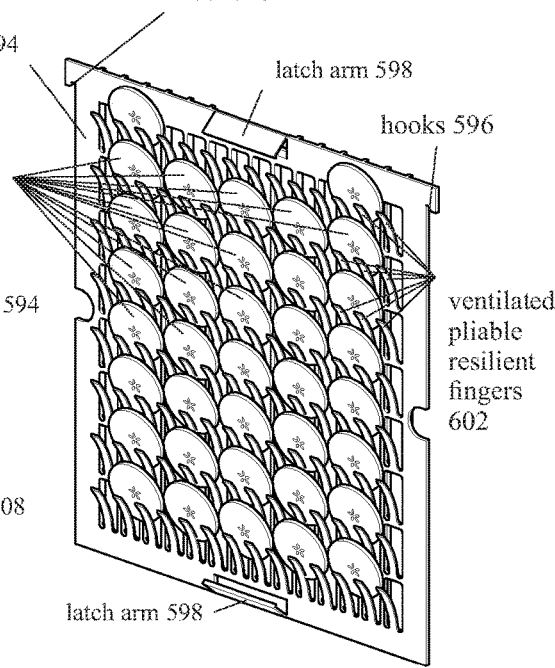

FIG. 132 is a perspective of embodiment 592 holding articles to be dehydrated 610.

Figure 133:
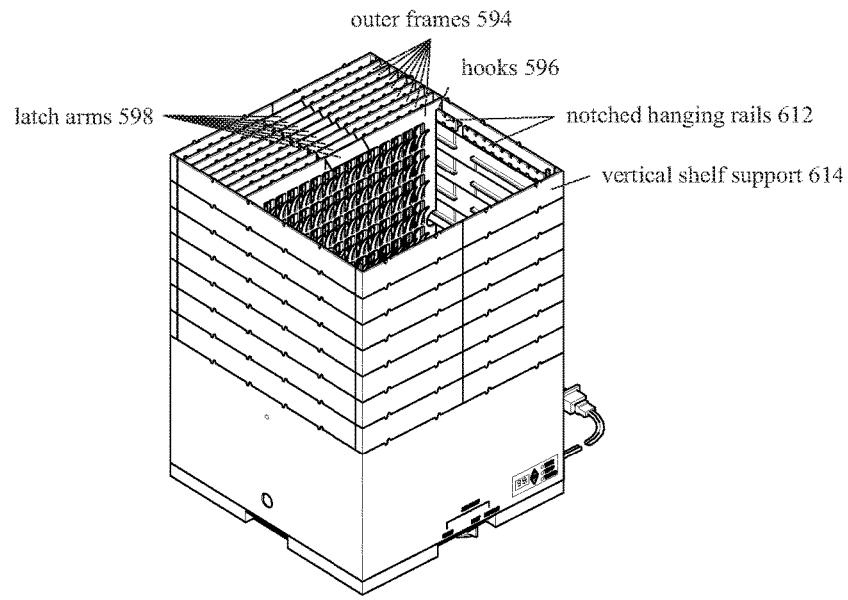

FIG. 133 is a perspective including embodiments 592 in use, and dispose vertically.

Figure 134:
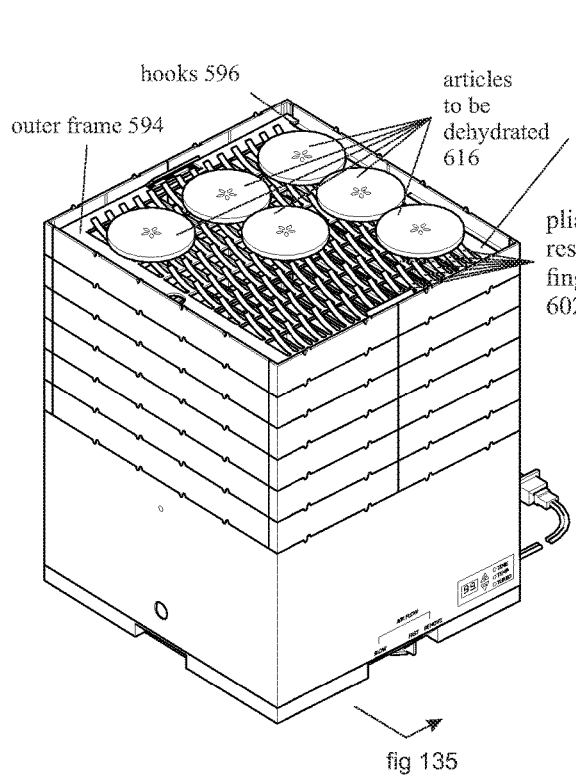

FIG. 134 is a perspective including embodiments 592 and use, and disposed horizontally.

Figure 135:
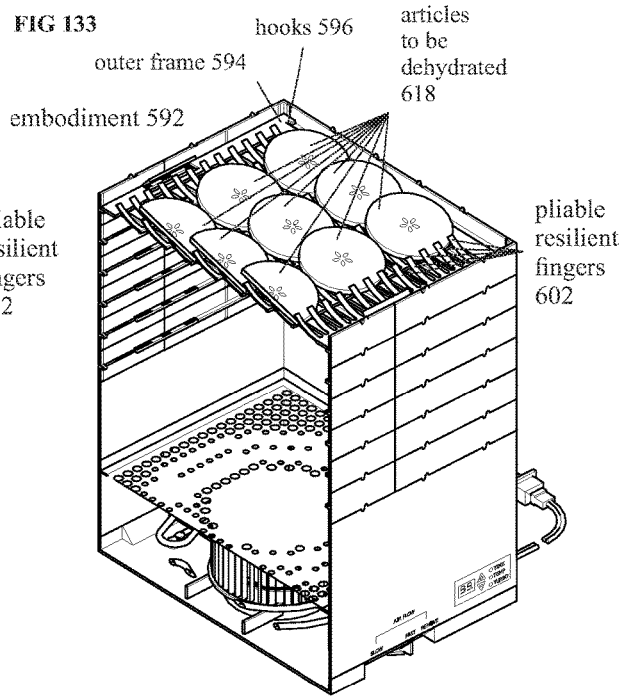

FIG. 135 is a section taken through FIG. 134, as indicated in FIG. 134, with articles to be dehydrated 618 being diagonally disposed.

DETAILED DESCRIPTION

Embodiment 100 is shown in FIGS. 1 through 11, and comprises: lid 102, which removably mounts adjustable vent cover 104.

Figure 7:
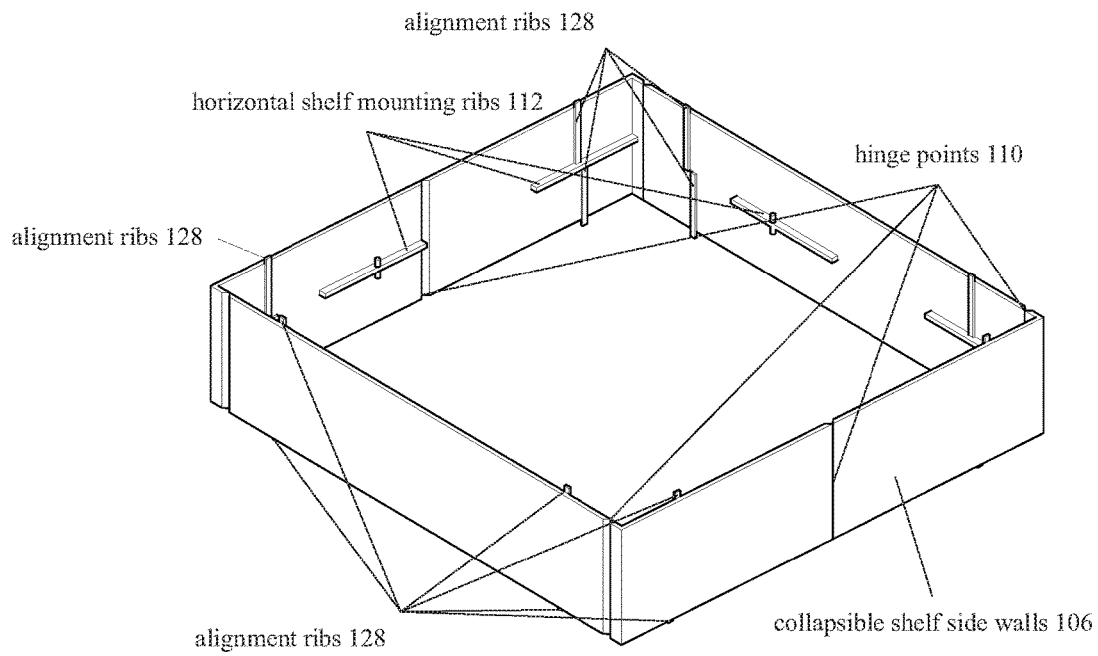
FIG. 7 is a perspective of collapsible shelf side walls 106 in their open condition.

Lid 102 is configured to mount to the upper rim of collapsible shelf side walls 106. Collapsible shelf side walls 106 may fold, as shown in FIGS. 7 through 9, utilizing hinge points 110 which are shown, as a non-limiting and non-exhaustive example, as being molded-in living hinges made from polypropylene or polyethylene, or other suitable material.

Hinge points 110 shown in FIGS. 1 through 11, as well as hinge points in general shown herein, may also utilize alternative constructions, such as, by non-limiting and non-exhaustive examples, common door hinge, closet plastic storage bin lid hinges, folding line construction such as used on Apple™ iPad covers, child plastic lunchbox construction, plastic toolbox construction, etc.

Figure 8:
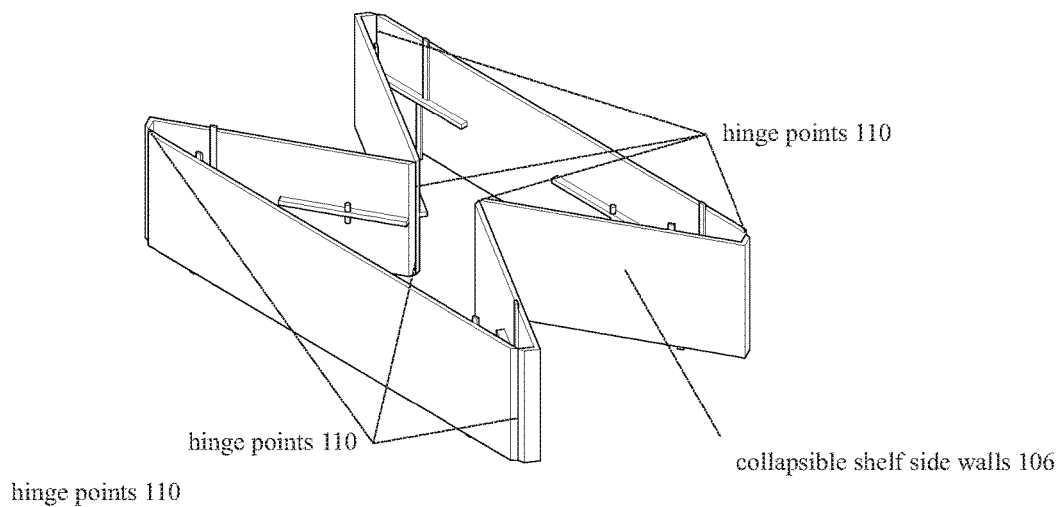
FIG. 8 is a perspective of collapsible shelf side walls 106, in their partially collapsed condition.
Figure 9:
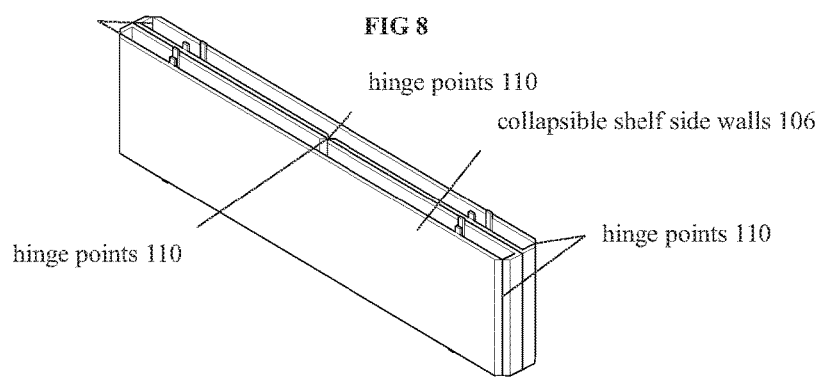
FIG. 9 is a perspective of collapsible shelf side walls 106 in their fully collapsed condition.

Also as a non-limiting and non-exhaustive example, lid 102 may be molded with a top to bottom pull, in the disposition shown in FIG. 8.

Figure 5:
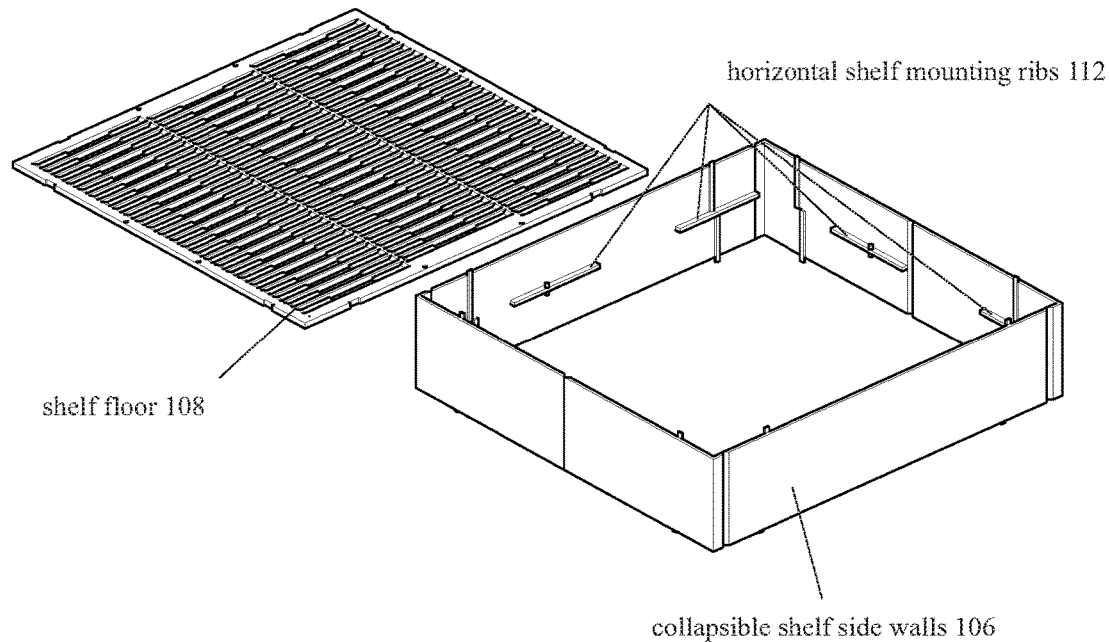
FIG. 5 is a detail perspective of shelf floor 108 and collapsible shelf side walls 106, disassembled.
Figure 6:
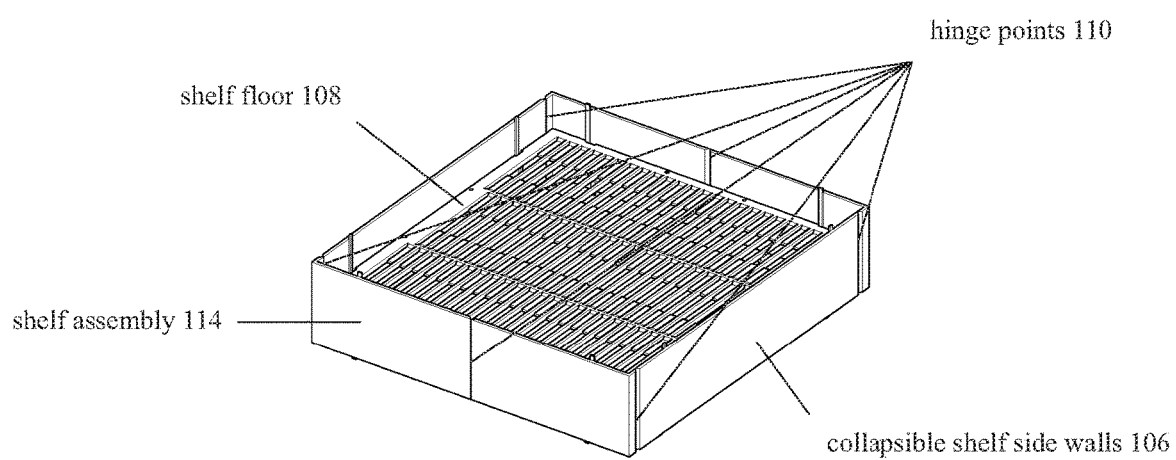
FIG. 6 is a detail perspective of shelf floor 108 and collapsible shelf side walls 106, assembled.

At its interior midriff, shelf side walls 106 may removably mount shelf floor 108, on horizontal shelf mounting ribs 112 as shown in FIGS. 5 and 6.

Shelf side walls 106 are symmetrical, such that flipping them over on their back, results in the same outer form as when they are resting on their front. This user-friendly feature means even if a user attempts to assemble shelf side wall 106 upside down over, it works no differently than if they had tried to assemble it right side up.

Likewise shelf floor 108 is similarly symmetrical such that flipping it over makes no difference in its outward form and/or how it is inserted into shelf side walls 106.

Figure 1:
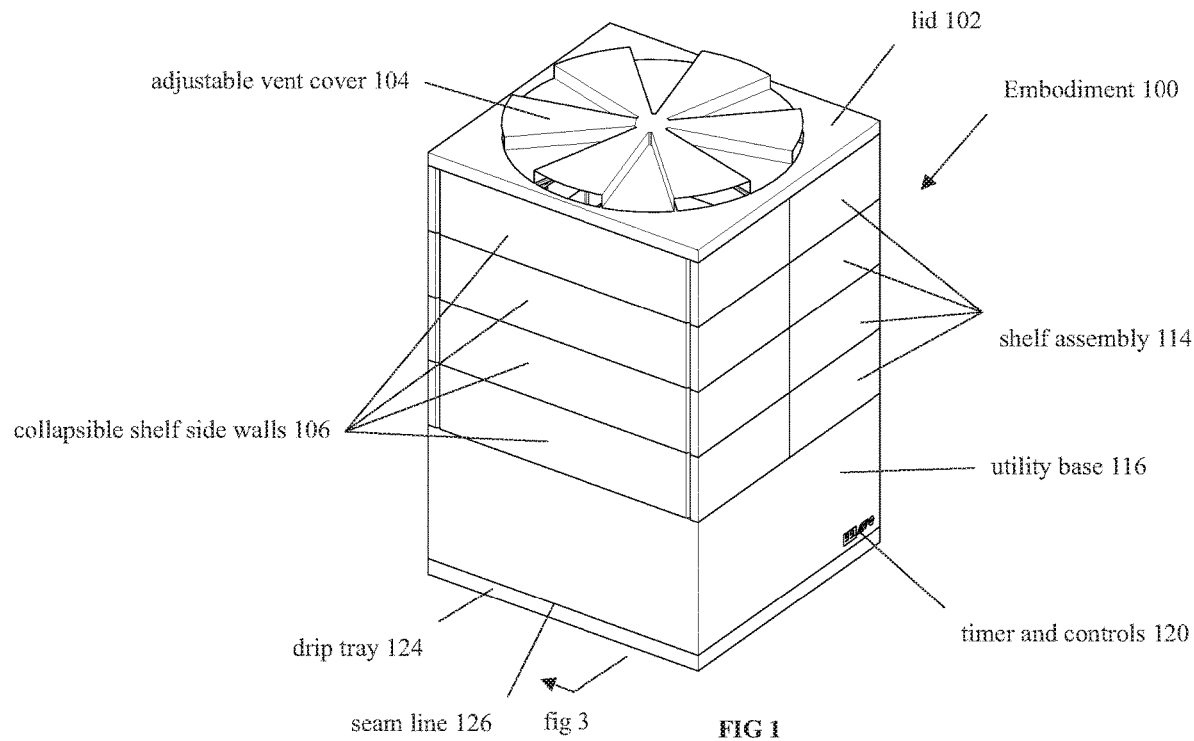
FIG. 1 is a perspective of embodiment 100 in a use condition.

When united, as shown in FIG. 6, side walls 106 and shelf floor 108, form shelf assembly 114 (FIGS. 1 and 6). Each shelf assembly 114 is configured to stack and engage with shelf assemblies 114 directly above and below it. Each shelf assembly 114 is configured to engage lid 102 (FIGS. 1 and 4).

Figure 4:
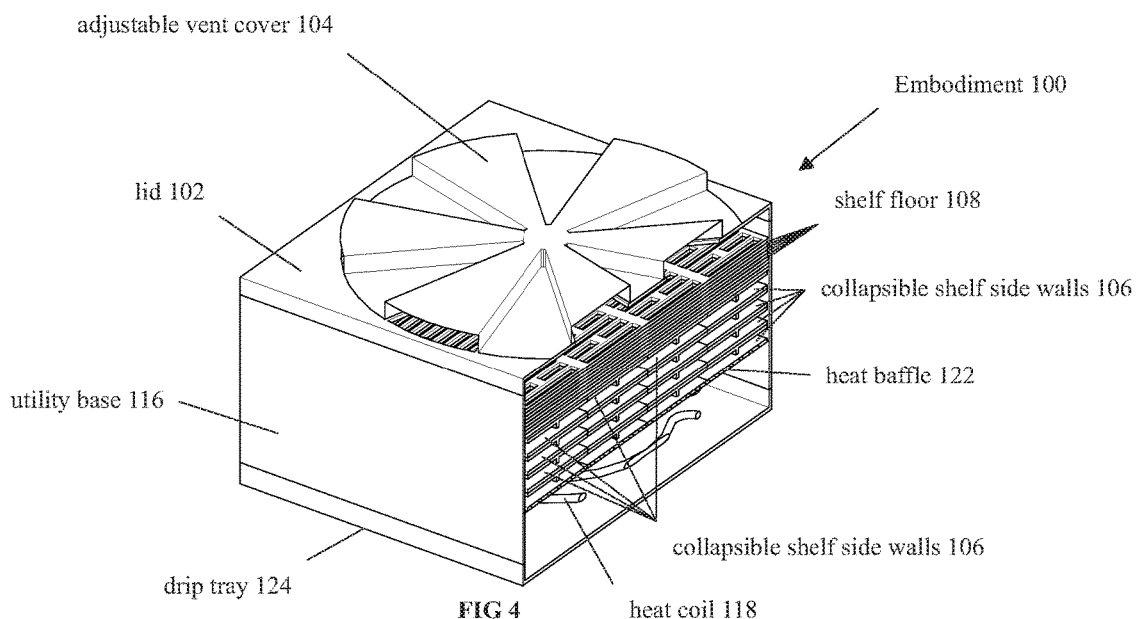
FIG. 4 is a perspective section taken through FIG. 2, as indicated in FIG. 2.

Further, each shelf assembly 114 is configured to engage the upper rim of utility base 116 as shown in FIGS. 1 and 4.

Figure 2:
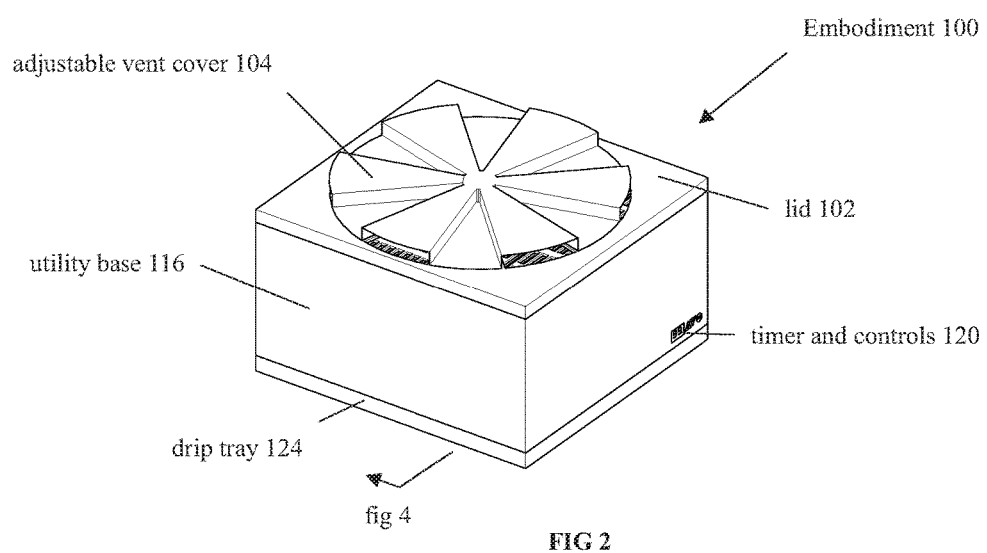
FIG. 2 is a perspective of embodiment 100 in a compacted condition.
Figure 11:
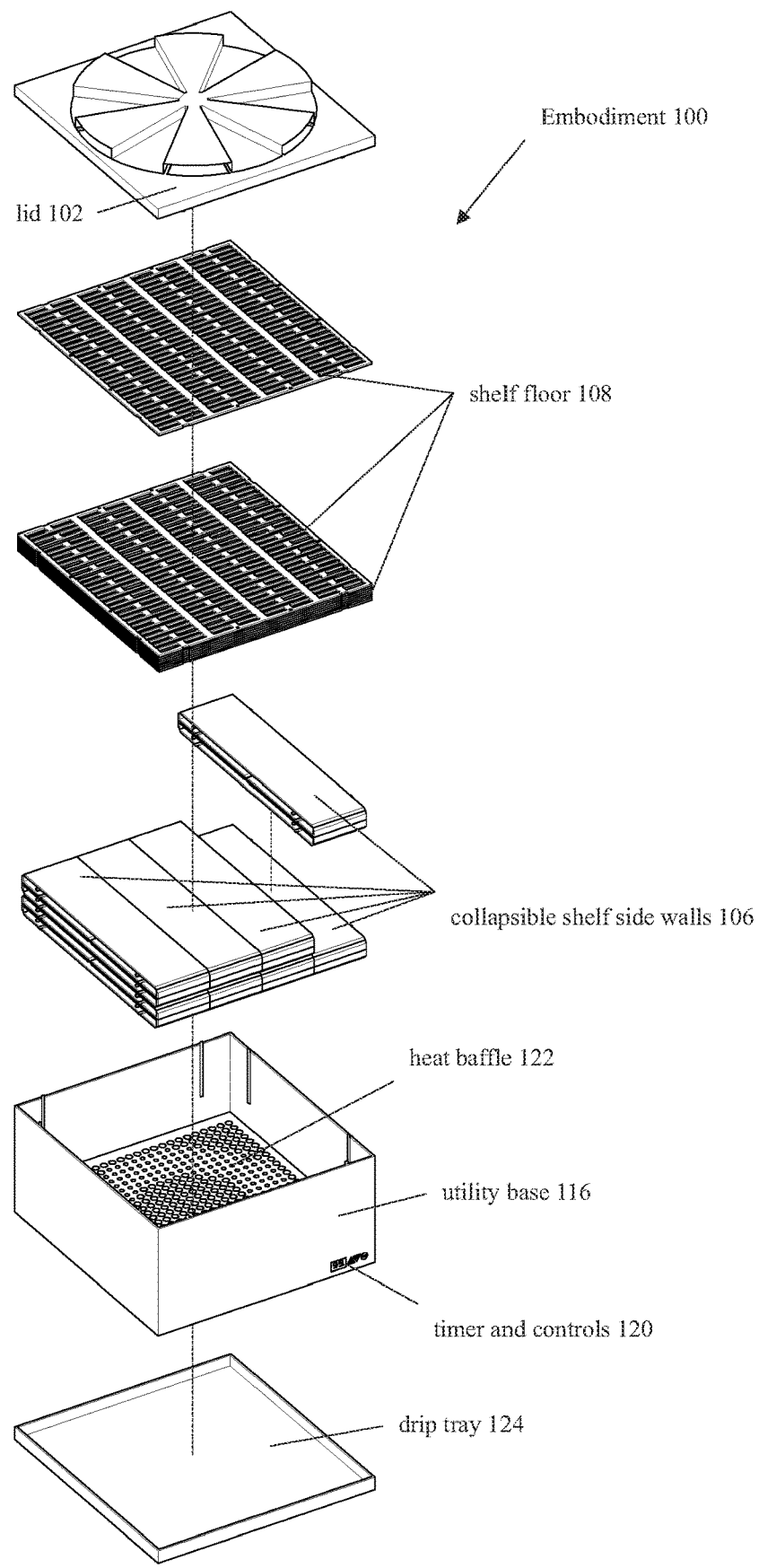
FIG. 11 is an exploded perspective of embodiment 100 in its storage condition.

The upper rim of utility base 116 is also configured to engage lid 102, as shown in FIGS. 2 and 4. A plurality of shelf floor 108 and collapsible shelf side walls 106 may be stored within utility base 116, as shown in FIGS. 4, and 11. This is similar to other embodiment shown herein, including, but not limited to those shown at least in FIGS. 34, 35, 43, 48, 59, 63, 71, 81, 83, 85, 94, and 124.

Figure 3:
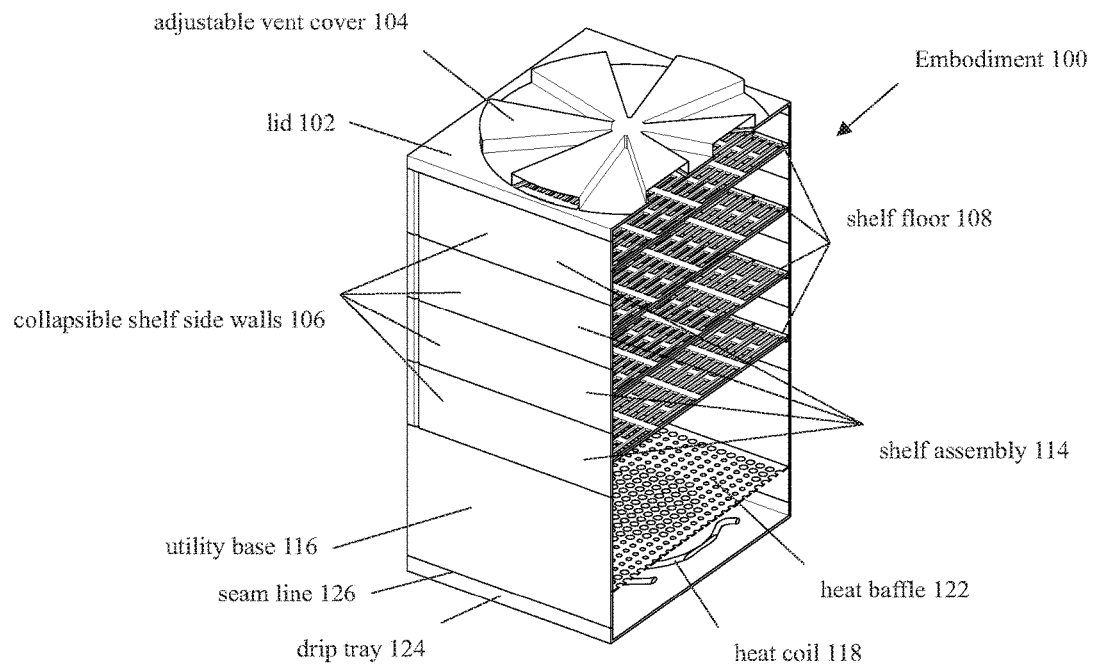
FIG. 3 is a perspective section taken through FIG. 1, as indicated in FIG. 1.
Figure 10:
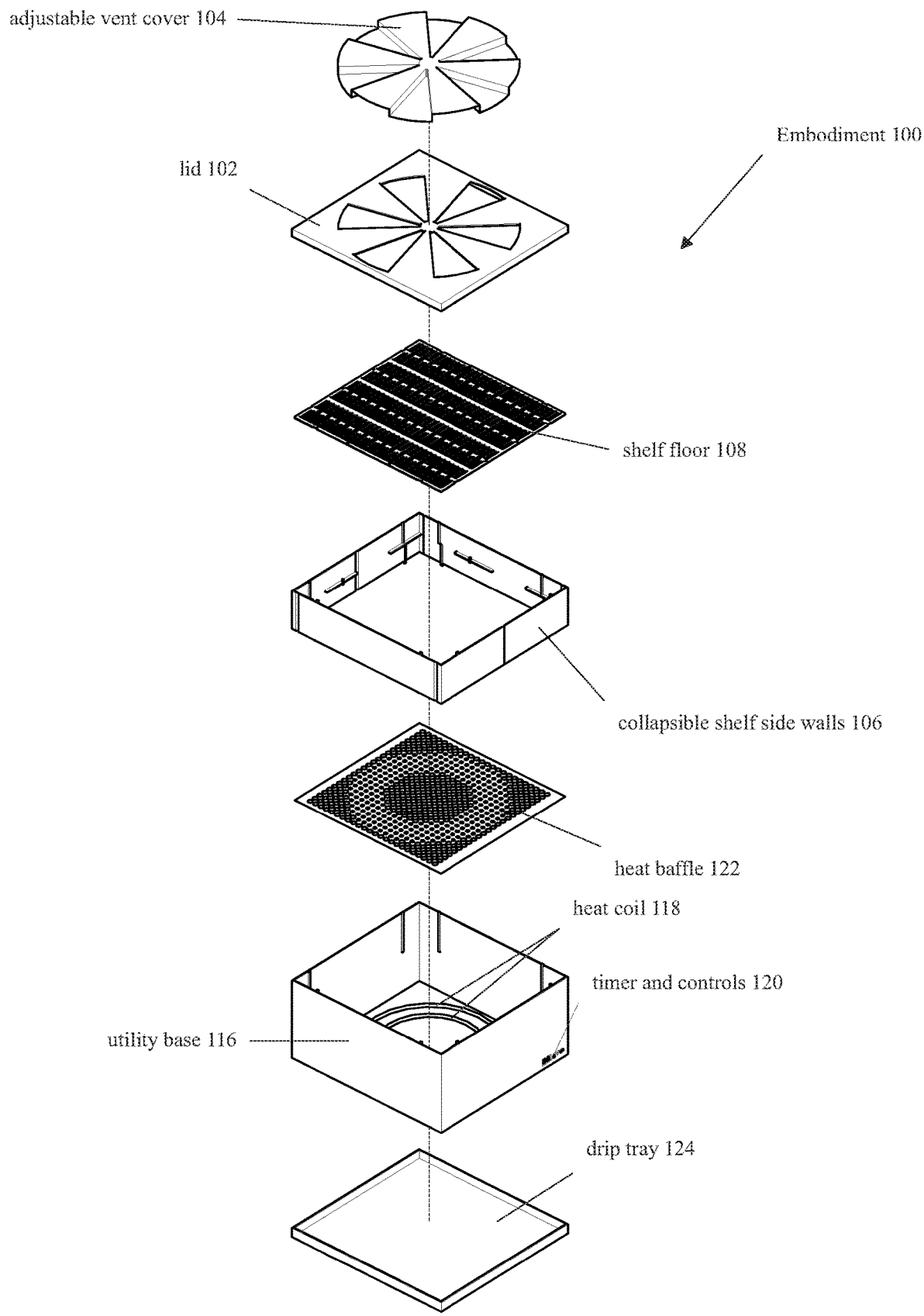
FIG. 10 is an exploded perspective of embodiment 100 in its use condition.

As shown in FIGS. 3, 4, and 10, utility base 116 mounts heat coil 118, timer and controls 120, and heat baffle 122.

Heat coil 118, as a non-limiting and non-exhaustive example, may be of a common tubular construction, with a metal outer sheath, and a coiled electrically resistant core, which may be powered by home wall current. Timer and controls 120, may regulate at least, dehydration time, and/or dehydration temperature.

Dehydration is performed by heat coil 118 being electrically activated and heating air, which through convective currents, rises within the interior of embodiment 100 from utility base 116 through heat baffle 122, which evens out the rising heat before it passes through shelf assemblies 114, including whatever is loaded onto shelf assemblies 114, and is exited through lid 102, under control of adjustable vent cover 104, which is similar to an old fashion rotary wood stove damper.

Embodiment 100, by not using a fan, is entirely silent in operation. This makes it appropriate for use in a variety of environments, including, but not limited to, small apartments and houses, as well as motorhomes and other confined spaces. Not using a fan may also greatly reduce electric operating costs.

By constructing collapsible shelf side walls 106 out of translucent or dark material, embodiment 100 may be entirely or partially powered by sunlight, simply by placing it in sunlight.

The bottom of utility base 116 is configured to removably mount above drip tray 124. Seam line 126, is situated between the upper rim of drip tray 124, and the lower rim of utility base 116, and is open enough to allow inlet venting.

Debris falling from articles being dehydrated may be caught by heat baffle 122, and/or by drip tray 124. Both may be removable and may be dishwasher safe.

Heat baffle 122 is configured to have no openings directly above heat coil 118, thus preventing debris from articles being dehydrated, or elsewhere, from dropping directly onto heat coil 118.

Alignment ribs 128 align and interlock shelf assemblies 114 to each other, as well as, in combination with alignment ribs 128, to utility base 116, and lid 102.

Embodiment 100 may be constructed at any suitable scale. As just one non-limiting and non-exhaustive example, it may be approximately 11"×11", or slightly (20% or less) smaller, in plan view.

This dimension is particularly advantageous because it means that components, including, but not limited to: shelf floor 108, lid 102, adjustable vent cover 104, heat baffle 122, and drip tray 124; may; any, any combination, and/or all; be able to fit where a standard 11 inch in diameter dinner plate will fit, including, but not limited to, in dishwashers, on a countertops, or in kitchen over countertop cabinets, or other suitable locations.

In combination with making these components dishwasher safe, this promotes easy cleanup. Also, it means storage may be in virtually any kitchen cabinet. And it means, along with appropriate structural construction, that the stored unit, as shown in FIG. 2, may be stored next to, and/or above, and/or below standard 11 inch in diameter dinner plates.

Adjustable vent cover 104, in combination with lid 102, provide an inexpensive and reliable way of controlling dehydrating conditions within embodiment 100.

Making embodiment 100 collapsible, as shown in at least FIGS. 1, 2, 3, 4, 7, 8, 9, 10, and 11, adds to flexibility, and reduces, space required for storage, shipping, and/or other purposes.

As a non-limiting and non-exhaustive example, in use, embodiment 100 may include the following steps.

Assembled for storage embodiment 100, as shown in FIG. 2, is disassembled, and reassembled as shown in FIG. 1.

Referring to FIG. 4, this involves removing from utility base 116: shelf floors 108, removing and unfolding collapsible shelf side walls 106, as shown in FIGS. 7, 8, and 9; and reassembling them into shelf assembly 114, as shown in FIG. 6.

Utility base 116 remains stacked onto drip tray 124; shelf assemblies 114 are loaded with articles to be dehydrated; stacked onto utility base 116; and lid 102 is stacked onto the uppermost shelf assembly 114, as shown in at least FIGS. 1 and 3.

Embodiment 100 is then plugged into home wall current, and controls set appropriately, including those in timer and controls 120, as well as adjustable vent cover 104.

At the end of the appropriate dehydration time, heat coil 118 is shut off by timer and controls 120, or by other means, lid 102 is removed, and shelf assemblies 114 (FIG. 6) are unstacked and unloaded.

If cleaning is required for any cleanable part, such parts may be placed in a dishwasher, and/or hand washed.

Figure 12:
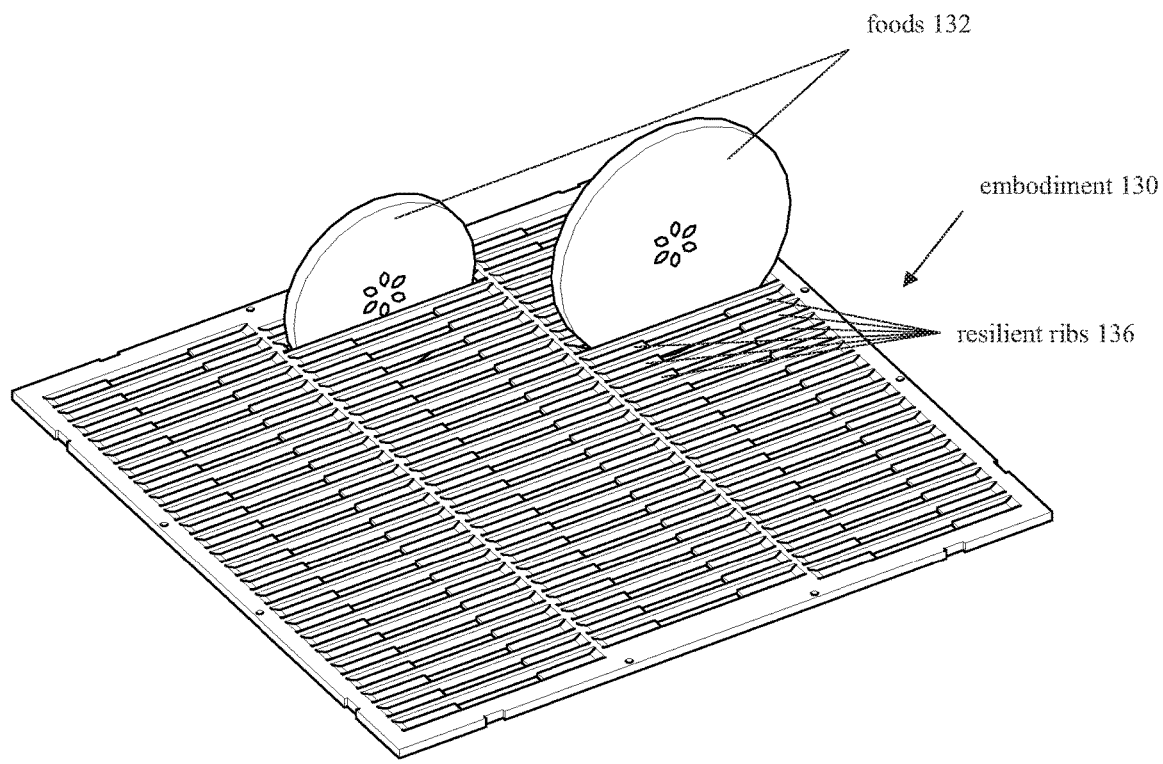
FIG. 12 is a perspective of embodiment 130 taken from above embodiment 130.
Figure 13:
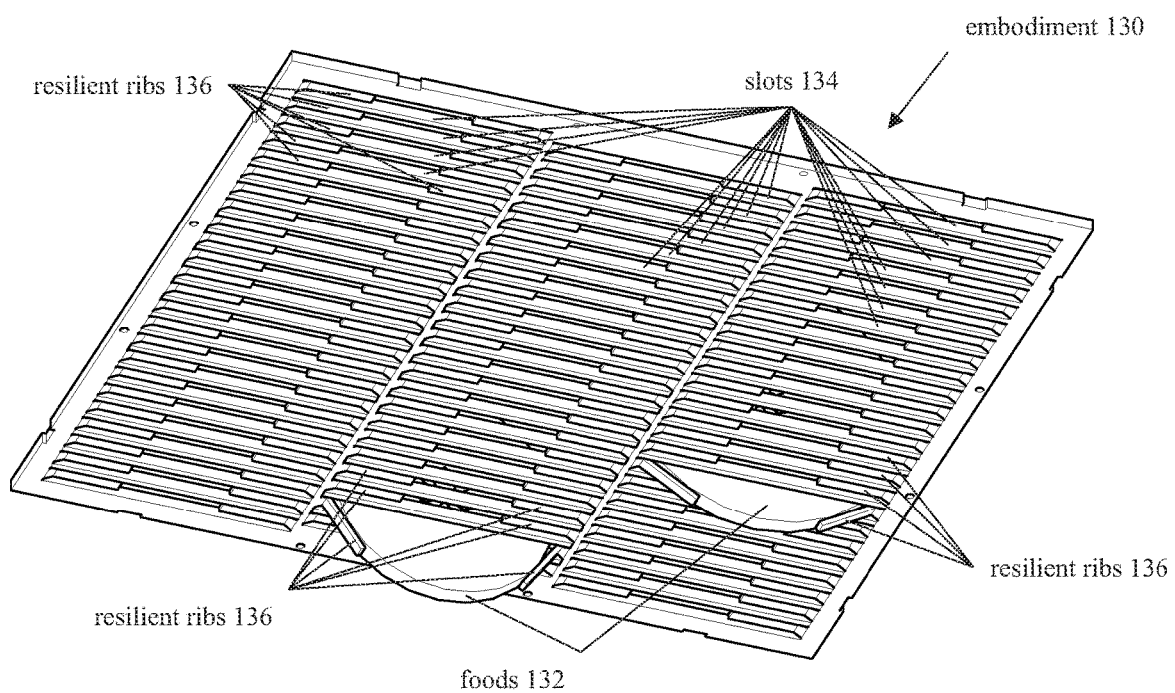
FIG. 13 is a perspective of embodiment 130 taken from below embodiment 130.

Embodiment 100 may then be reassembled into its use state, FIGS. 1 and 3, or, by reversing the above procedure, it may be reassembled into its storage state, FIGS. 2 and 4. Embodiment 130, FIGS. 12 and 13:

FIGS. 12 and 13 show embodiment 130, which is a variant of, and may replace, shelf floor 108.

Embodiment 130 may hold articles, including articles to be dehydrated, in a conventional horizontal manner, on its flat upper surfaces.

Embodiment 130 may also hold articles, including foods 132, by passing them through slots 134, and restraining them from falling through slots 134 by bracing foods 132 against resilient ribs 136.

At least for ease-of-use, embodiment 130 is symmetrical, such that rotating embodiment 130 180° about a vertical axis will result in the same outward form, as not rotating it. And embodiment 130 is symmetrical, such that rotating it 180° about a front to back horizontal axis will result in the same outward form as not rotating it. Further, embodiment 130 is symmetrical, such that rotating it 180° about a side to side horizontal axis will result in the same outward form as not rotating it.

Embodiment 130 may be adapted for use with many of the embodiments described herein.

As a non-limiting and non-exhaustive example, embodiment 130 may be stamped in metal, or molded from appropriate plastics, possibly including polyethylene, polypropylene, ABS, polycarbonate, or other suitable material.

Embodiment 138, FIGS. 14, 15, 16, and 18

FIGS. 14, 15, 16, and 18 show embodiment 138 which is a variant of, and may replace, shelf floor 108.

Figure 14:
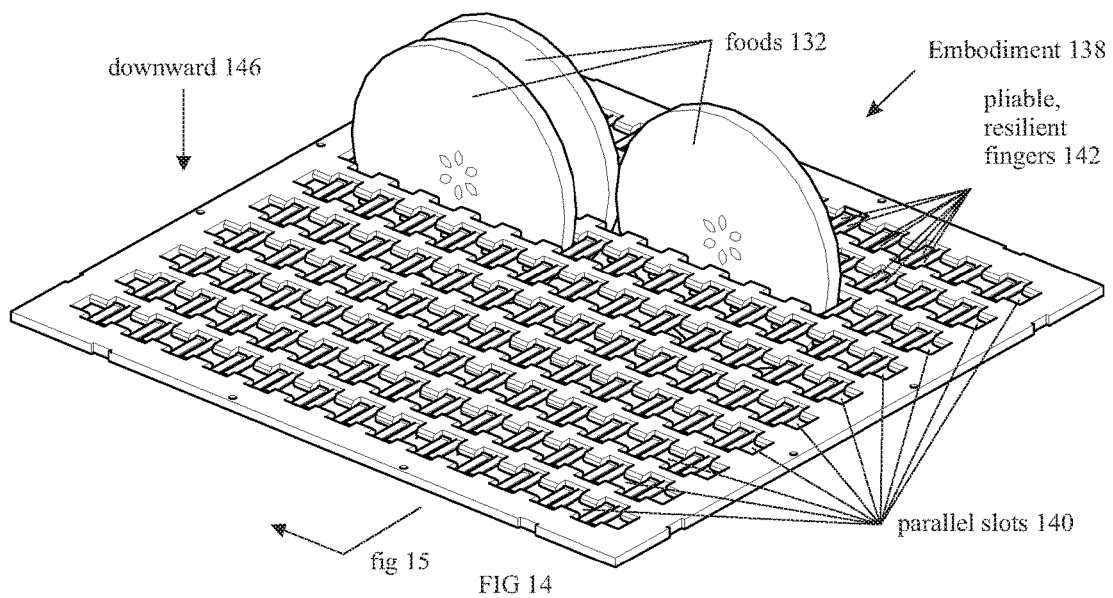
FIG. 14 is a perspective of embodiment 138, taken from above embodiment 138.
Figure 15:
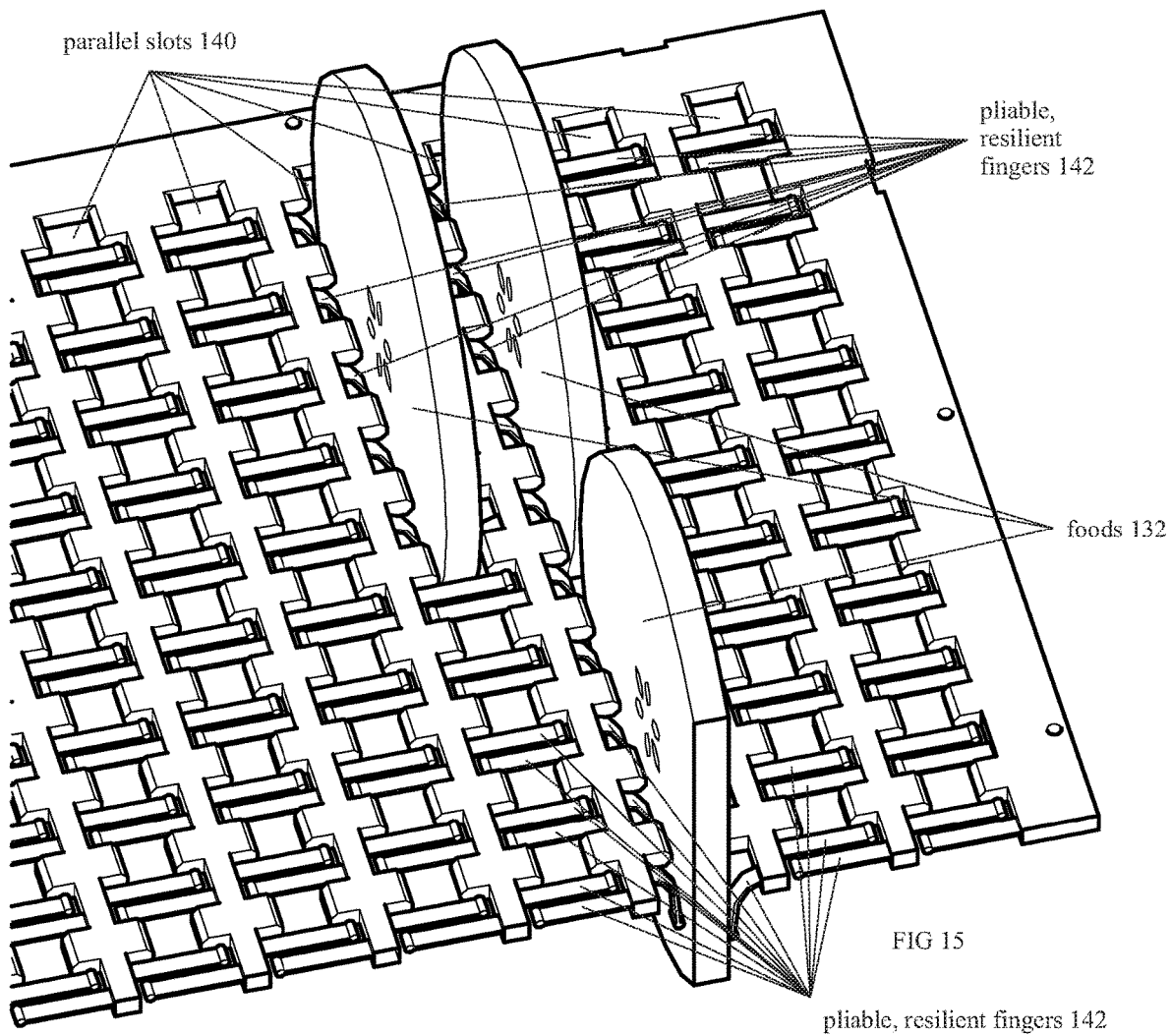
FIG. 15 is a perspective section taken through FIG. 14, as indicated in FIG. 14.
Figure 16:
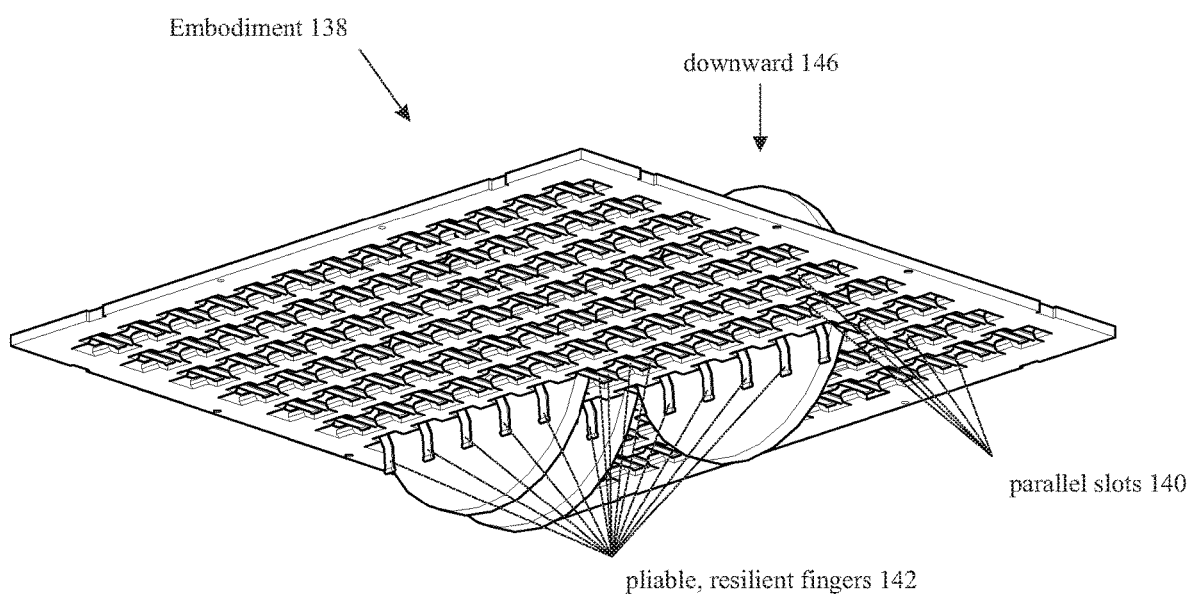
FIG. 16 is a perspective of embodiment 138, taken from below embodiment 138.

Looking at FIGS. 14, 15, and 16, embodiment 138 utilizes one or more parallel slots 140, with one or more opposing sets of pliable, resilient fingers 142 projecting from the sides of parallel slots 140 inward toward the center.

When articles, such as foods 144, are pushed downward 146 into parallel slots 140, pliable, resilient fingers 142 flex downward, and hold foods 144, as shown particularly in FIGS. 15 and 16.

After dehydration, as a non-limiting and non-exhaustive example, foods 132 or other articles, may be pushed through parallel slots 140, or pulled up and out of parallel slots 140, to release them.

At least for ease-of-use, embodiment 138 is symmetrical, such that rotating embodiment 138 180° about a vertical axis will result in the same outward form, as not rotating it. And embodiment 138 is symmetrical, such that rotating it 180° about a front to back horizontal axis will result in the same outward form as not rotating it. Further, embodiment 138 is symmetrical, such that rotating it 180° about a side to side horizontal axis will result in the same outward form as not rotating it.

Embodiment 138 may be adapted for use with many of embodiments described herein, including at least those shown in FIGS. 3, 4, 11, 22, 34, 41, 63, 64, 81, 83, 90, and others.

Figure 17:
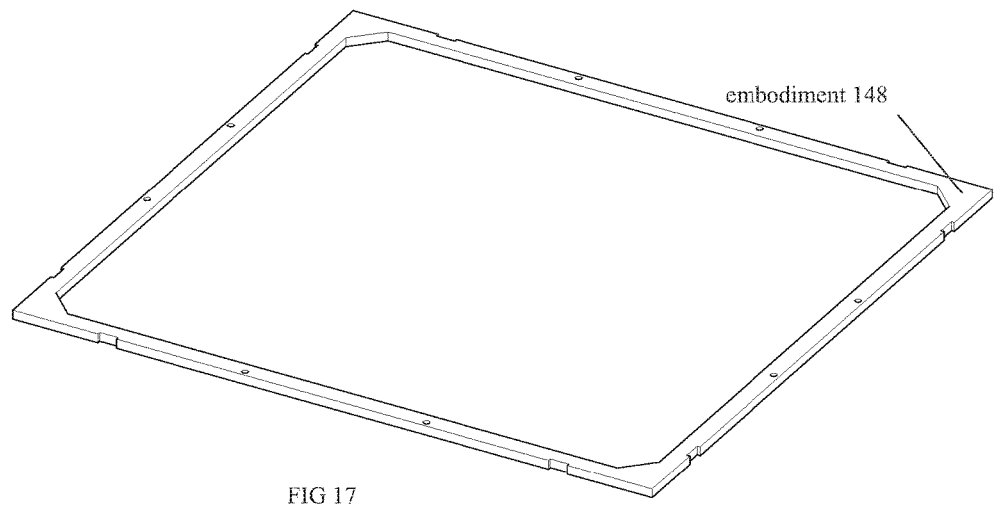
FIG. 17 is a perspective of embodiment 148.
Figure 18:
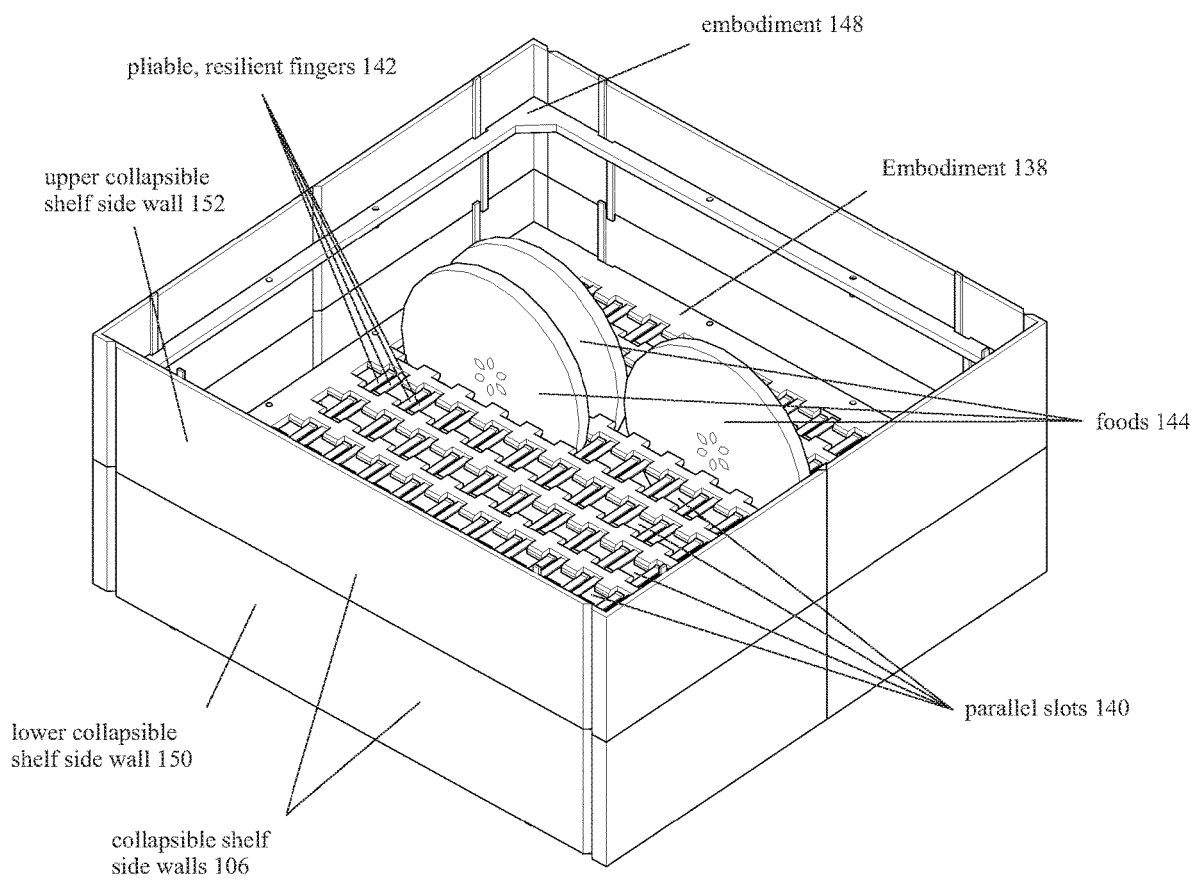
FIG. 18 is a perspective of an assemblage of embodiments 138, and 148, and adjustable shelf side walls 106.

Embodiment 148, FIGS. 17 and 18

FIGS. 17 and 18 shows embodiment 148 which is a variant of, and may replace shelf 108 (see at least FIG. 10 herein).

Referring at least to FIGS. 17 and 18, embodiment 148 provides structural rigidity to collapsible shelf sidewalls 106, when embodiment 138 is not present for any reason, including, but not limited to, the desire to have more vertical space for larger articles.

As shown particularly in FIG. 18, when placed within upper collapsible shelf side wall 152, embodiment 148 structurally supports upper collapsible shelf side wall 152 in its open position (FIG. 18), and allows upward space for larger objects resting on, and/or supported by, as a non-limiting and non-exhaustive example, embodiment 138, disposed within lower collapsible sidewall 150 (FIG. 18).

Embodiment 148, resting within upper collapsible shelf side wall 152, which in turn is resting on collapsible lower collapsible sidewall 150, may be repeated as many times as is desired, to achieve vertical space for larger foods.

At least for ease-of-use, embodiment 148 is symmetrical, such that rotating embodiment 148 180° about a vertical axis will result in the same outward form, as not rotating it. And embodiment 148 is symmetrical, such that rotating it 180° about a front to back horizontal axis will result in the same outward form as not rotating it. Further, embodiment 148 is symmetrical, such that rotating it 180° about a side to side horizontal axis will result in the same outward form as not rotating it.

Figure 19:
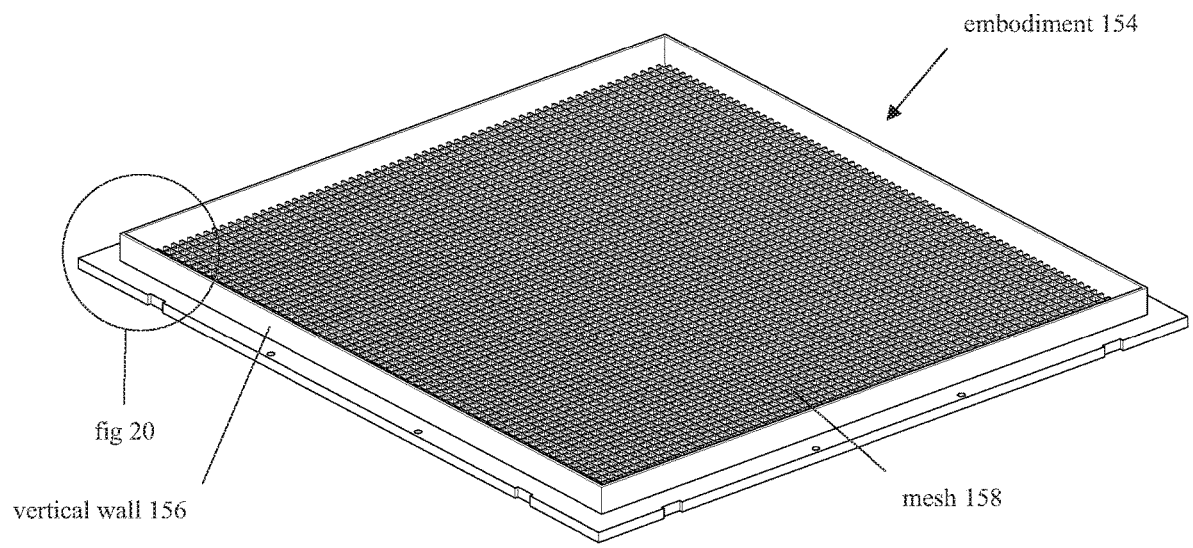
FIG. 19 is a perspective of embodiment 154.
Figure 20:
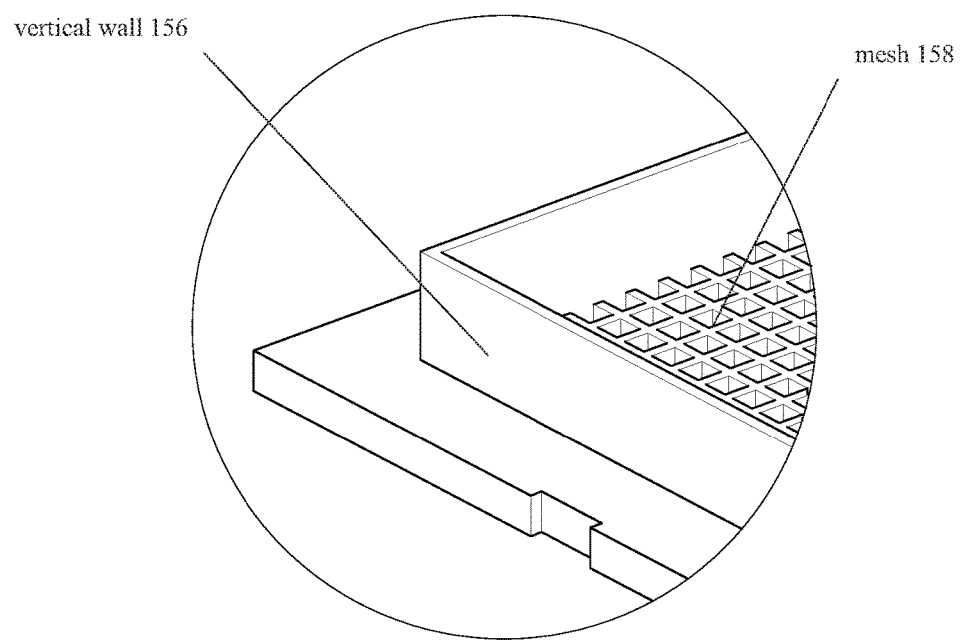
FIG. 20 is a detail of FIG. 19, as indicated in FIG. 19.

Embodiment 154, FIGS. 19 and 20

FIGS. 19 and 20 show embodiment 154, may replace shelf floor 108. Embodiment 154 may support delicate items, including but not limited to, herbs etc.

As non-limiting and non-exhaustive examples, embodiment 154 may also support membranes, such as: Teflon sheets, silicone sheets, and/or baking parchment, for making items including, but not limited to, fruit leathers, etc.

Embodiment 154 may also support larger foods, including, but not limited to, meat jerkies, fruits, and vegetables.

In embodiment 154, vertical wall 156 surrounds mesh 157, which, advantageously may have on-center openings spaced between 0.05 inches and 0.10 inches in the X and/or Y axes.

Vertical wall 156 may be advantageously dimensioned at between 0.1 inches and 1.5 inches in height.

Embodiment 159, FIGS. 21 Through 34

FIGS. 21 through 34 show embodiment 159.

Embodiment 159 includes: shelf surrounding walls 180, shelf support 164, and shelves 166.

Lid 160 couples to the upper portion of shelf surrounding walls 180.

Shelf surrounding walls 180 mount on ribs 165 (FIGS. 30 and 31) shelf support 164, which vertically suspends from it shelves 166 (at least FIGS. 25 through 28), utilizing opposing notched groove rails 168 engaging shelf projecting members 170.

Shelves 166 hold articles, including, but not limited to, foods 172, by impaling them on spikes 174 which project from open shelf frame 176.

Utility base 178 provides heated air into the bottom of embodiment 158, below shelves 166.

Shelf surrounding walls 180 enclose shelves 166 (FIG. 29).

By mounting foods to vertical surfaces, dehydrator capacity is generally greatly increased, dehydrating efficiency is increased, and dehydration times are typically reduced.

Figure 34:
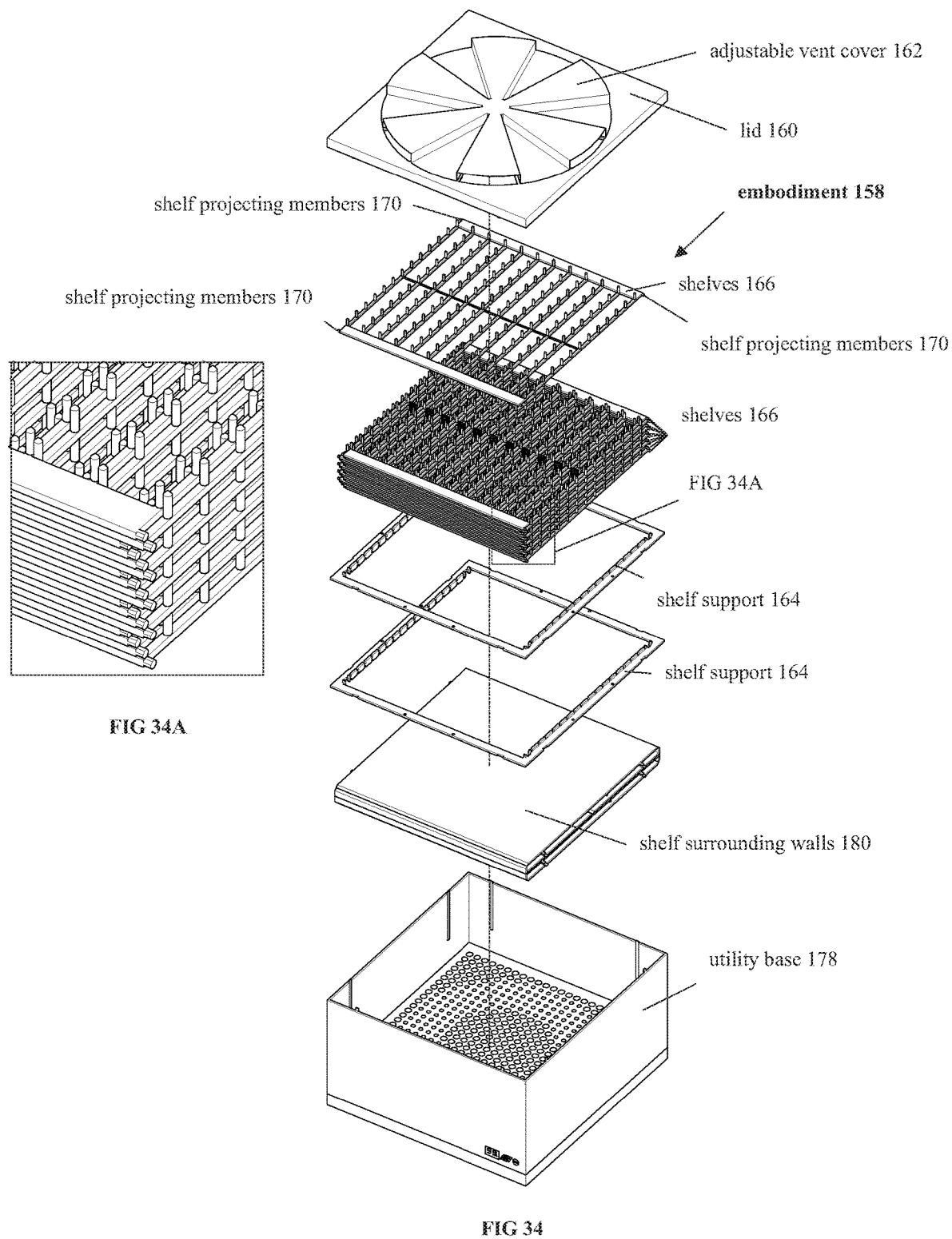
FIG. 34 is an exploded perspective of embodiment 158.

As shown in FIGS. 29 through 33, shelf surrounding walls 180 collapse, from an open disposition shown in FIGS. 29 and 30, to a compacted disposition, as shown in FIGS. 33 and 34. This is facilitated by hinge points 181, FIG. 30, which are similar to hinge points 110 described earlier herein, except they are longer. As a non-limiting and non-exhaustive example, hinge points 110 are depicted as living hinges, as described earlier herein, but may utilize other constructions, as also described earlier herein.

FIG. 34 shows how embodiment 158 stores to roughly resemble earlier FIGS. 2 and 4. As a non-limiting and non-exhaustive example, utility base 178 stores within it, in ascending order: shelf surrounding walls 180 in their compacted disposition, 2 shelf supports 164, and shelves 166. Lid 166 couples to the upper rim of utility base 178 to cap the package.

As both a non-limiting and non-exhaustive example, in use, starting from its storage position as roughly depicted in FIGS. 2 and 4 herein, lid 160 is removed and shelves 166, 2 shelf supports 164, and shelf surrounding walls 180 in their compacted disposition, are removed from utility base 178.

Shelf surrounding walls 180 are then opened (see FIGS. 30 through 33), and shelf supports 164 are placed within shelf surrounding walls 180 proximate to their upper and lower rims, resting on ribs 165.

Shelf surrounding walls are symmetrical top to bottom such that rotating them 180° around a horizontal axis, which is oriented either right to left, or for to aft, results in the same outer form for walls 180.

Shelf surrounding walls 180 are also symmetrical such that rotating them around a vertical access 180°, results in the same outward form as walls 180 not being rotated at all.

Figure 21:
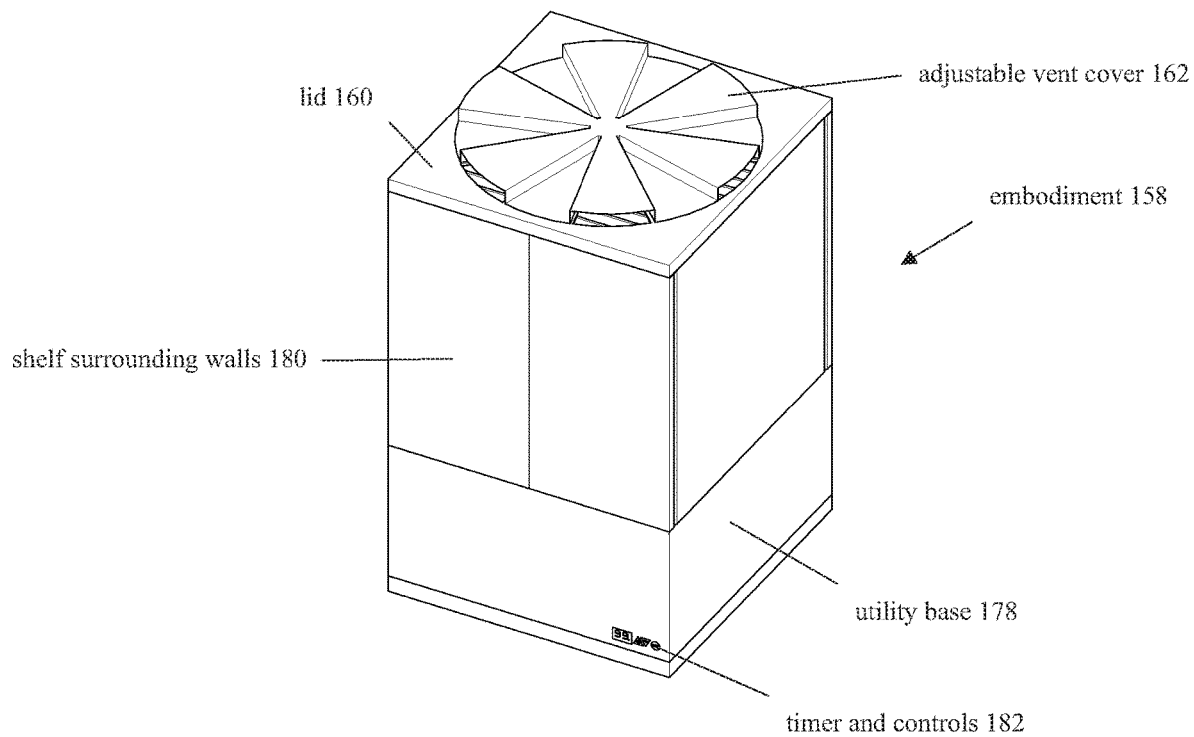
FIG. 21 is a perspective of embodiment 158, including adjustable vent cover 162, lid 160, shelf surrounding walls 180, and utility base 178.

This assembly is then placed on to the upper rim of utility base 178, as shown in FIGS. 21 and 29.

Figure 22:
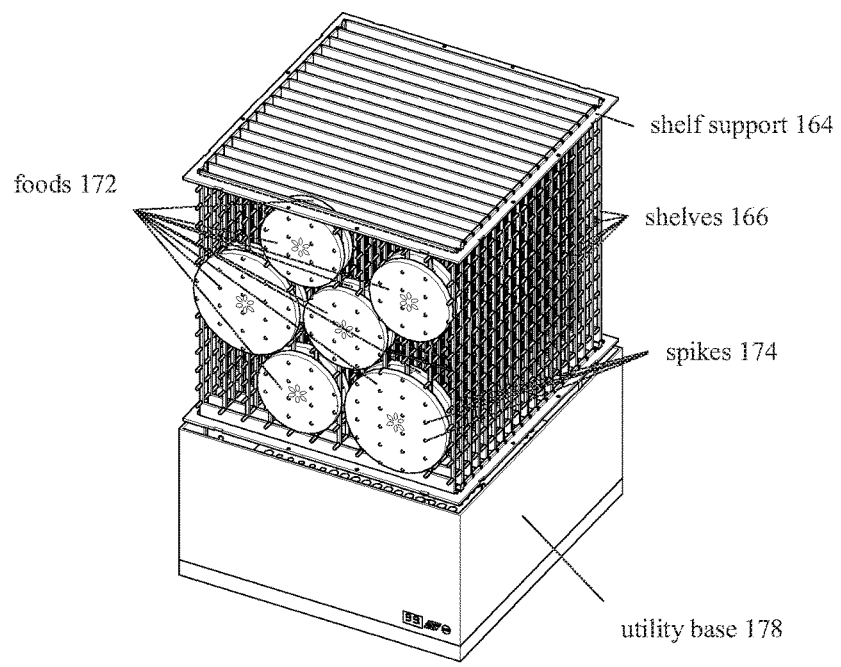
FIG. 22 is similar to FIG. 21, except adjustable vent cover 162, lid 160, and shelf surrounding walls 180 have been made invisible.
Figure 23:
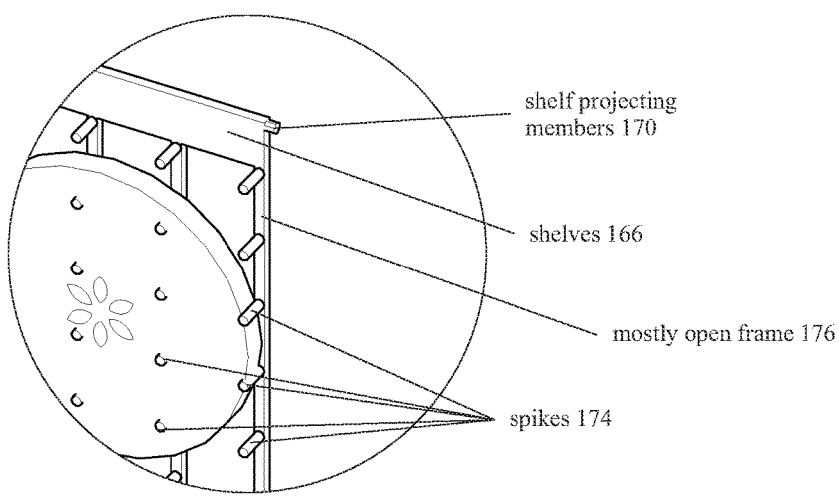
FIG. 23 is a detail of FIG. 24, as indicated in FIG. 24.
Figure 24:
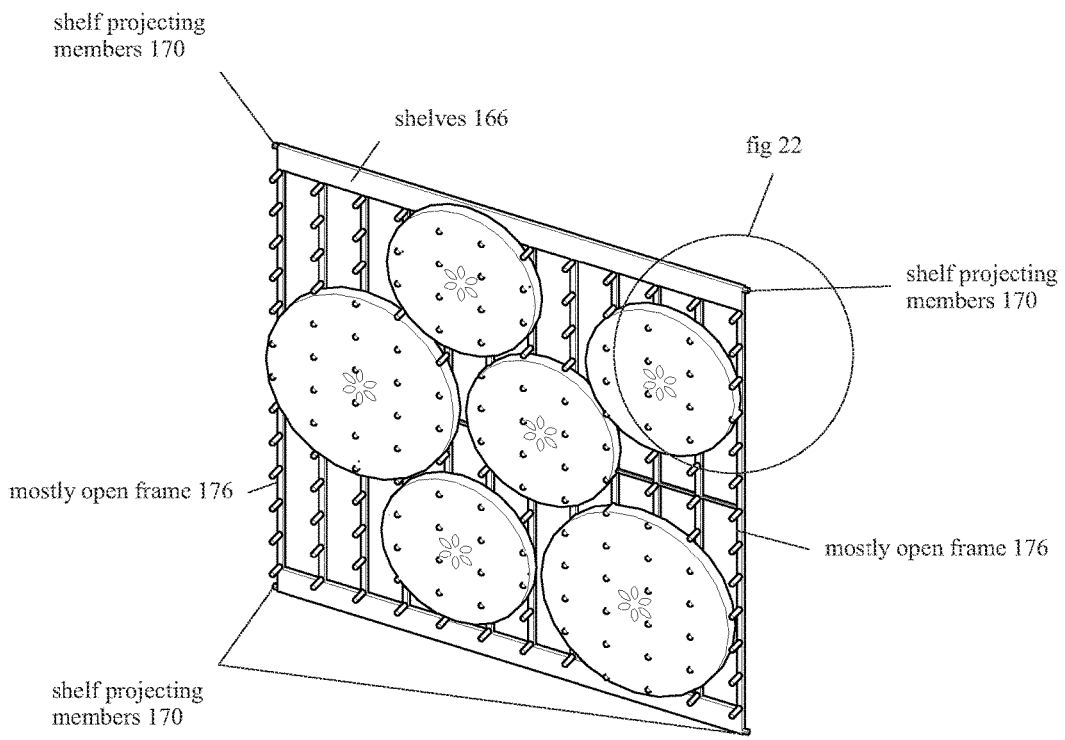
FIG. 24 is a perspective of mostly open frame 176.

Shelves 166 are then loaded with articles such as foods 172 by impaling the foods 172 on spikes 174, as shown particularly in FIG. 22. These loaded shelves are then placed into embodiment 158 and suspended from shelf support 164, as shown particularly in FIG. 22.

Lid 160 is then mounted on to the upper rim of shelf surrounding walls 180, and adjustable vent cover 162 is then set appropriately to control airflow.

Timer and controls 182 are then set and dehydration continues until heat from utility base 178 is terminated by either timer and controls 182 or by other means.

Shelves 166 are then pulled out from embodiment 158, and food removed.

Embodiment 158 may be left assembled, with shelves 166 stored inside, or it may be compacted to its storage disposition, by reversing the above procedure.

Embodiment 158 may be also operated as conventional horizontal shelf assemblies, such as, as a non-limiting and non-exhaustive example, shelf assembly 114. These may be used exclusively, or they may be disposed above and/or below other horizontal or vertical shelves.

Embodiment 184, FIGS. 35 Through 42

FIGS. 35 through 42 depict embodiment 184, which is comprised of collapsible shelf side walls 186 and one or more folding shelf floors 188.

Collapsible shelf side walls 186 may be constructed similarly to collapsible shelf side walls 106 shown in FIGS. 7, 8, and 9 earlier herein.

Figure 41:
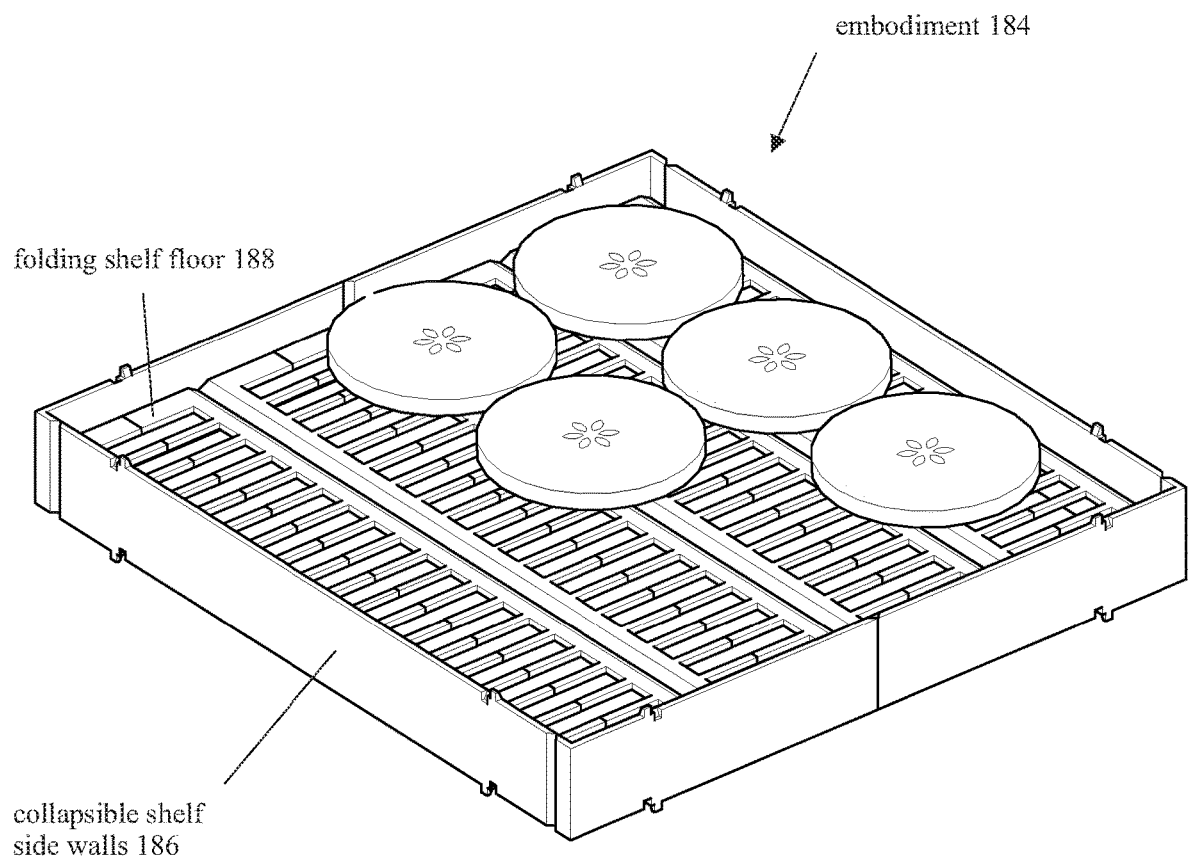
FIG. 41 is a perspective of embodiment 184, including collapsible shelf side walls 186, and folding shelf floor 188.
Figure 42:
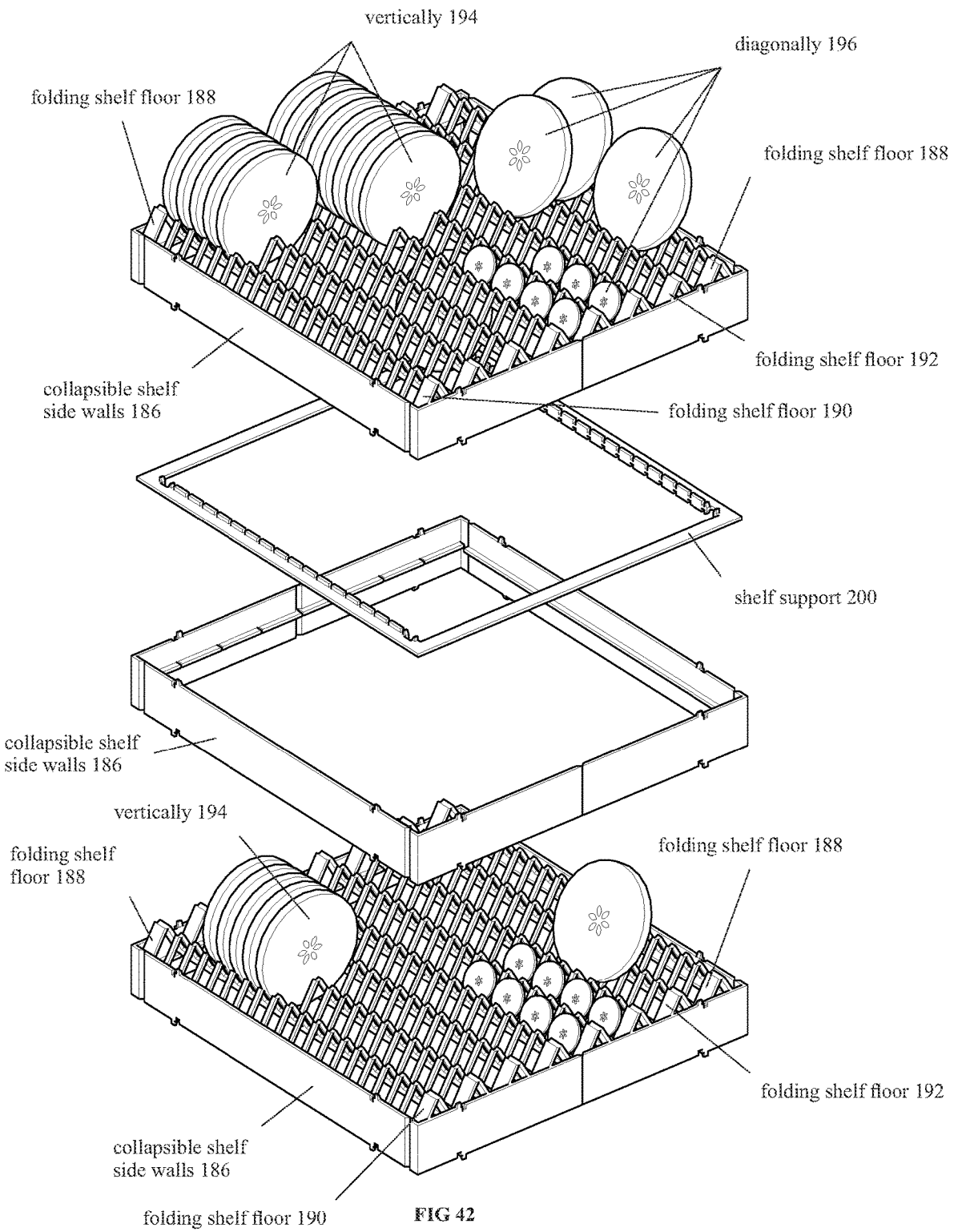
FIG. 42 is an exploded perspective showing folding shelf floor 188 in its folded zigzag condition holding articles to be dehydrated vertically 194 and diagonally 196, and including collapsible shelf side walls 186 and the use of shelf support 200.

As shown in FIGS. 35, 36, 37, and 38, folding shelf floor 188, has a plurality of hinge points 198, which configure folding shelf floor 188 to fold flat, as shown in FIGS. 35, 36 and 41, and configure folding shelf floor 188 to fold zigzag, as shown in FIGS. 37, 38, and 42.

Hinge points 198 may be structured as molded-in living hinges as shown, or they may be of other hinge constructions, such as, by way of non-limiting and non-exhaustive examples, door hinge construction, plastic tool chest hinge construction, closet storage bin hinge construction, plastic lunchbox hinge construction, or other suitable hinge construction.

Embodiment 184 has several variants. As non-limiting and non-exhaustive examples, FIGS. 35 and 41 show how a single folding shelf floor 188, may be used as a simple, grated, flat tray, just by placing a single folding shelf floor 188 in its unfolded condition, into open collapsible shelf side wall 186.

As another non-limiting and non-exhaustive example, FIGS. 37, 38, and 42, show how 2 folding shelf floors 190 and 192, when in their folded zigzag condition and inserted into collapsible shelf side wall 186 (FIG. 42 in particular), may form a multipurpose tray, which can hold articles at least vertically 194, diagonally 196, and horizontally (by placing articles horizontally on the upper peaks of the angled, zigzag, floor walls).

When articles are held vertically 194 or diagonally 196, greater shelf space utilization efficiency may be achieved.

Placing articles horizontally on the upper peaks of angled zigzag walls, may increase dehydration efficiency.

As shown in FIG. 42, one or more collapsible shelf sidewalls 186 may also hold open frames, such as shelf support 200; and alone, or stacked with other like members, permit larger and taller articles to be supported by embodiment 184, in either its flat floor tray condition (FIG. 41), or in its zigzag floor condition (FIG. 42).

It's easy to see how embodiment 184 could be adapted for use in a variety of household appliances, ranging from toaster ovens, to dishwashers, to refrigerators, to other suitable appliances.

Figure 81:
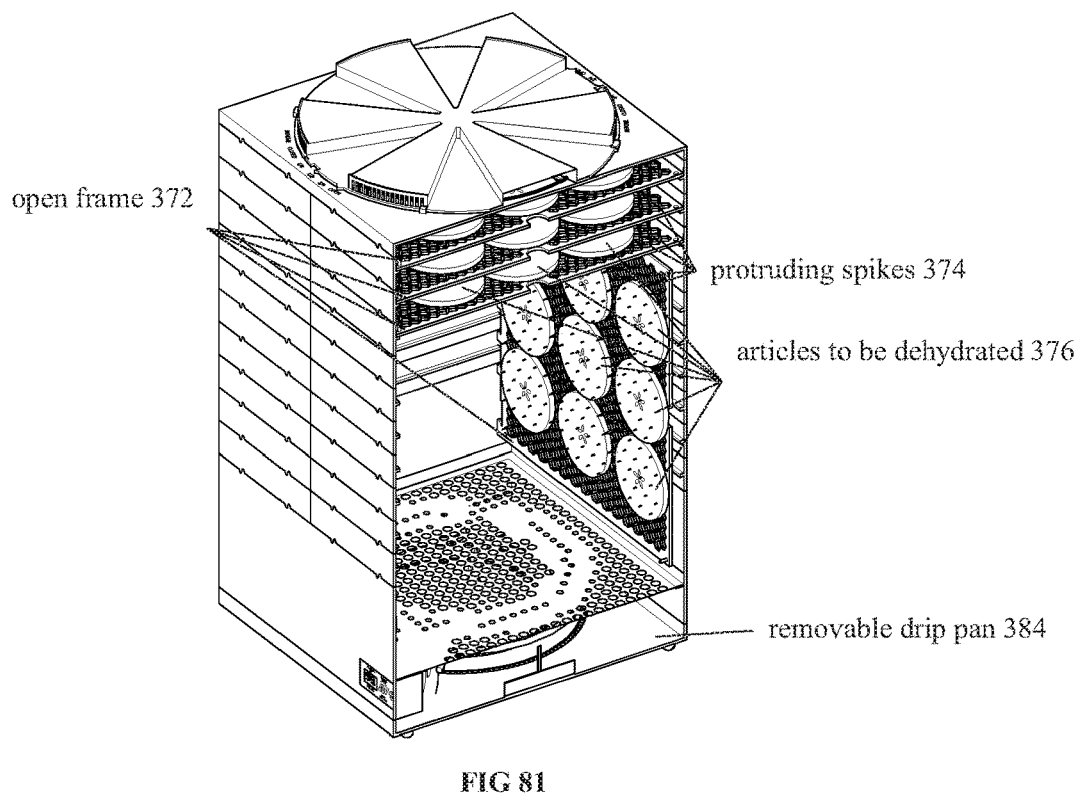
FIG. 81 is a section through FIG. 80, as indicated in FIG. 80.

It's also easy to see how embodiment 184 could be used alone, or in combination with other shelf constructions shown herein, including, but not limited to, those of embodiments 100, 158, and 300, by simply stacking embodiment 184 above and/or below trays shown in embodiments 100, 158 and/or 300 (see FIG. 81 as a non-limiting and non-exhaustive example).

Figure 43:
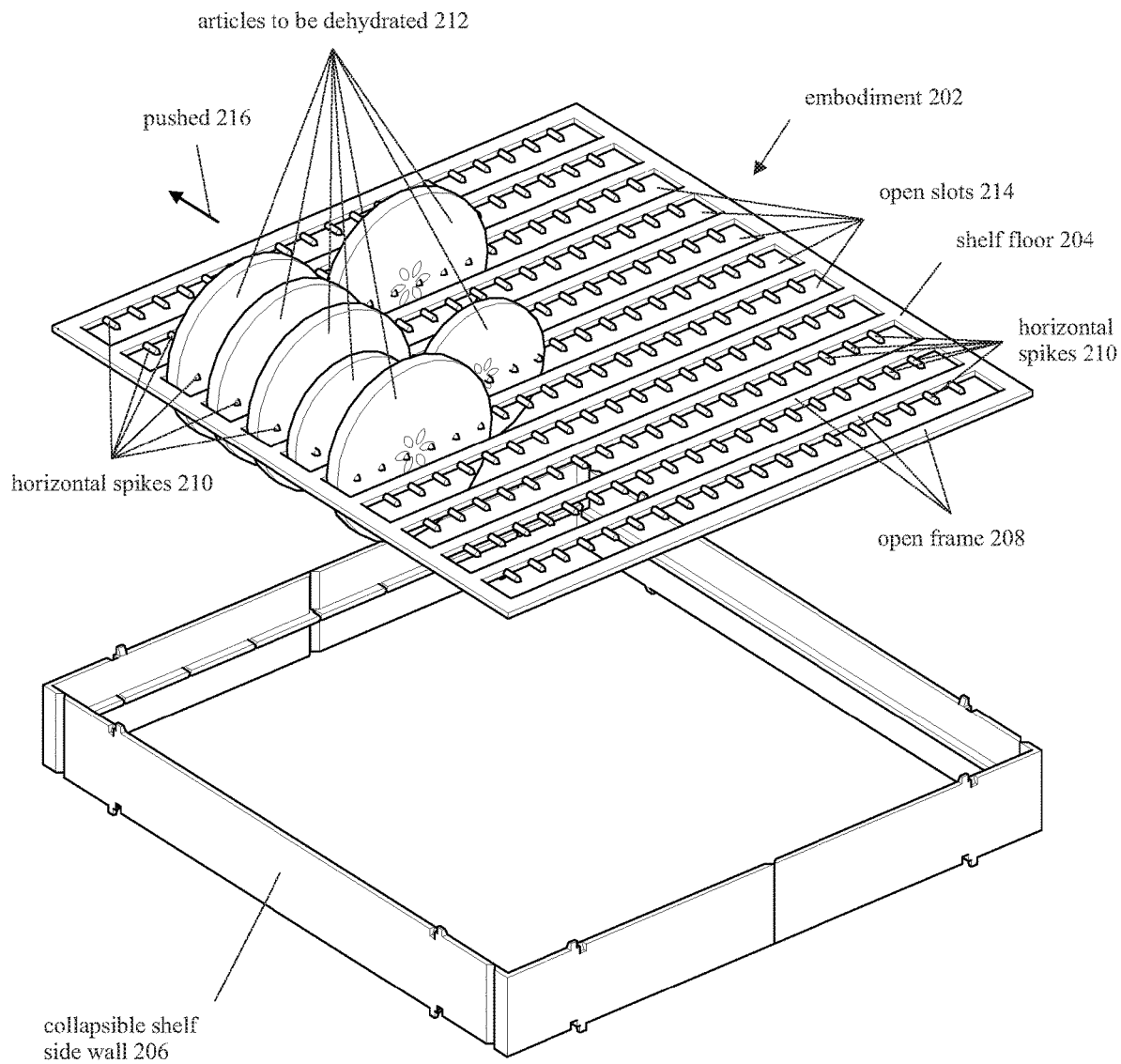
FIG. 43 is an exploded perspective of embodiment 202, including collapsible shelf side walls 206.

Embodiment 202, FIG. 43

FIG. 43 shows embodiment 202 which is comprised of shelf floor 204 disposed within collapsible shelf side wall 206, which is constructed similarly to other collapsible shelf side walls shown herein (see FIGS. 7 through 9 herein as a non-limiting and non-exhaustive example).

Shelf floor 204 is comprised of open frame 208 which supports horizontal spikes 210 within open slots 214.

As shown in FIG. 43, in use, articles, including, but not limited to articles to be dehydrated 212, are vertically lowered into open slots 214, and horizontally pushed 216 onto and impaled on spikes 210.

It's easy to see how embodiment 202 could be adapted for use in a variety of household appliances, ranging from toaster ovens, to food steamers, to other suitable appliances.

It's also easy to see how embodiment 202 could be used alone, or in combination with other shelf constructions shown herein, including, but not limited to, those of embodiments 100, 158, and 300 by simply stacking embodiment 184 above and/or below trays shown in embodiments 100, 158 and/or 300 (see FIGS. 7 through 9 herein as a non-limiting and non-exhaustive example).

Figure 44:
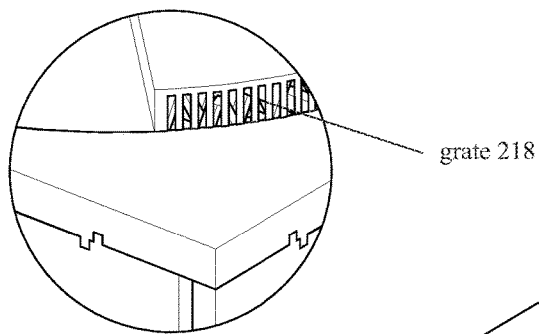
FIG. 44 is a detail of FIG. 45, as indicated in FIG. 45.
Figure 45:
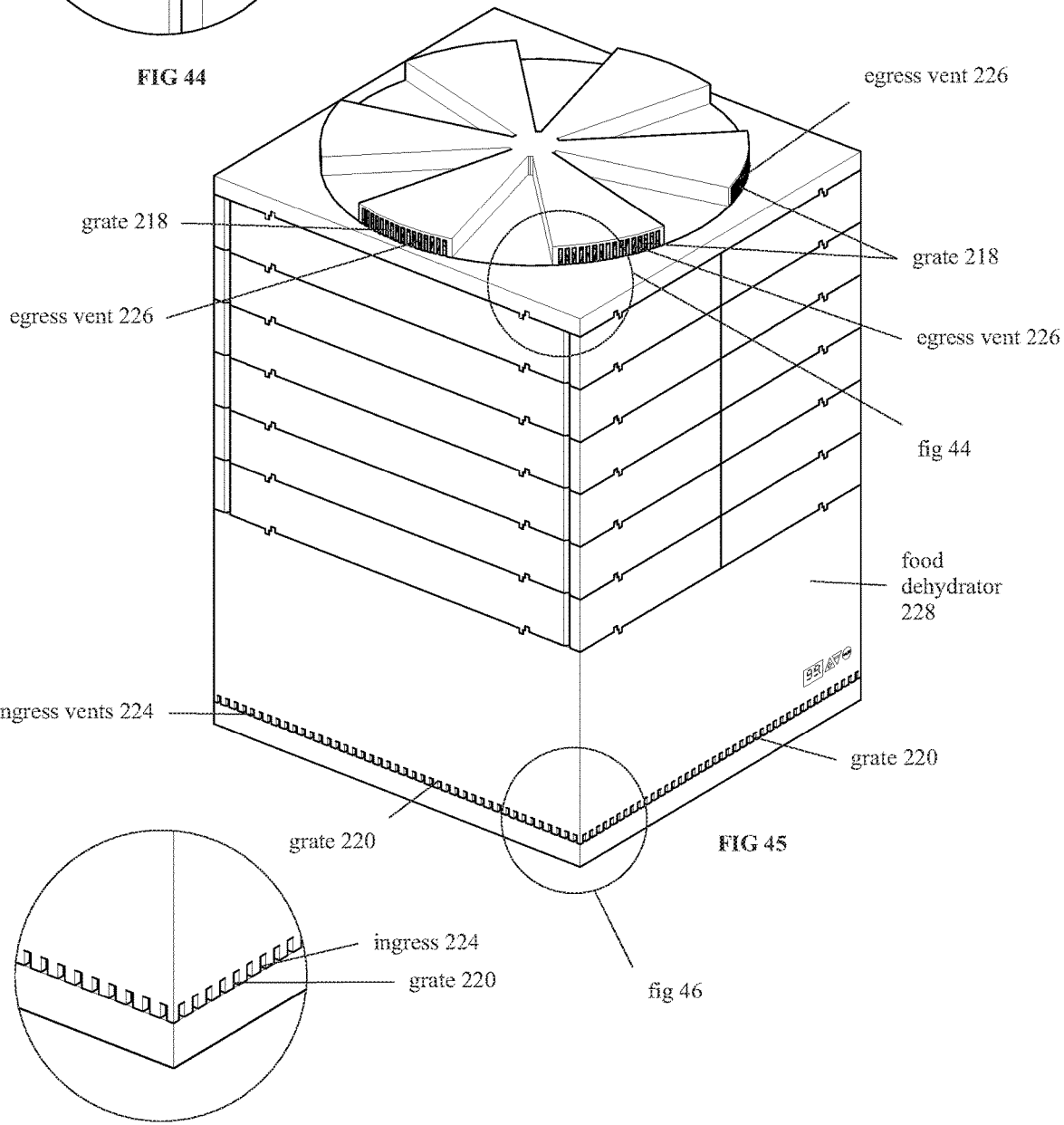
FIG. 45 is a perspective showing ingress vents 224 and egress vents 226.
Figure 46:
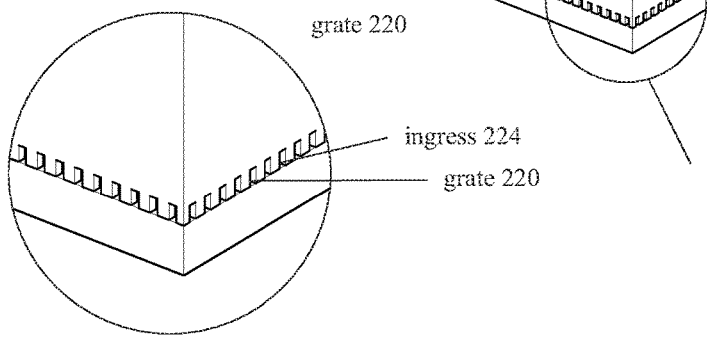
FIG. 46 is a detail of FIG. 45, as indicated in FIG. 45.
Figure 47:
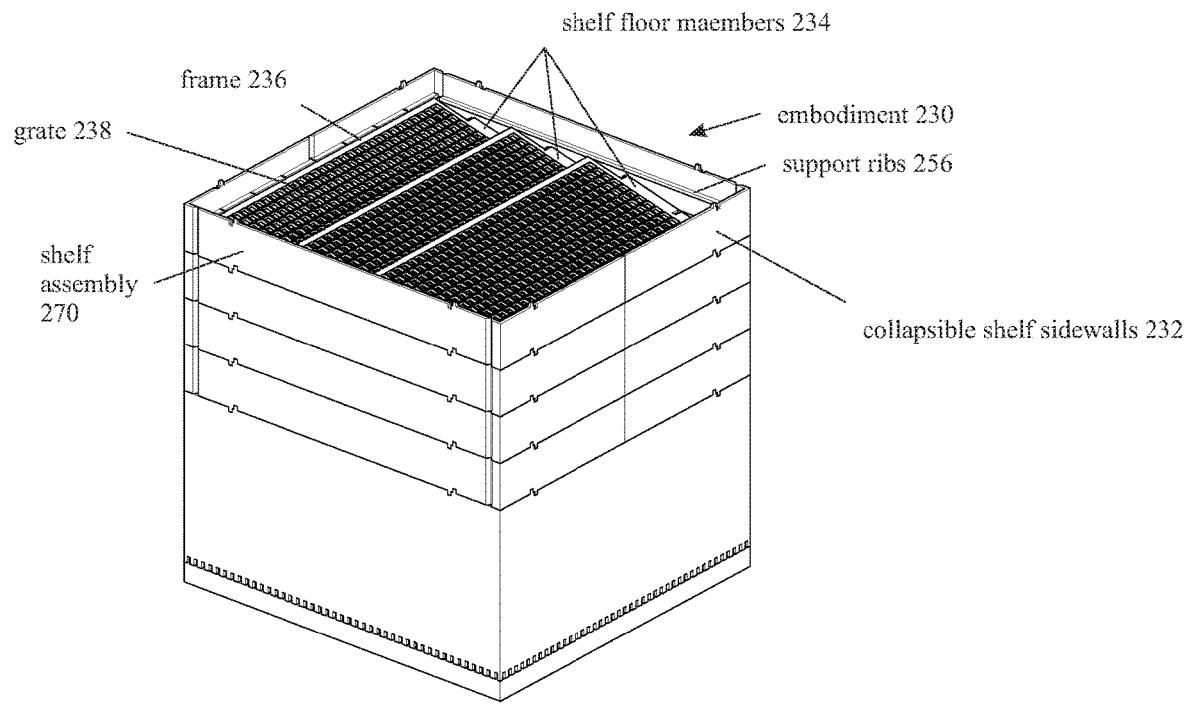
FIG. 47 is a perspective of embodiment 230.
Figure 48:
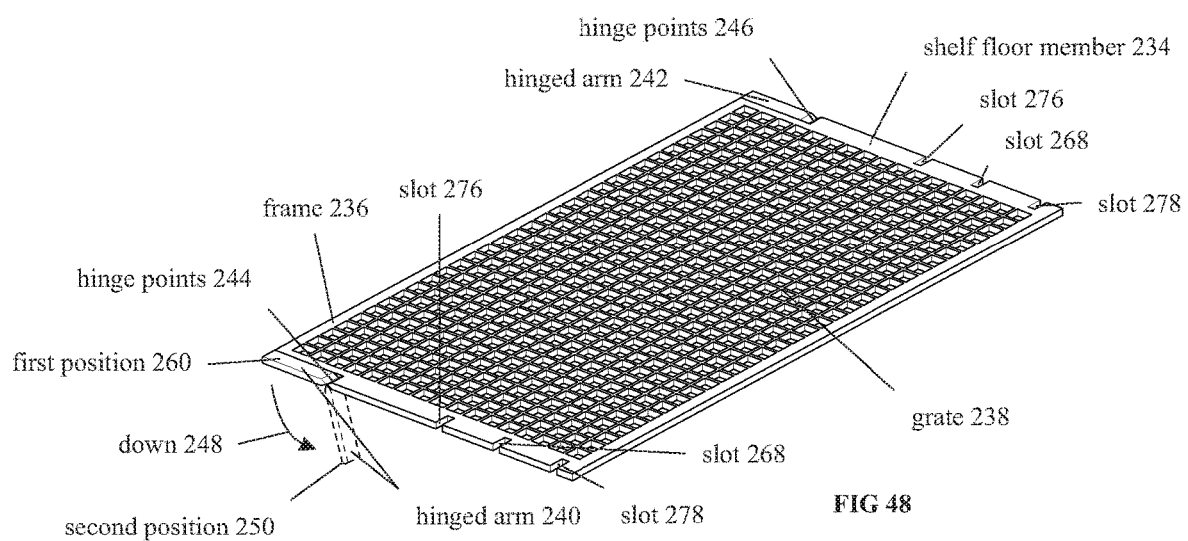
FIG. 48 is a perspective of shelf floor member 234.

Embodiment 218, FIGS. 44, 45 and 46

FIGS. 44, 45, and 46, show embodiment 218 which includes, ingress vents 224 and egress vents 226, having greats 218 and 220 which are fine enough to prevent a 0.1 inch diameter sphere from entering into the interior of the food dehydrator.

Having grates 218 220 across ingress 224 and egress 226 vents, may help prevent debris and pollutants from entering into food dehydrator 228. It may also repel insects and wildlife. Additionally, it may help prevent rain or liquids from entering into food dehydrator 228.

Embodiment 230, FIGS. 47, 48, 49, 50, 51, 52, 53, 54, 55, 56, and 57

FIGS. 47 to 57 show embodiment 230, which comprises collapsible shelf sidewalls 232, which support and surround, in various configurations, shelf floor members 234.

Shelf floor member 234 is comprised of grate 238, which on its periphery is surrounded by frame 236.

On its upper right and left corners, frame 236 is coupled through hinge points 244 to hinged arms 240 and 242 (FIG. 48 in particular), which are configured to move from first position 260, where they are coplanar with grate 238, down 248 to second position 250 (shown in dotted lines in FIG. 48), where, by resting on support ribs 256, which are disposed on the inside of collapsible shelf sidewalls 232 (FIGS. 55 through 57 in particular), are configured to support grate 238, in a diagonal disposition, such as shown in FIGS. 51 through 57.

Figure 55:
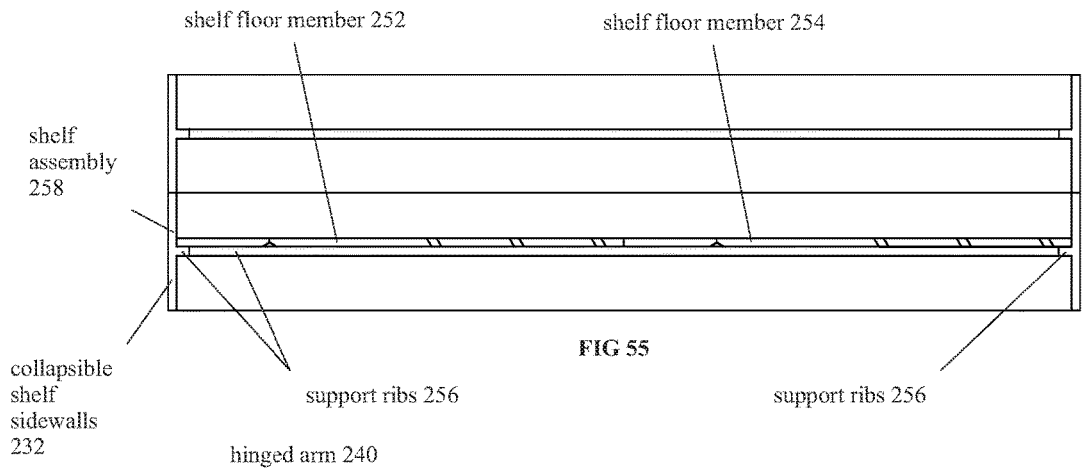
FIG. 55 is a side view section of FIG. 50, as indicated in FIG. 50.

FIGS. 50 and 55 show how two shelf floor members 252 254, with hinged arms 240 and 242 in first position 260, and resting on support ribs 256, which are disposed within collapsible shelf sidewalls 232, can, in combination, form shelf assembly 258 (FIGS. 50 and 55), which functions as a flat, open grate tray.

Figure 56:
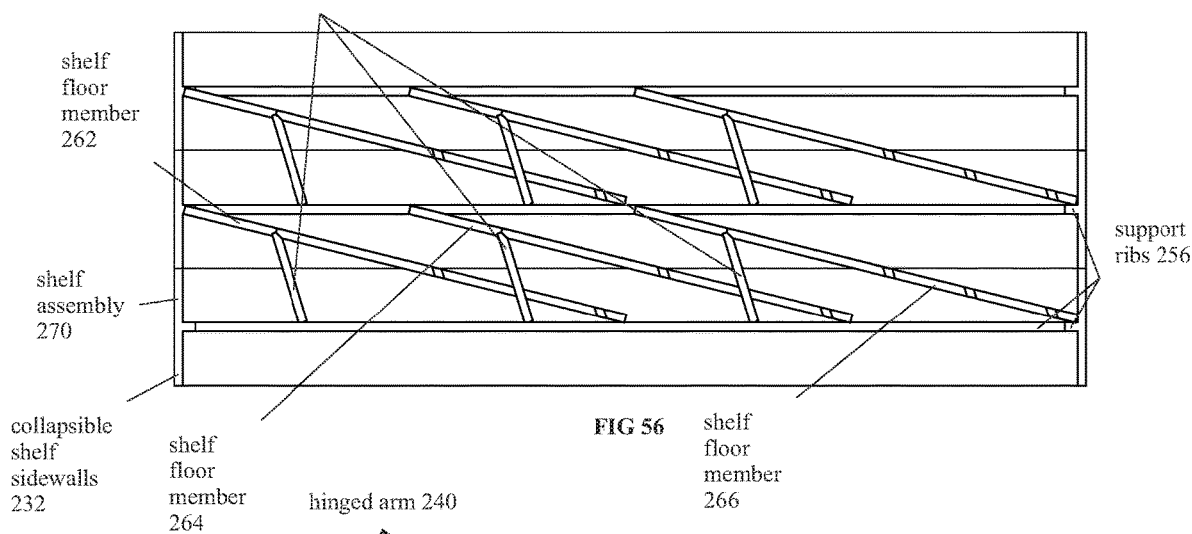
FIG. 56 is a side view section of FIG. 52, as indicated in FIG. 52.

FIGS. 52 and 56 show how shelf floor member 262, shelf floor member 264, and shelf floor member 266, with hinged arms 240 and 242 in their second positions 250 and projecting through slots 268 (FIG. 48), and resting on support ribs 256, can form shelf assembly 270, which has 50% more shelf surface area than flat shelf assembly 258 (FIGS. 49, 50, and 55).

Figure 57:
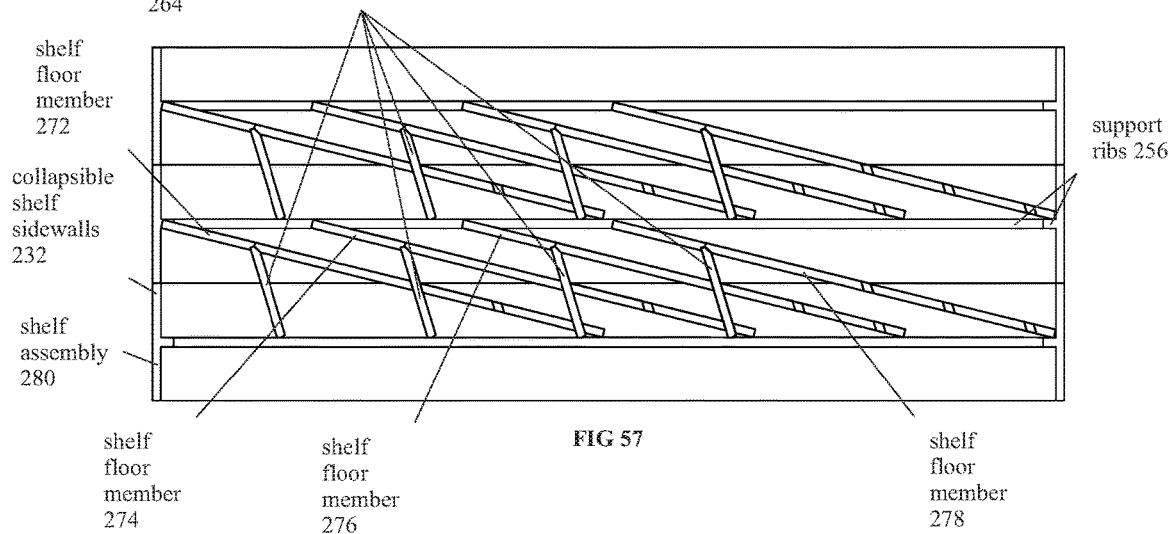
FIG. 57 is a side view section of FIG. 54, as indicated in FIG. 54.

FIGS. 53, 54, and 57 show how shelf floor member 272, shelf floor member 274, shelf floor member 276, and shelf floor member 278, with hinged arms 240 and 242 in their second positions 250 and projecting through slot 276 and slot 278 (FIG. 48), can form shelf assembly 280, which has 100% more shelf surface area than shelf assembly 258.

As a non-limiting and non-exhaustive example, in use, collapsible shelf sidewalls 232 are manipulated to their open position (FIG. 4), and shelf floor members 234 are loaded with articles to be dehydrated and are placed on support ribs 256 in one or more of the configurations described above.

Shelf assembly 258, shelf assembly 270, shelf assembly 280, as well as other horizontal and vertical shelves described herein, can be mixed and/or matched in any advantageous order.

Dehydration is then implemented.

After dehydration, shelf floor members are then removed from shelf sidewalls 232, and the dehydrated articles are removed.

Embodiment 282, FIGS. 58, 59, and 60

FIGS. 58 through 60 show embodiment 282, which is a shelving system for use within an apparatus. Embodiment 282 may impale articles on spikes 284 supported by vertical frame 286, and/or it also may be used horizontally in modes described earlier for embodiment 184.

Embodiment 282 comprises: shelf support 288, which is configured to suspend folding shelf floor 290 through engagement between notched hanging rails 292 disposed on the interior of shelf support 288, and hanging hooks 294, disposed proximate to all four corners of folding shelf floor 290.

Interruptions 296 in notched hanging rails 292 permit folding shelf 292 to be dropped directly downward without bumping into hanging rail 292 or having to angle folding shelf 292, during insertion or removal of folding shelf 292 into or out of shelf support 288.

In use, as a non-limiting and non-exhaustive example, folding shelf floor 290 loaded with articles may be unfolded flat, disposed vertically, dropped downward through interruptions 296, (as seen in FIG. 59), and pushed or pulled along notched hanging rails 292 until they are in a desired location and engagement is made between notches in notched hanging rails 292 and hanging hooks 294.

Alternatively, one or more folding shelf floors 290 may be used in combination with horizontal shelf support frames 298 to provide the operating modes described earlier for embodiment 184.

Shelf support 288 is symmetrical front to back, side to side, and up and down.

Folding shelf floor, in its vertical position, is symmetrical top to bottom, and side to side.

Horizontal shelf support frames are symmetrical front to back, side to side, and up and down.

Each of these symmetries increases user ease-of-use, by providing a user with a higher percentage of correct use conditions.

As with many embodiments herein, embodiment 282 may be used in combination with other shelves, and shelf frames, shown herein.

As non-limiting and non-exhaustive examples, horizontal, diagonal, and/or vertical shelf embodiments shown herein, could be adapted and placed, in any combination or permutation, above and/or below embodiment 282.

Embodiment 300, FIG. 61 Through 66

Embodiment 300 comprises lid 302, including detachable, adjustable vent cover 304, which through user rotation, controls the amount of airflow through embodiment 300.

Lid 302 detachably couples to the upper rim of vertical shelf support 306, which has notched hanging rails 308 to suspend horizontal/vertical frames 310.

Frames 310 include on their forward faces, spikes 312, which are configured to support articles, including, but not limited to food 316, on the tips of spikes 312, primarily when frames 310 are disposed face up horizontally; and spikes 312 are also configured to impale foods and other articles (FIG. 62), primarily when horizontal/vertical frames 310 are mounted vertically.

On the back of frames 310 there is a perforated support surface which is configured to mount foods and other articles, particularly when frames 310 are horizontal.

Vertical shelf support 306 is collapsible for storage or other purposes, similar to FIGS. 7, 8, and 9 earlier herein; and is configured to couple to the upper rim of collapsible shelf support sidewall 311. Sidewall 311 is identical in configuration with collapsible shelf support sidewalls 314 which are stacked one on top of the other, directly below sidewall 311, with each sidewall 314 resting on the upper rim of the one below it. Sidewalls 314 also collapse similar to FIGS. 7, 8, and 9 earlier herein.

Figure 61:
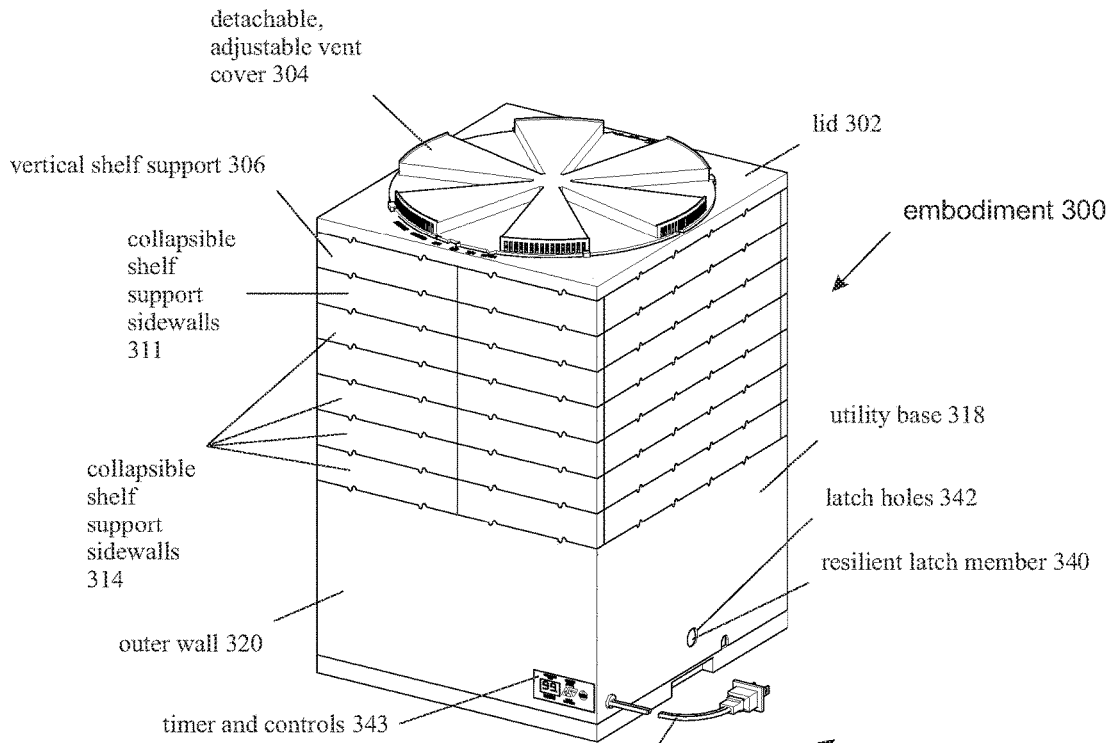
FIG. 61 is a perspective of embodiment 300.
Figure 62:
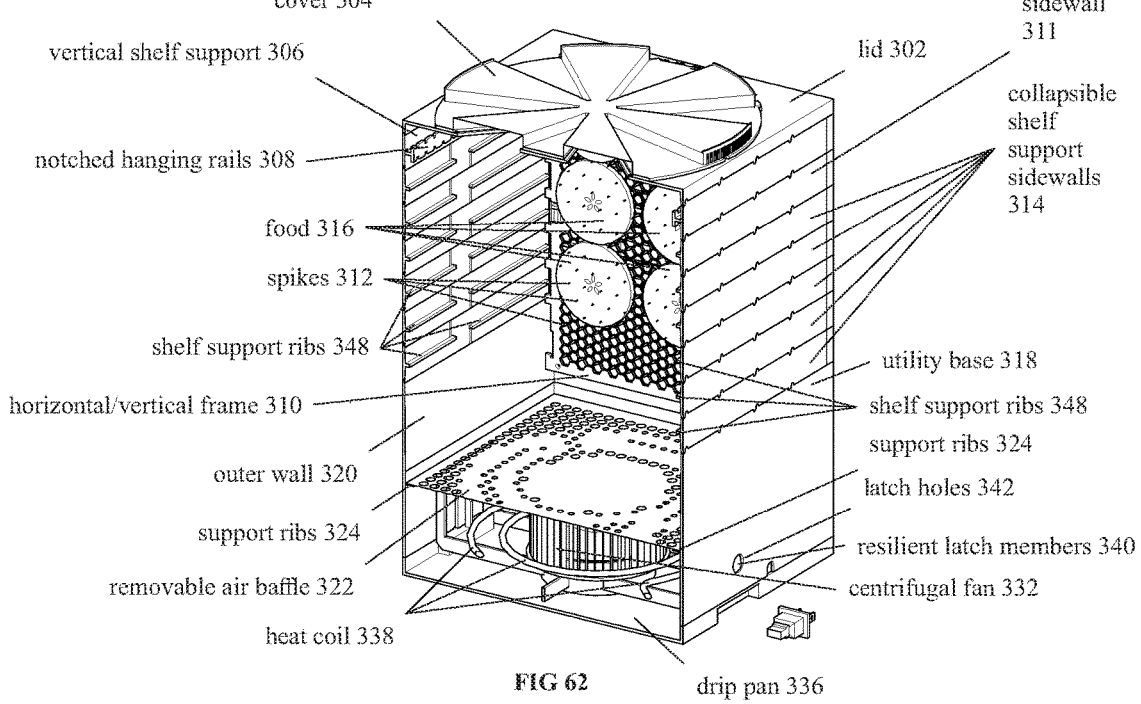
FIG. 62 is a perspective section taken through FIG. 61, as indicated in FIG. 61.
Figure 63:
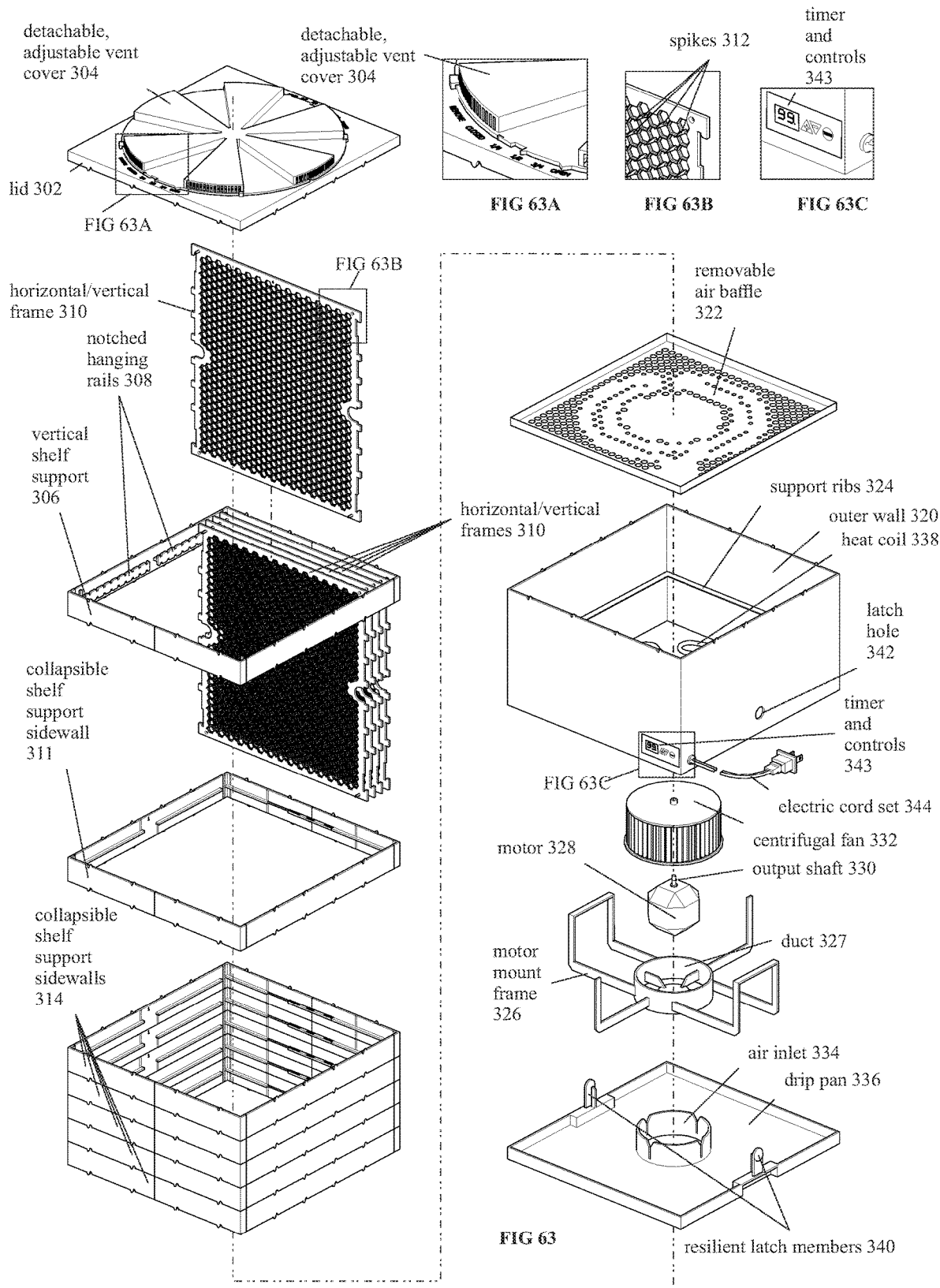
FIG. 63 is an exploded perspective of embodiment 300.
Figure 64:
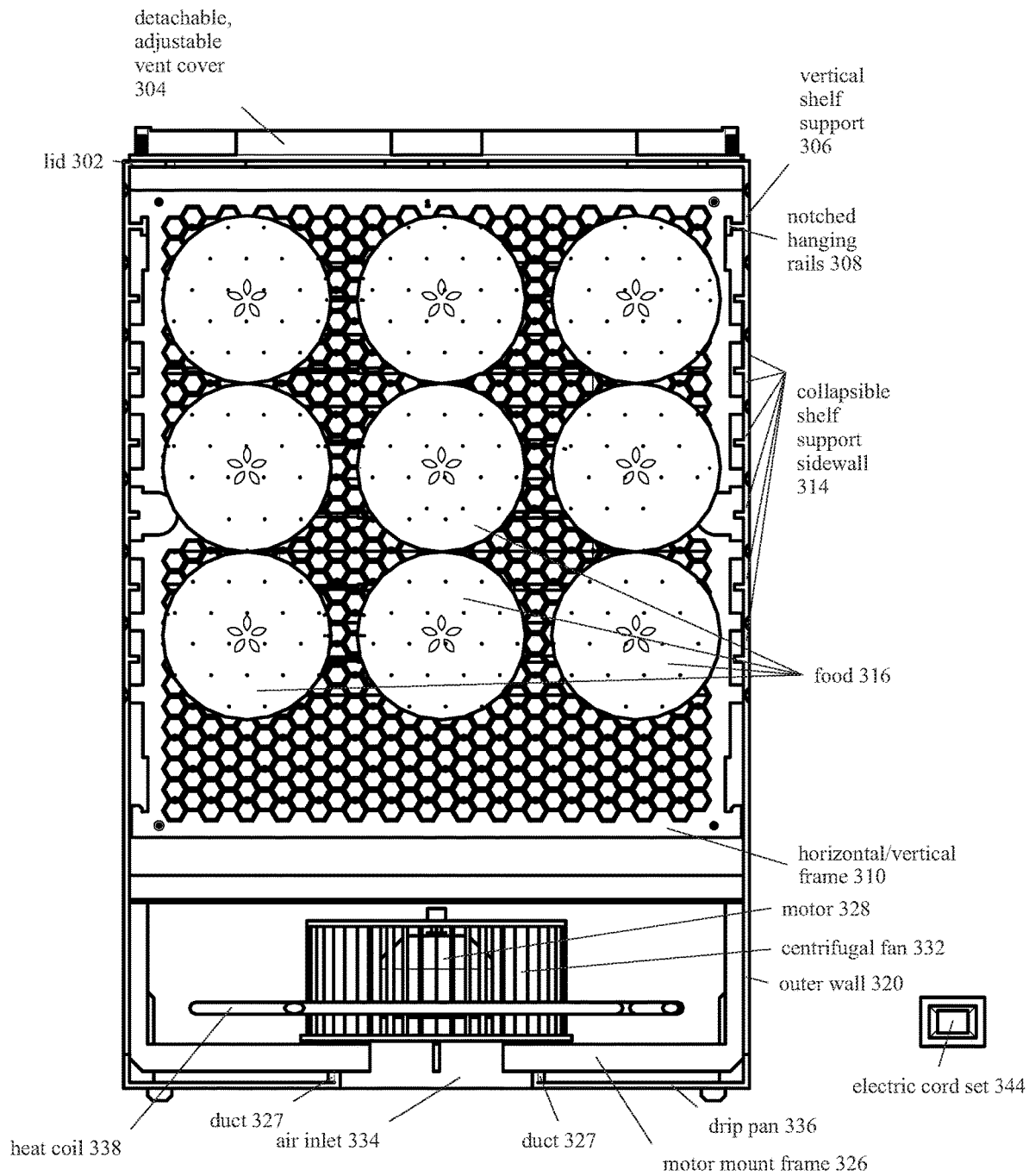
FIG. 64 is an orthogonal section taken through FIG. 61, as indicated in FIG. 61.
Figures 65, 66:
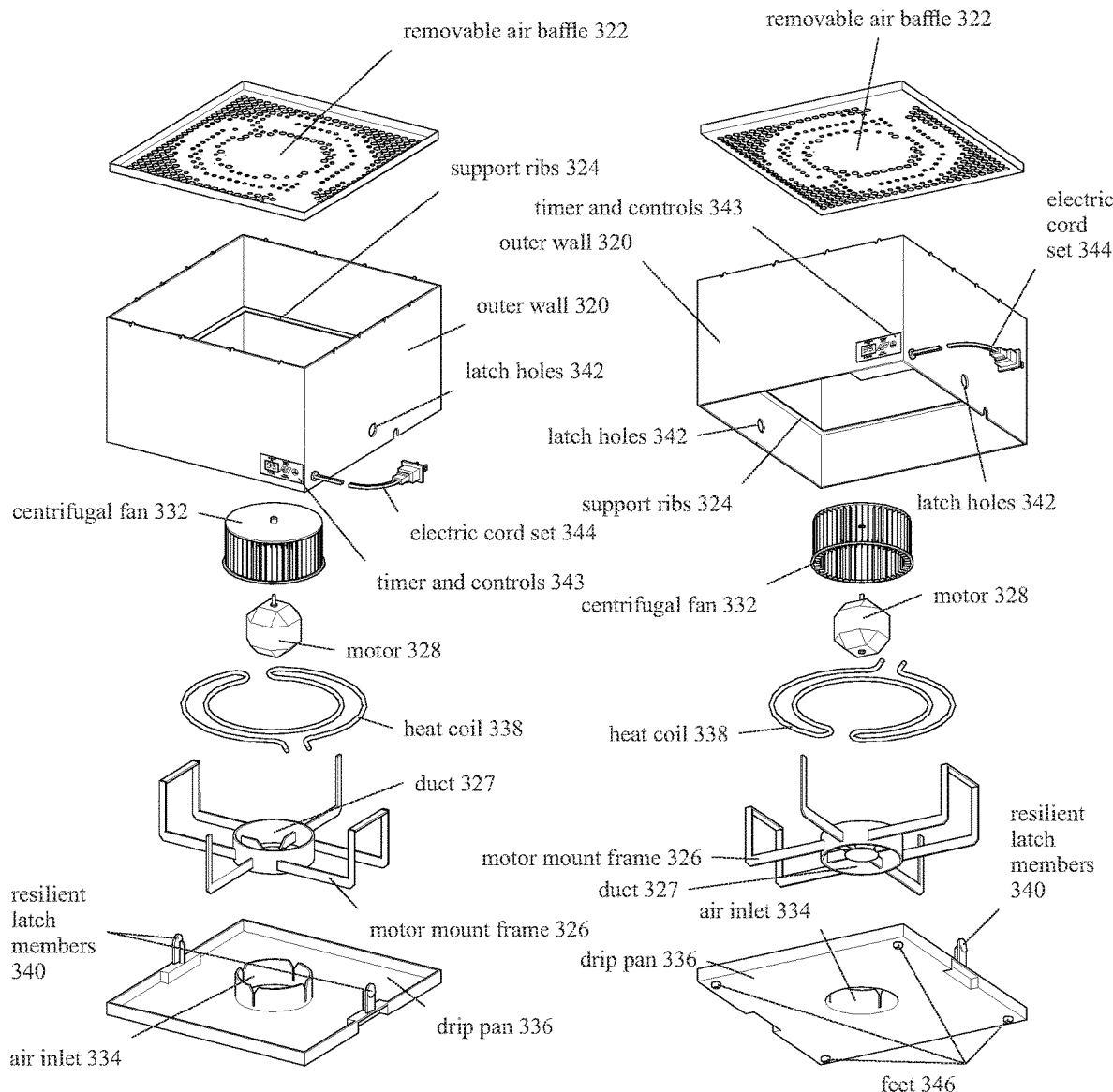
FIG. 65 is an exploded perspective of utility base 318 and drip pan 336, taken from above.
FIG. 66 is an exploded perspective of utility base 318 and drip pan 336, taken from below.
Figure 67:
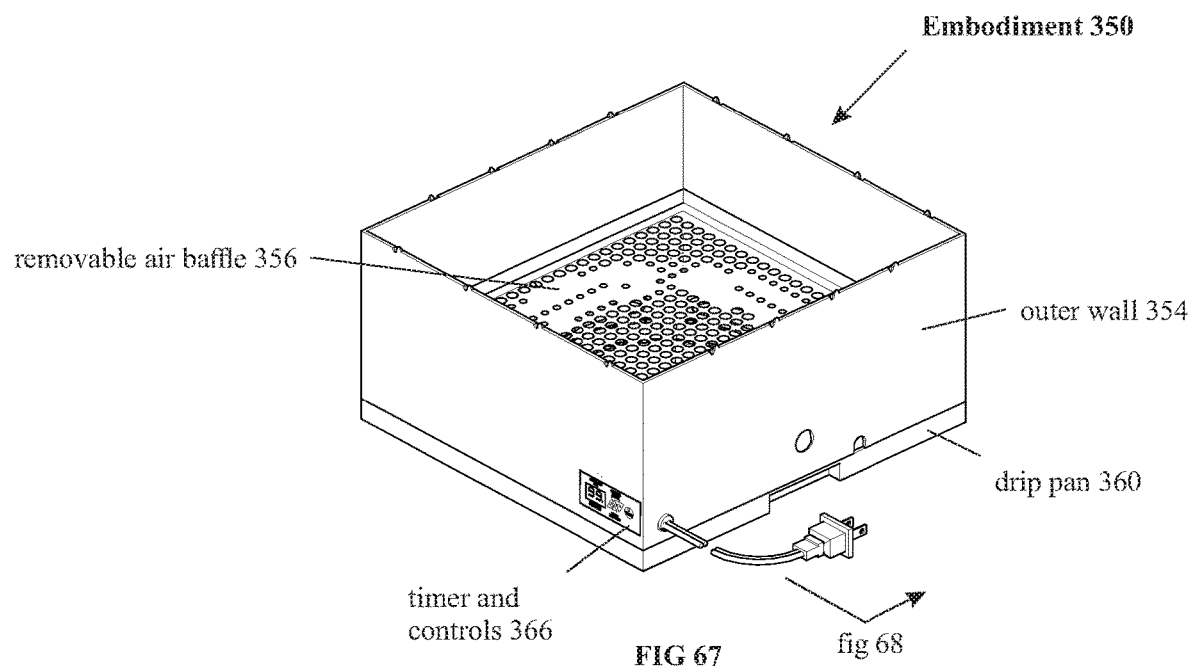
FIG. 67 is a perspective of embodiment 350.

Utility base 318, on its upper rim, is configured to couple to the lower rim of bottom most sidewall 314, on the stack of sidewalls 314 (FIGS. 61 and 62).

Utility base 318 is comprised of outer wall 320, which supports removable air baffle 322 on the upper surfaces of support ribs 324, and on its lower side, support ribs 324 engage and hold motor mount frame 326, which in turn mounts motor 328, which in turn, on its output shaft 330, mounts centrifugal fan 332.

Directly below where motor mount frame 326 couples to motor 328, frame 326 has duct 327, which is open and telescopically couples within air inlet 334, which is disposed in the center of drip pan 336.

Air inlet 334 may be blocked by a mesh grill having openings which will prevent spherical objects larger than 0.1 inches from entering. This may help prevent debris, insects, and other objects from entering Drip pan 336 removably couples to utility base outer wall 320, by resilient latch members 340, engaging latch holes 342, as shown in FIGS. 61 and 62 in particular. Drip pan 336 is held off face-to-face contact with underlying support surfaces, by feet 346 attached to the lower surface of drip pan's 336 floor.

Also attached to motor mount frame 326 by insulators, is heat coil 338.

Outer wall 320 also mounts timer and controls 343, which may control any, none, or all of: the duration of dehydration, the air temperature used in dehydration, whether or not motor 328 and centrifugal fan 332 are used in dehydration in conjunction with or without heat coil 338, and/or may control other functions.

Heat coil 338 may operate at one or more power settings. As a non-limiting and non-exhaustive example, when embodiment 300 is operating with motor 328 activated, heat coil 338 may be set to utilize more power, than when embodiment 300 is operating without motor 328 being activated. Likewise, heat coil 338 may have high and low settings when it is not operating in conjunction with motor 328 and fan 332.

Electric cord set 344 supplies electric power to embodiment 300.

Vertical/horizontal frames 310, vertical shelf support 306, and collapsible shelf support sidewalls 314, may be stored inside the upper portion of outer wall 320, above removable air baffle 322, in a manner similar to that shown in FIGS. 3, 4, and 11 herein.

In use, as both a non-limiting and non-exhaustive example, starting from FIG. 61, the user removes lid 302 and horizontal/vertical frames 310, and loads foods 316 onto horizontal/vertical frames 310 by impaling articles, such as foods 316 with spikes 312, as shown in FIG. 62.

The user then re-inserts the loaded horizontal/vertical frames 310 back into the cavity formed by vertical shelf support 306, and collapsible shelf support sidewalls 311 and 314, and hangs horizontal/vertical frames 310 on notched hanging rails 308.

The user then sets timer and controls 343 to the desired dehydrating condition, and turns detachable adjustable vent cover 304 clockwise or counterclockwise to achieve the desired airflow through the dehydrator. Timer and controls 343 may control whether, and to what degree, heat coil 338 is used; and/or whether, and to what degree, motor 328 and attached centrifugal fan 332 are used.

Alternatively, collapsible shelf sidewalls 311 and 314 may utilize transparent, translucent, or darker material, and the dehydrator may be placed in sunlight to either assist or replace heat supplied by heat coil 338 for dehydration.

If heat coil 338 is used in dehydration, at the end of the end of the dehydration period, heat coil 338 is turned off by timer and controls 343, or by other means.

After this, vertical/horizontal frames 310 are removed from the dehydrator and unloaded by pushing food 316 off of spikes 312.

As a second non-limiting and non-exhaustive example, instead of loading vertical/horizontal frames 310 with food 316 and placing them in their vertical position, hanging from notched hanging rails 308, vertical/horizontal frames 310 may be mounted horizontally on shelf support ribs 348 within collapsible shelf support sidewalls 311 314, and loaded with food 316 resting either on the upper ends of spikes 312, or, by flipping vertical/horizontal frames 310 over, food 316 may be loaded on the reverse flat side of vertical/horizontal frames 310.

The loaded vertical/horizontal frames 310 mounted inside of collapsible shelf support sidewalls 311 maybe then reassembled above outer wall 320, and lid 302 placed on top, after which the user may set timer and controls 343 and detachable vent cover 304 and follow the procedure of the first alternative.

With either alternative, additional vertical and/or horizontal trays may be added above and/or below shelf support ribs 348, at least to increase capacity.

The above assemblies, except for utility base 318, may be dishwasher safe and disassembled and put into a dishwasher for easy cleanup.

Embodiment 300, in plan view, may be approximately 11"×11" plus or minus 1.5 inches so that in storage, on a countertop, in a dishwasher, or during other use modes, it will fit where a standard 11 inch in diameter dinner plate will fit.

Embodiment 350, FIGS. 67 Through 70

FIG. 67 through 70 show embodiment 350, which may be a direct replacement utility base 318 found in embodiment 300. Embodiment 350 operates without a motor and a fan. Instead, it operates solely without forced air movement by utilizing convection air currents.

As one source of heat, embodiment 350 may utilize heat coil 352, which may be powered by household electricity, or by other means.

As an alternate heat source, embodiment 350 may mount vertical, diagonal, and/or horizontal trays, and/or sidewalls, which are transparent, translucent, and/or dark, and which may be place in sunlight to replace or augment heat coil 352, as embodiment 350's heat source.

Embodiment 350 is comprised of outer wall 354, which internally mounts removable air baffle 356, on support ribs 358.

Figure 68:
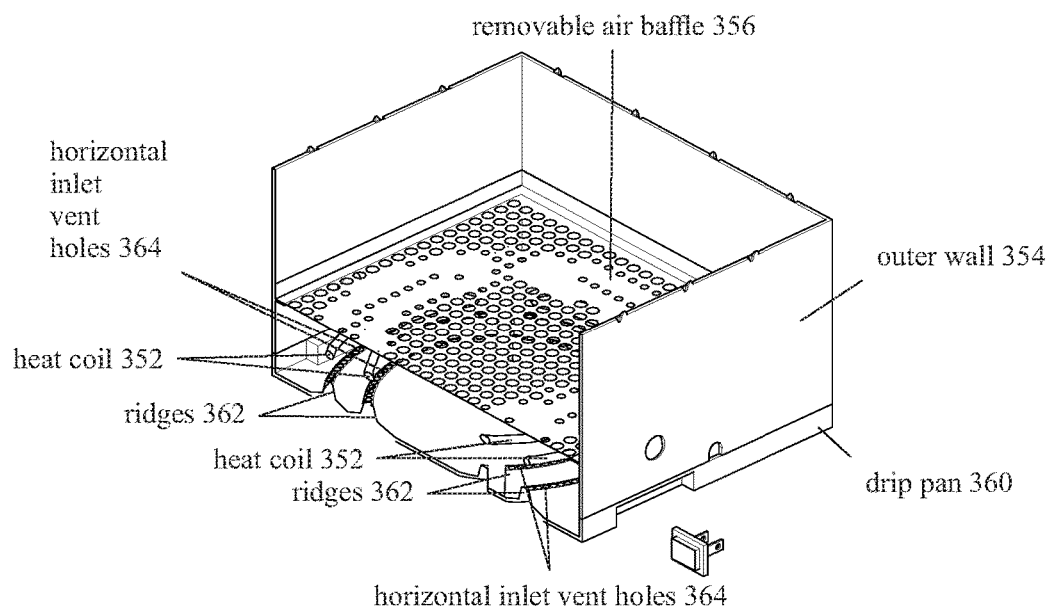
FIG. 68 is a perspective section, taken through FIG. 67, has indicated in FIG. 67.
Figures 69, 70:
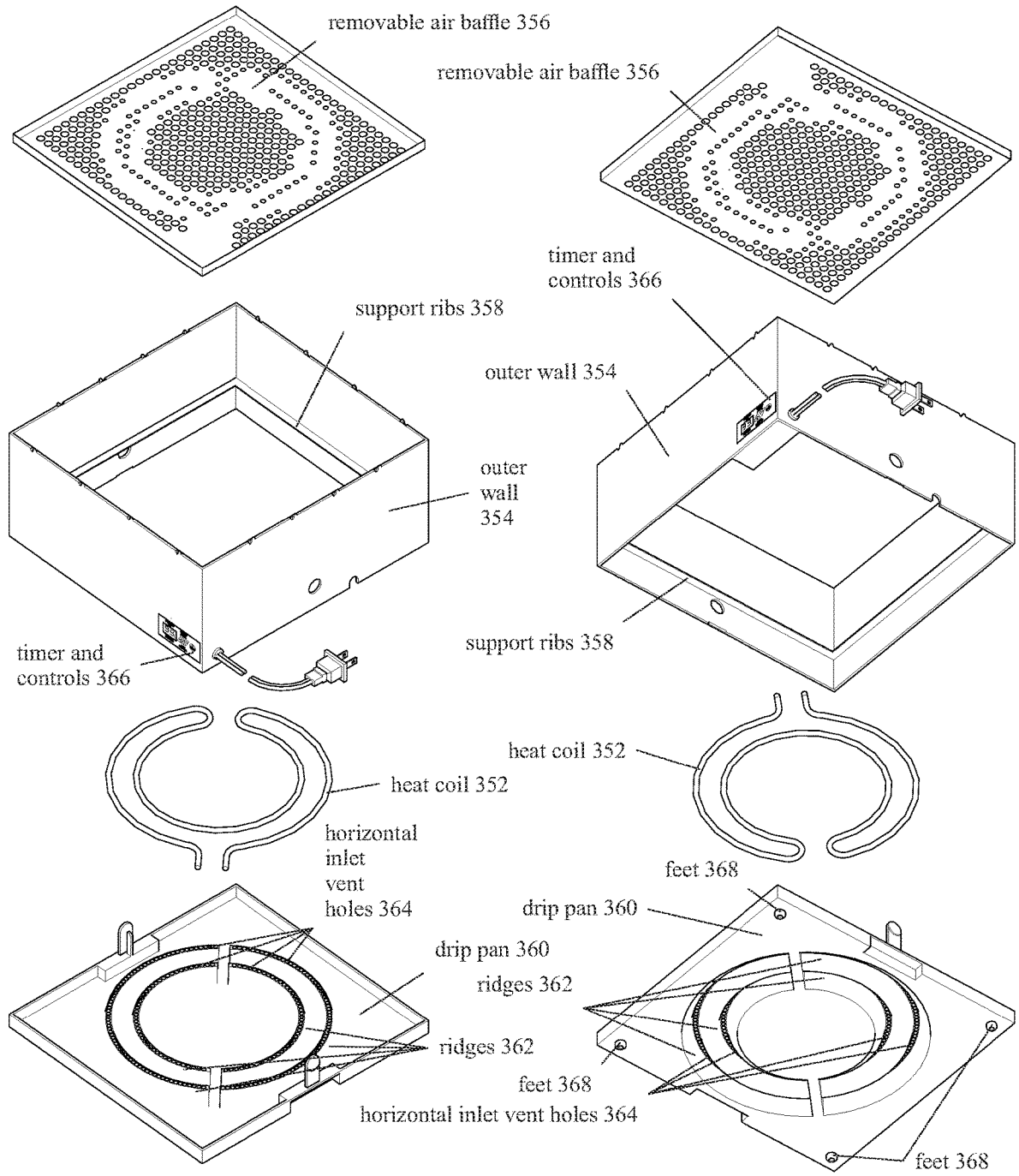
FIG. 69 is an exploded perspective of embodiment 350, taken from above.
FIG. 70 is an exploded perspective of embodiment 350, taken from below.
Figure 77:
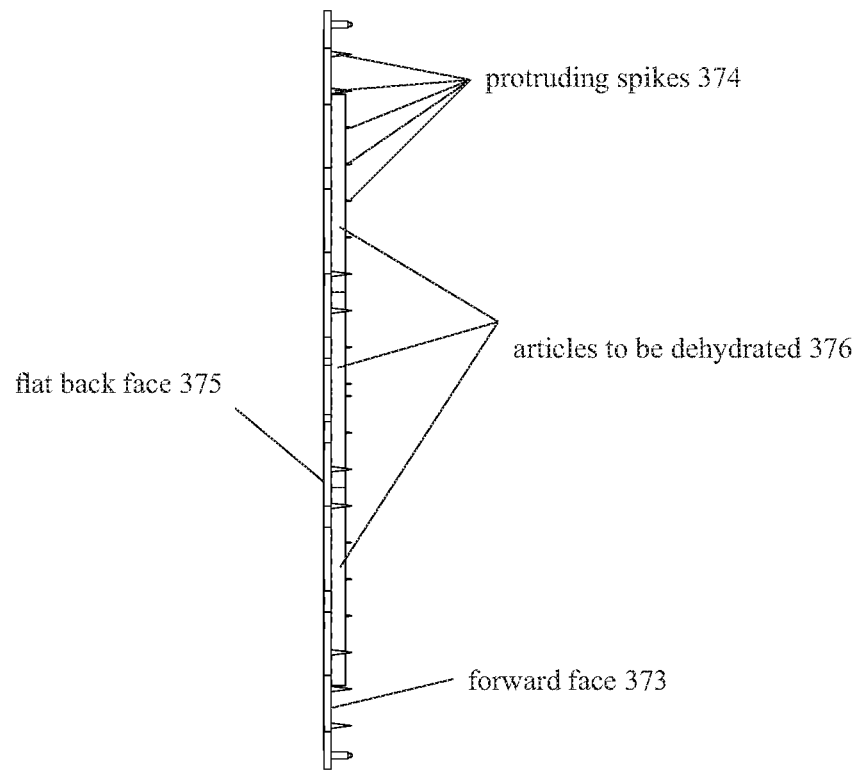
FIG. 77 is a side view of embodiment 370, with embodiment 370 being vertically disposed.

Below removable air baffle 356, outer wall 354 also mounts on insulators heat coil 352, (see especially FIG. 68). The lower rim of outer wall 354 removably couples to drip pan 360.

Protruding up from drip pan 360 are semicircular ridges 362, which, on their upper ridgelines, have horizontal inlet vent holes 364, which allow outside air to enter embodiment 350.

Horizontal inlet vent holes 364 may be of any suitable dimension. As a non-limiting, and non-exhaustive example, they may be made to a size and shape, which will prevent objects the size and shape of a 0.1 inch diameter sphere from entering through them. This may help prevent debris, insects, and other objects from passing through vent holes 364.

Protruding down from drip pan 360 are feet 368, which space drip pan 360 above any supporting surface so as to allow inlet airflow.

Removable air baffle 356 is penetrated by openings having an open area which is 20% or more of the total upper surface of removable air baffle 356. Removable air baffle 356, however, is solid, without penetrations, directly above heat coil 352, thus preventing debris from directly above, from dropping or dripping onto heat coil 352.

Outer wall 354 also mounts timer and controls 366 which may control: dehydration time, and/or dehydration temperature, and/or other things.

Embodiment 370, FIGS. 71, 72, 73, 74, 75, 76, 77, 78, 79, 79A, 79B, 79C, 80, and 81

FIGS. 71 through 81 show embodiment 370, which is a tray to hold articles, including, but not limited to articles to be dehydrated, and which is configured to be used in a horizontal, diagonal, or vertical disposition.

As non-limiting and non-exhaustive examples, embodiment 370 may be used to generally substitute for shelf floor 108, earlier herein, which is at least used in a horizontal disposition. Or it may be used similarly to embodiments, 130 and 138 shown earlier herein, which are generally used at least in a horizontal disposition. Or it may be used, with obvious modifications, similarly to the way shelf floor member 254, shown earlier herein is used, in both horizontal and diagonal dispositions. Or it may be used as shelves 166, shown earlier herein, in a vertical disposition.

In each of the above instances, embodiment 370 may be stored and shipped in a similar manner to the examples given.

Embodiment 370 is comprised of open frame 372, which, on forward face 373, as shown in FIGS. 71, 72, 73, and 74, has protruding spikes 374.

Figure 78:
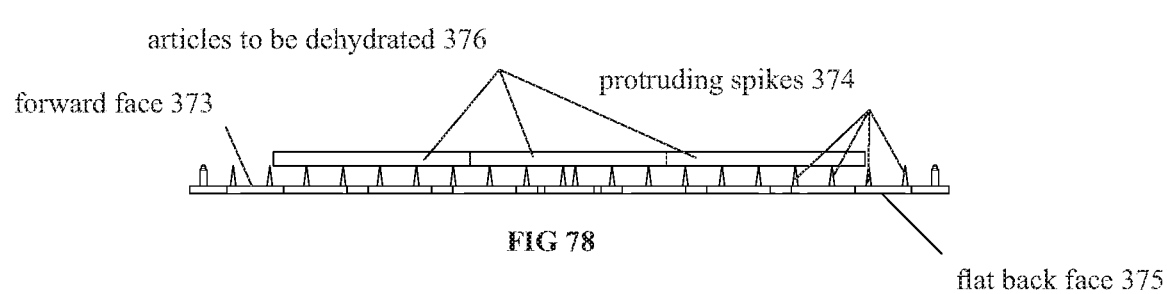
FIG. 78 is a side view of embodiment 370, with embodiment 370 being horizontally disposed with protruding spikes 374 pointing upward.

Spikes 374 are configured to hold articles to be dehydrated 376, by partially or fully impaling them (FIGS. 71, 72, and 77), or by supporting articles to be dehydrated on the tips of spikes 374 (FIGS. 73, 74, and 78).

Figure 79:
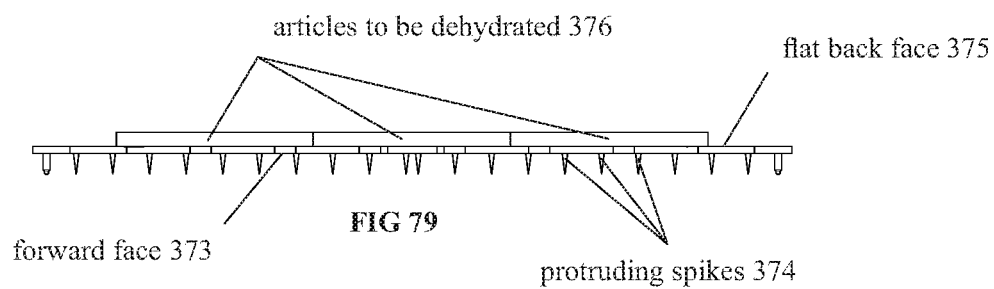
FIG. 79 is a side view of embodiment 370 with embodiment 370 being horizontally disposed with protruding spikes 374 pointing downward.
Figure 79A:
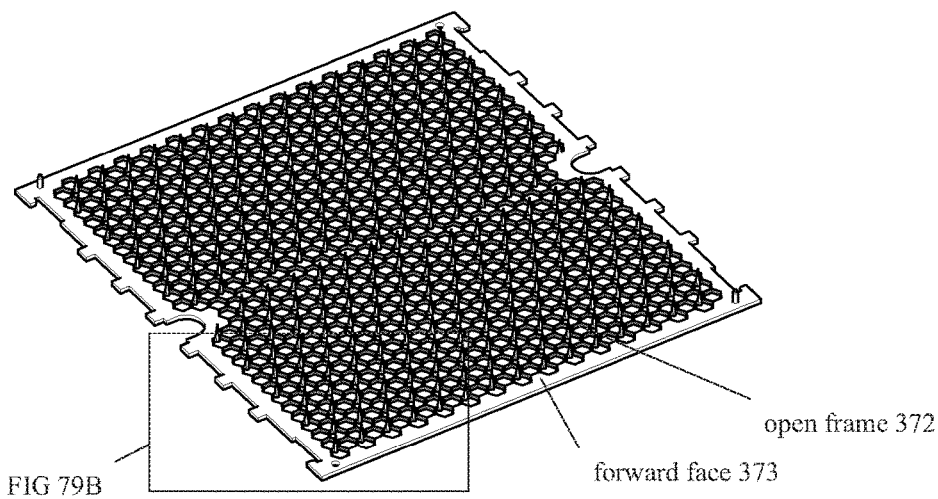
FIG. 79A is a perspective of embodiment 370.
Figure 79B:
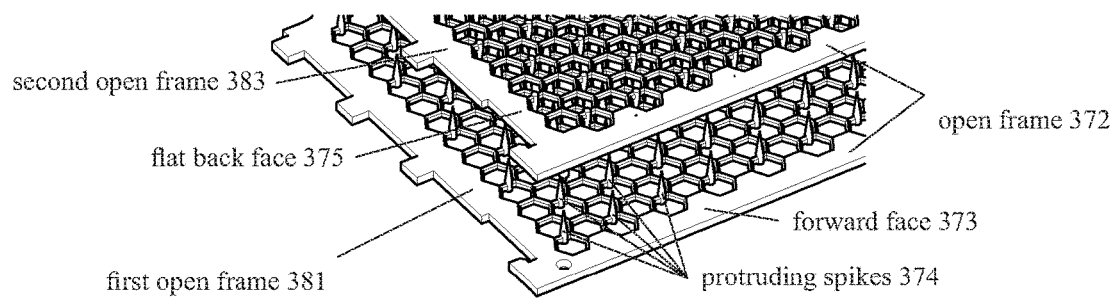
FIG. 79B is a partial perspective of first open frame 381 being separated from and facing second open frame 383.
Figure 79C:
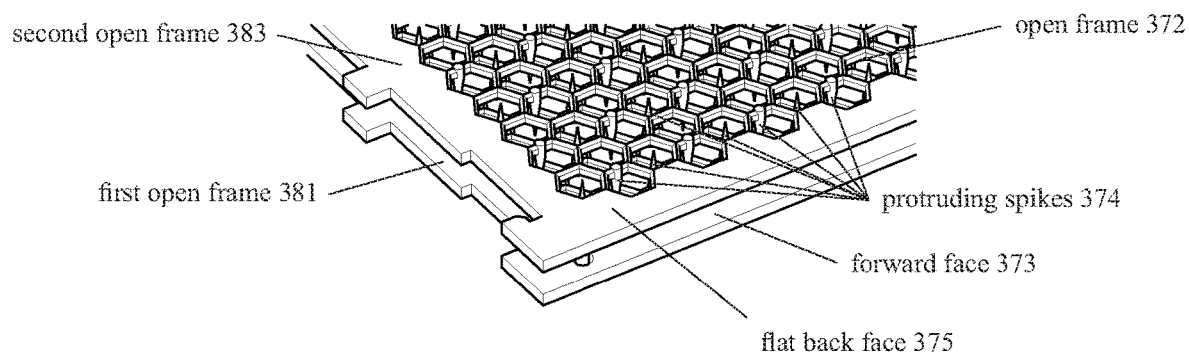
FIG. 79C is a partial perspective of first open frame 381 being joined face-to-face to second open frame 383.
Figure 80:
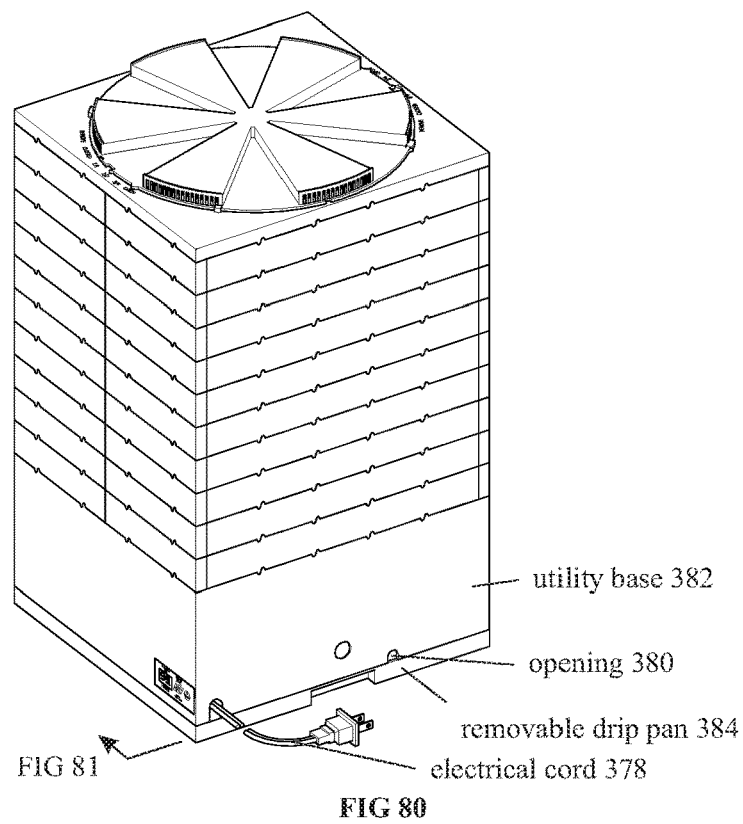
FIG. 80 is a perspective including utility base 382 and removable drip pan 384.

Open frame 372 may also support articles to be dehydrated 376, on its generally flat back face 375, as shown in FIGS. 75, 76 and 79. This is aided by open frame 372, having grill 377 with each of its members having peak 379 (FIG. 76 in particular), similar to a roof peak, on the face of grill 377 which faces articles being dehydrated 376. This array of facing sharp edges, instead of rounded (greater than 0.001 inch radius) or horizontal flat surfaces (greater than 0.001 inches across), reduces contact area between articles being dehydrated and grill 377, and therefore may reduce sticking and cleaning problems.

Open frame 372, by being open, allows air to circulate around articles to be dehydrated, regardless of whether such articles are impaled on protruding spikes 374 (FIGS. 71, 72, and 77), or are resting on the tips of spikes 374 (FIGS. 73, 74, and 78), or are resting on flat back face 375 of open frame 372 (FIGS. 75, 76, and 79).

When articles to be dehydrated 376, are resting on the tips of protruding spikes 374, such as shown in FIGS. 73, 74, and 78, free circulation of air around articles to be dehydrated 376 is promoted, with the potential of increasing dehydrating efficiency.

Open frame 372 may reduce storage requirements when compared to stacking a first open frame 372 back-to-front on top of a second open frame 372; by stacking first open frame 381 with its forward face 373 facing forward face 373 (face-to-face) of second open frame 383. This is because distal portions protruding spikes 374 of first open frame 381, when open frames 381 and 383 are face-to-face, are aligned to be disposed within grill 377 of second open frame 383, and vice versa (see in particular FIG. 79C).

As a non-limiting and non-exhaustive example, if both first open frame 381 and second open frame 383 are each 0.1 inches thick, and protruding spikes 374 project out 0.3 inches, when first open frame 381 and second open frame 383 are placed face-to-face, with 0.2 inches between them, the last 0.1 inch of spikes 374 on first open frame 381 are disposed through grill 377 of second open frame 383, and vice versa.

Thus, in this example, each set of two open frames, when they are face-to-face, would take up 0.4 inches in thickness versus if they were face-to-back, where the pair would take up 0.8 inches.

Also, this means it is very efficient to stack open frames 372 face-to-face, back to back, face-to-face, back-to-back, etc. versus stacking them face to back, face to back, face to back, etc.

Electrical cord 378 supplies power.

Opening 380 (FIG. 80) indented into the lower rim of utility base 382, in combination with the ability for removable drip pan 384 to be removed by the user, allows electrical cord 378 to be stored in the chamber formed between the interior lower portion of utility base 382, and the interior upper portion of removable drip pan 384. This is done, as a non-limiting and non-exhaustive example, by the user removing removable drip pan 384, then placing the cord inside drip pan 384, and then threading electrical cord 378 back through opening 380 and the user then securing drip pan 384 back into its original position.

Figure 82:
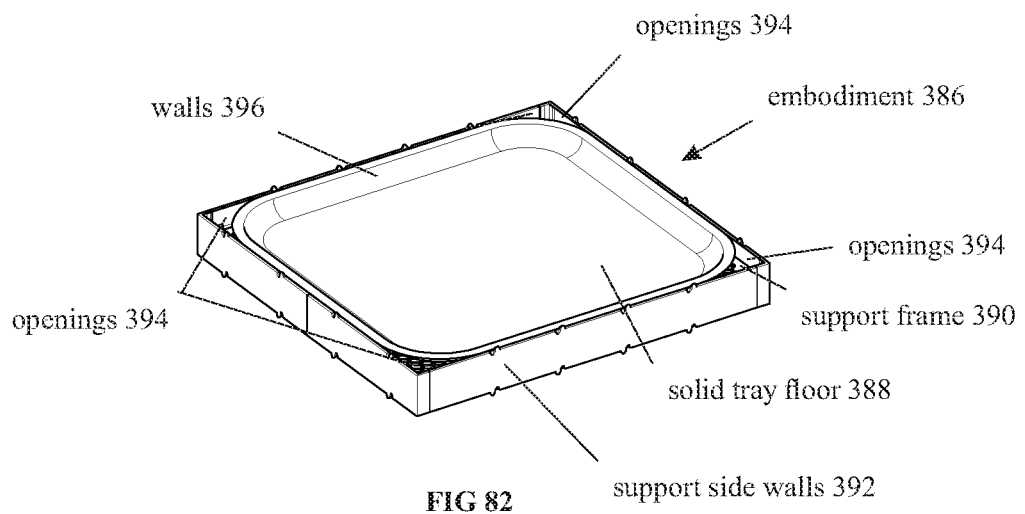
FIG. 82 is a perspective of an assemblage, including solid tray floor 388, support frame 390, and support side walls 392.
Figure 83:
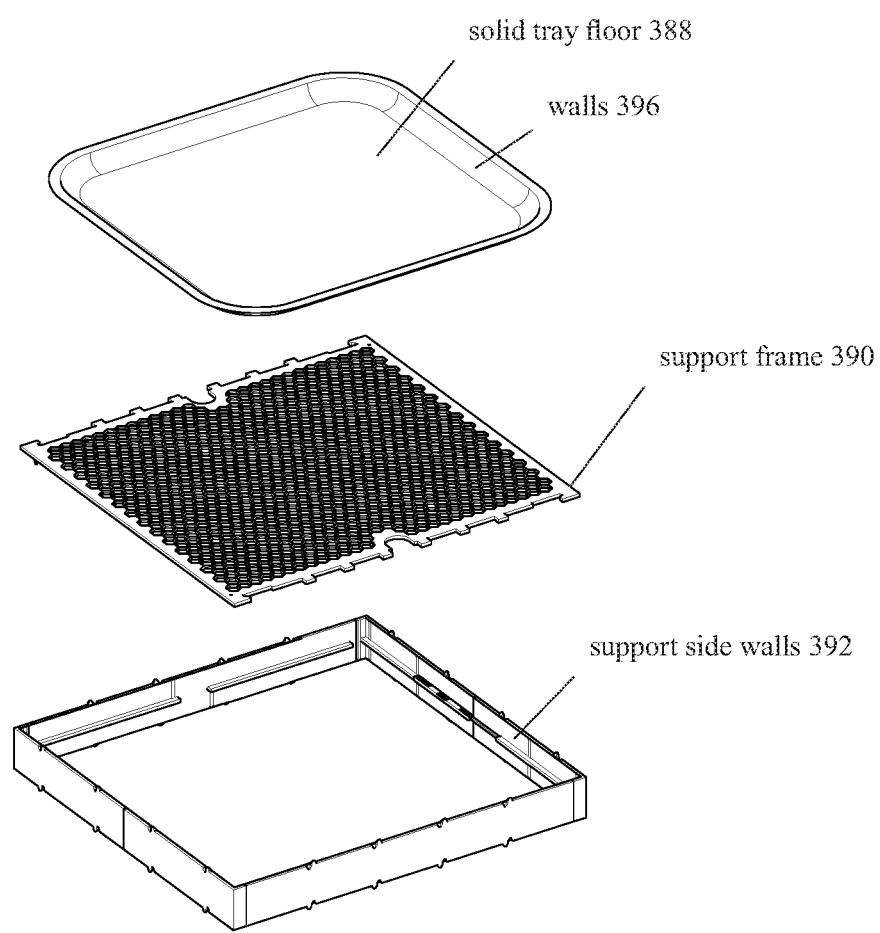
FIG. 83 is an exploded perspective of solid tray floor 388, support frame 390, and support side walls 392.

Embodiment 386, FIGS. 82 and 83

FIGS. 82 and 83 show embodiment 386, which is a dehydration tray, configured to aid in the dehydration of articles such as, but not limited to: fruit leathers, herbs, and other items.

Embodiment 386 is comprised of solid tray floor 388, which rests on support frame 390, which in turn is supported by support side walls 392.

As a non-limiting and non-exhaustive example, openings 394 adjacent to the corners of solid tray floor 388, and formed in the gap between the rounded corners of solid tray floor 388, and the more squared off interior corners of support side walls 392; allow heated air to both warm solid tray floor 388, as well as rise by convection past solid tray floor 388, to other articles to be dehydrated above solid tray floor 388.

Also as a non-limiting and non-exhaustive example, walls 396 on the periphery of solid tray floor 388 may help contain liquids or semi liquids, being dehydrated on the upper surface of solid tray floor 388.

Embodiment 386 may be used generally to substitute for shelf assemblies shown herein, including, but not limited to, those shown in FIGS. 3, 6, 18, 19, 41, 43, 47, and others.

Embodiment 398, FIGS. 84, 85, and 86

FIGS. 84, 85, and 86 show embodiment 398, which is comprised of spit rod 400, and notched hanging rails 406.

In use, spit rod 400 is inserted 404 into articles to be dehydrated 402, and then the assembly is coupled into notches 405 on hanging rails 406.

Figure 87:
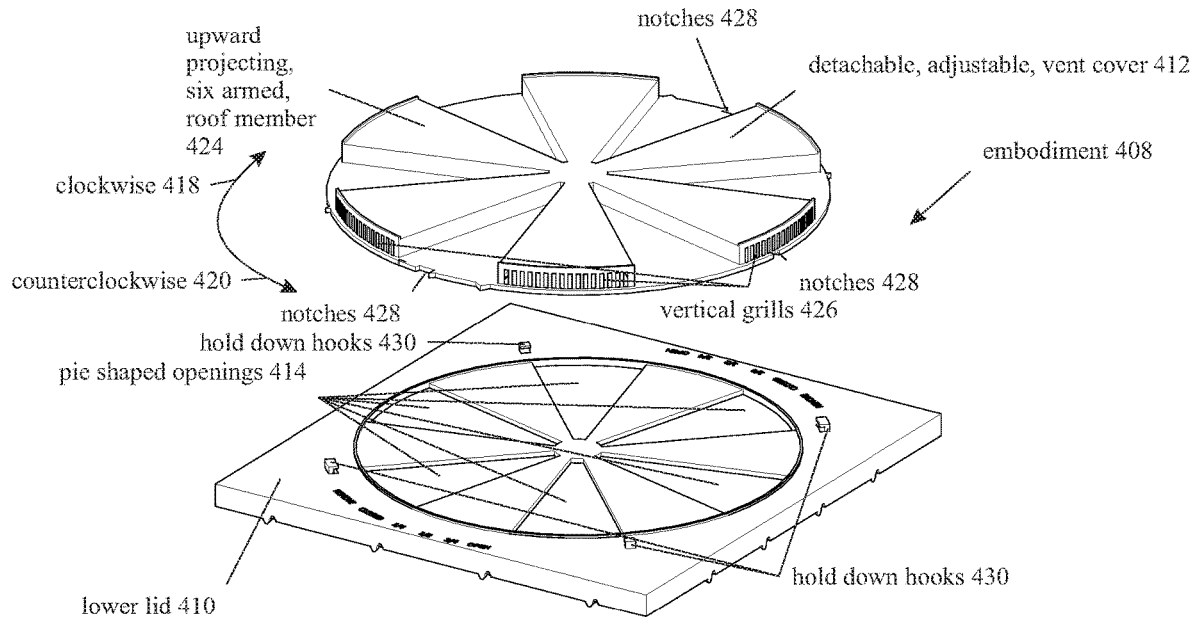
FIG. 87 is an exploded perspective of embodiment 408, taken from above.
Figure 88:
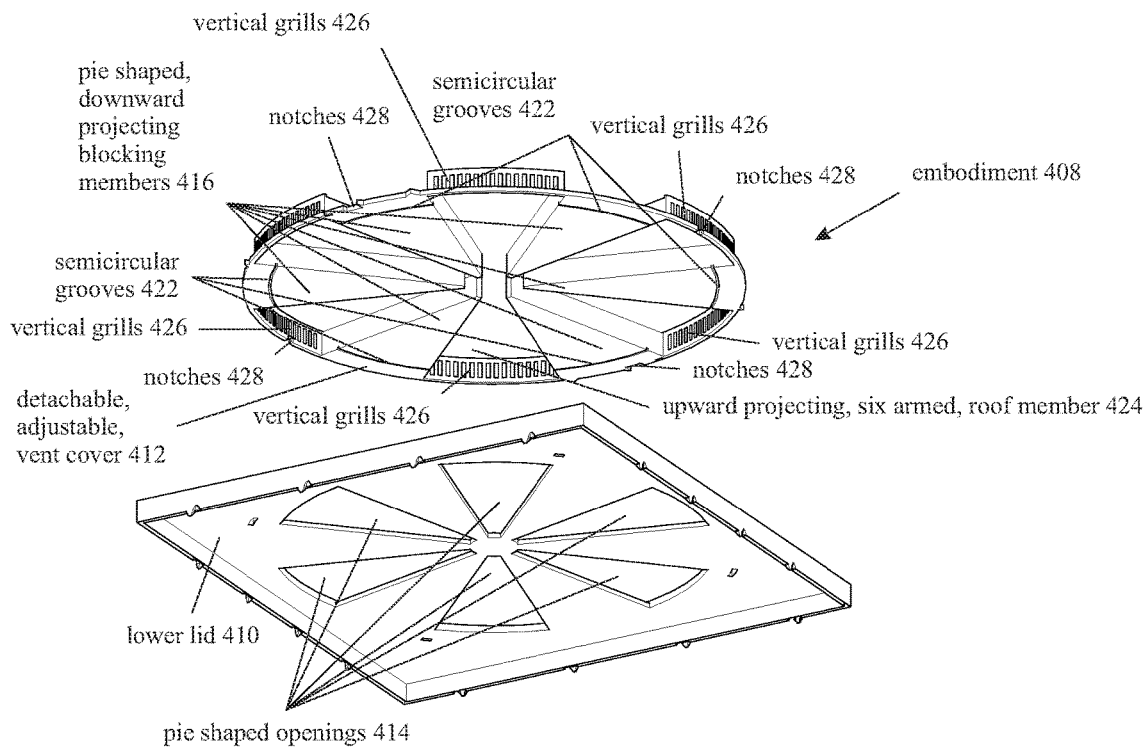
FIG. 88 is an exploded perspective of embodiment 408, taken from below.
Figure 89:
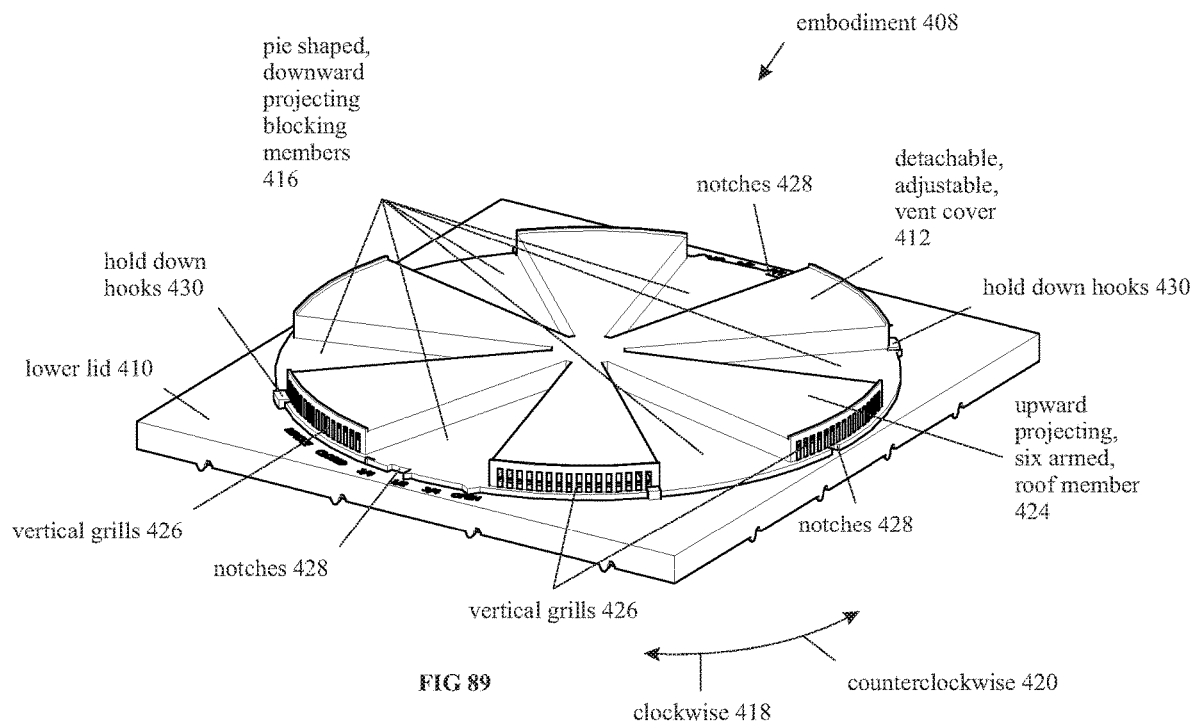
FIG. 89 is a perspective of embodiment 408.
Figure 98:
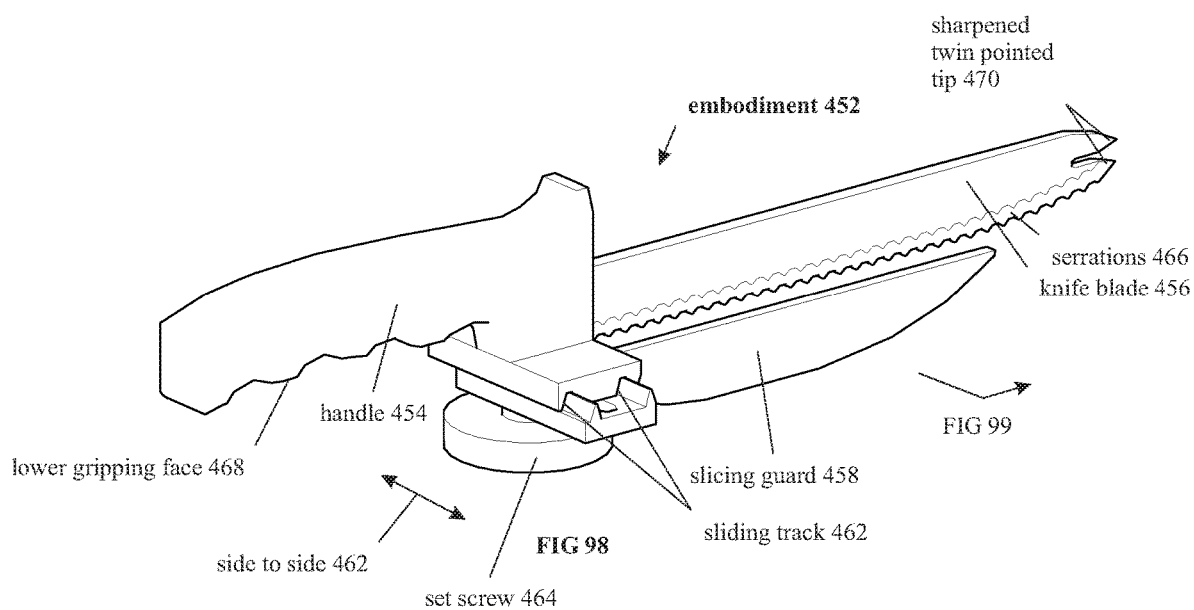
FIG. 98 is a perspective of embodiment 452.

Embodiment 408, FIGS. 87 Through 89

FIGS. 87 and 88 show embodiment 408, which is a dehydrator lid assembly similar to, and substitutable for, lid assemblies shown herein, including specifically, but not limited to, those shown in FIGS. 1, 2, 3, 4, 10, 11, 22, 27, 29, 34, 45, 58, 64, 80, 81, 84, and others.

Embodiment 408 is comprised of lower lid 410 and detachable, adjustable, vent cover 412.

Lower lid 410 is penetrated by six evenly spaced pie shaped openings 414.

Detachable, adjustable, vent cover 412 has six evenly spaced pie shaped, downward projecting blocking members 416, which from time to time, and through rotation of detachable, adjustable, vent cover 412, can block pie shaped openings 414 in lower lid 410.

Detachable, adjustable, vent cover 412 is configured to rotate about a central vertical axis. Lower lid 410 has circular ridge 422, which, when vent cover 412 is attached face-to-face (FIG. 89) to lower lid 410, engages semicircular grooves 423, disposed on the underside of projecting blocking members 416, helping to smooth the rotational movement of vent cover 412.

Upward rising, six armed, roof member 424, is configured to fill in the gaps between pie shaped, downward projecting, blocking members 416.

Vertical grills 426 cap the outer ends of the arms of upward projecting, six armed, roof member 424. Vertical grills 426 are fine enough to prevent passage through them of a 0.1 inch in diameter sphere. Vertical grills 426 help prevent entry of debris, insects, liquids and other unwanted objects.

As a non-limiting and non-exhaustive example, vertical grills 426, in combination with upward projecting, six armed, roof member 424, may help prevent rain and/or accidental spills from entering through lower lid 410.

As a non-limiting and non-exhaustive example, in operation a user assembles detachable, adjustable, vent cover 412 to lower lid 410, by placing vent cover 412 on top of lower lid 410, and rotating vent cover 412 until notches 428 on vent cover 412, align above hold down hooks 430 on the upper surface of lower lid 410, and vent cover 412 drops to face-to-face engagement with lower lid 410.

From here, vent cover 412 may be rotated counterclockwise 420 and clockwise 418 to adjust the amount of air exiting through lower lid 410.

To disassemble detachable, adjustable, vent cover 412 from lower lid 410, a user turns detachable, adjustable, vent cover 412 full clockwise 418, until it stops with notches 428 again aligned with hold down hooks 430. After this, a user simply lifts vent cover 412 away from lower lid 410.

Embodiment 432, FIGS. 90 Through 97

FIGS. 90 through 97 show embodiment 432, which is a compact-able holding rack.

Embodiment 432 comprises zigzag folding member 434, and collapsible shelf side walls 436 (FIGS. 90, 91, 94, and 96).

Hinge points 438, as a non-limiting and non-exhaustive example, are shown as molded living hinges, and configure connecting members 440 to zigzag fold together upward spiked spanning members 442, from their expanded disposition, shown in FIG. 90, to their compacted disposition, shown in FIGS. 94, 95, and 97.

Utility base 444 is configured to hold zigzag folding member 434 in its compacted disposition during storage, or at other times, as shown in FIGS. 95 and 97.

As a non-limiting and non-exhaustive example, in use, zigzag folding member 434, in its expanded disposition (FIG. 90), is situated within collapsible shelf side walls 436, and rests on support ribs 450, and is configured to mount articles be dehydrated 448, utilizing upward directed spikes 446, disposed on the distal portions of upward spiked spanning members 442, as shown in FIG. 90.

As shown in FIGS. 91 and 96, removing zigzag folding member 434 from being within collapsing shelf side walls 436, allows zigzag folding member 434 to fold, first into a semi-collapsed disposition, as shown in FIGS. 91, 93 and 96, and finally into its fully collapsed disposition, as shown in FIGS. 92, 94, 95, and 97, for storage or other purposes. In its collapsed disposition zigzag folding member 434 may be stored in utility base 444, as shown in FIGS. 95 and 97.

Collapsible shelf side walls 436 and utility base 444 are generally similar in size in plan view, and are deeper than they are wide. This allows zigzag folding member 434 in its expanded condition (FIG. 90) to fit tightly within the walls of collapsible shelf side walls 436, and thus be compressed 450 by the walls of collapsible shelf side walls 436 open; and in its compacted disposition (FIGS. 94, 95 and 97), after being rotated 90° (transition from FIG. 94 to FIG. 95), zigzag folding member 434 is configured to loosely fit within utility base 444, for storage or other purposes, as shown in FIGS. 95 and 97.

Embodiment 452, FIGS. 98, 99, 100, 101, and 102

FIGS. 98 through 102 show embodiment 452, which is a knife configured to slice articles, including, but not limited to, articles which may be placed within a dehydrating environment.

Embodiment 452 is comprised of: handle 454, which fixedly mounts knife blade 456, and mounts slicing guard 458, utilizing sliding track 460 to direct side to side 462 movement of slicing guard 458, and also utilizing set screw 464, to fix slicing guard 458 in position.

Set screw 464 is large enough to be rotated by one hand when a user is holding handle 454.

Figure 100:
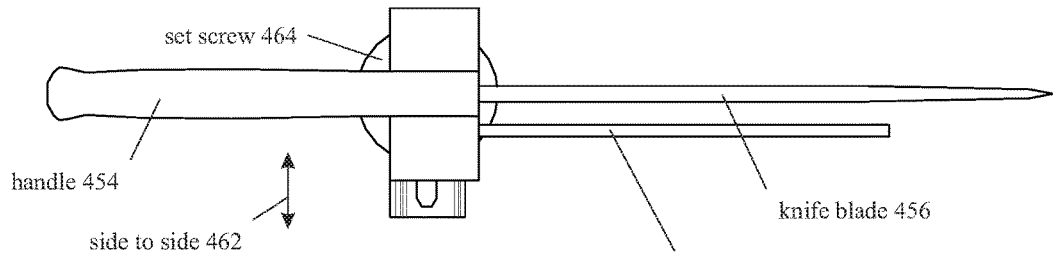
FIG. 100 is a top view of embodiment 452.
Figure 101:
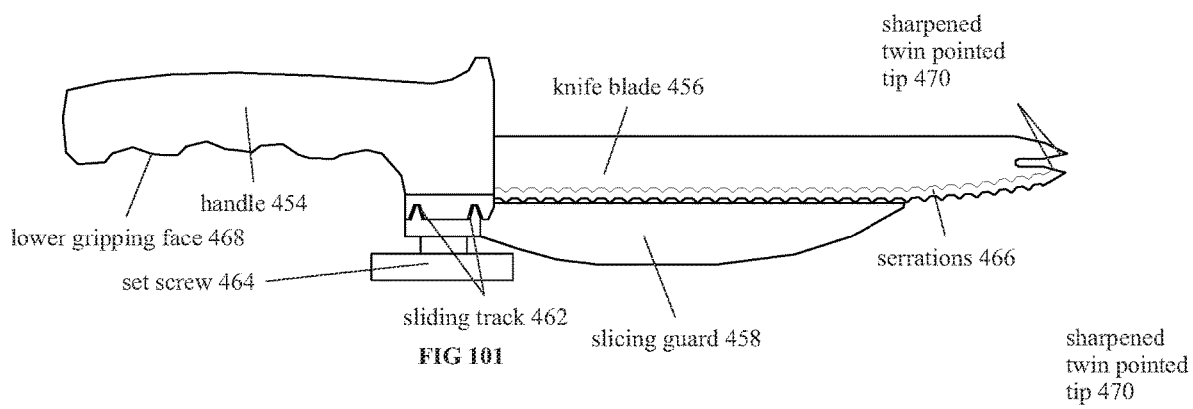
FIG. 101 is a side view of embodiment 452.
Figure 102:
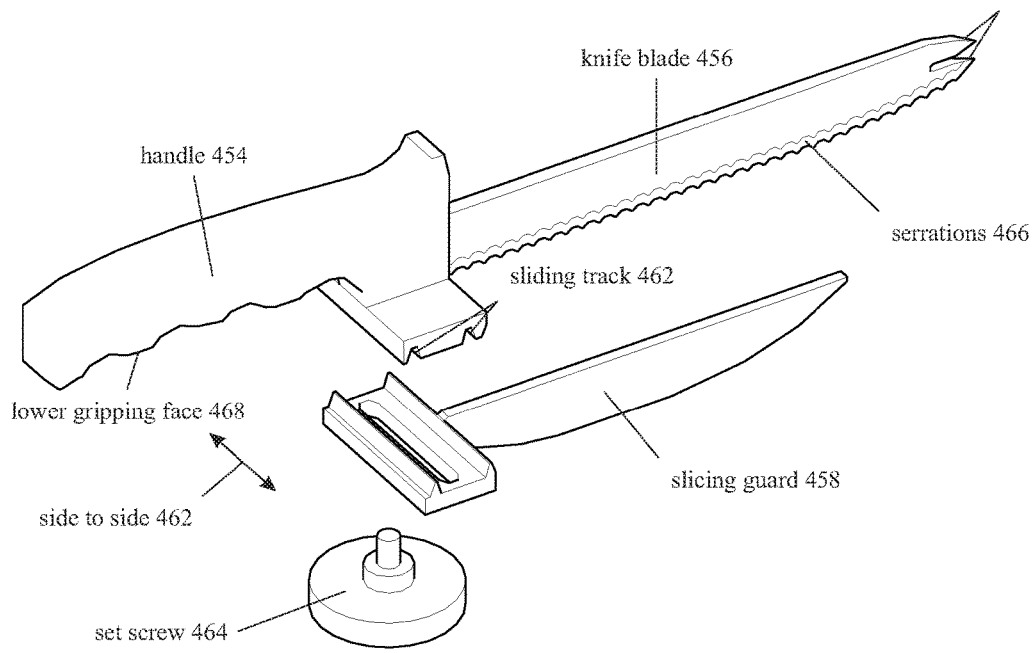
FIG. 102 is an exploded perspective of embodiment 452.

As shown most clearly in FIG. 102, slicing guard 458 is symmetrical side-to-side 462, and it is equally usable to right-handed as well as left-handed users, simply by moving it respectively to the right-hand side of blade 456, as shown in FIG. 100, or to the left hand side of blade 456.

Figure 99:
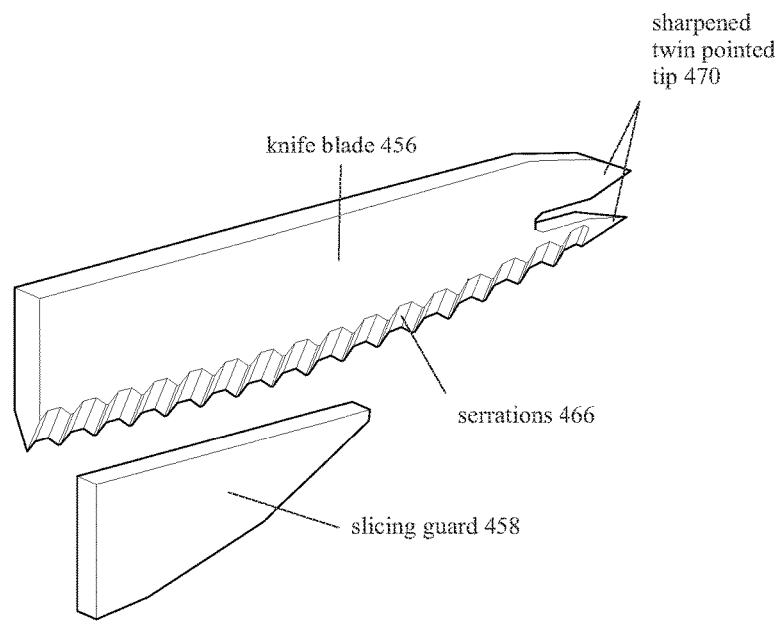
FIG. 99 is a perspective section taken through FIG. 98, as indicated in FIG. 98.

Blade 456 may be symmetrically sharpened with grounded serrations 466 on both sides of the blade, as shown most clearly in FIG. 99, or it may have grounded sharpened serrations on a single side of the blade, be it right or left hand.

The lower gripping face 468 of handle 454 is elevated above the extended lower surface of serrations 466, providing finger clearance off of surfaces supporting articles being sliced. Sharpened twin pointed tip 470 may be used as a serving fork, by impaling them.

As a non-limiting and non-exhaustive example, in use, a user loosens set screw 464, and moves slicing guard 458 side-to-side 462 until it's adjusted for the proper user hand, and the desired slicing thickness is established between the blade facing inner surface of slicing guard 458, and knife blade 456. A user then tightens set screw 464.

A user then cuts an article utilizing slicing guard 458 pressing against the article to determine the thickness of the cut.

Slicing guard 458 and set screw 464 are removable, allowing embodiment 452 to be used in other cutting applications.

Embodiment 472, FIGS. 103 Through 107

FIGS. 103 through 107 show embodiment 472, which, as a non-limiting and non-exhaustive example, holds articles to be sliced 478.

Embodiment 472 comprises: handle 474, which fixedly mounts pointed prongs 476.

FIGS. 105, 106, and 107, shown on the non-limiting and non-exhaustive examples of how embodiment 472 may hold articles to be sliced 478.

FIGS. 105, 106, and 107, also show non-limiting and non-exhaustive examples of how embodiment 452 might be used in conjunction with embodiment 472.

As a non-limiting and non-exhaustive example, in use, a user impales articles to be sliced 478 on pointed prongs 476, and grips handle 474 in positions shown in FIG. 105, 106, or 107 or in other positions, while articles to be sliced 478 are being sliced.

In the position shown in FIG. 107, each individual slice may be retained on pointed prongs 476 after the cutting is done, making it easier for the slices to be handled. FIG. 107 shows embodiment 452 without slicing guard 458 attached. Set screw 464 may also be removed to facilitate cutting operations.

Figure 108:
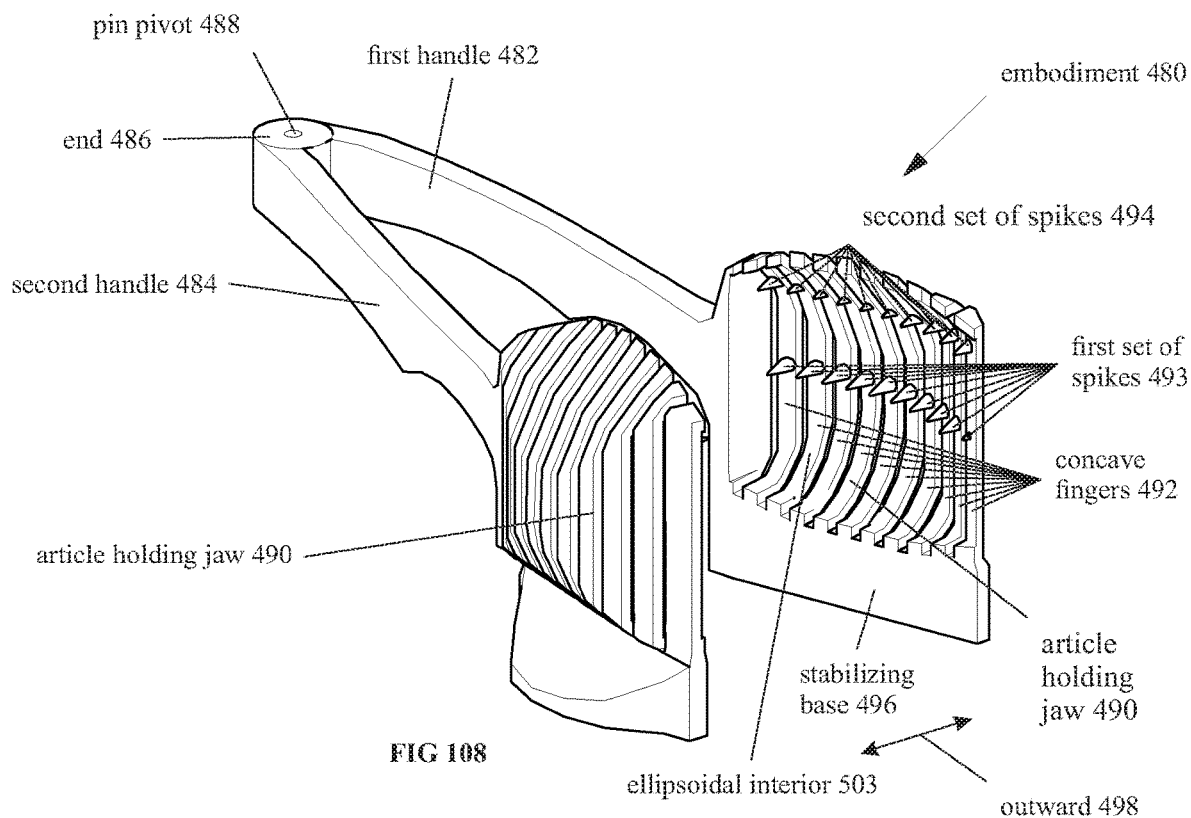
FIG. 108 is a perspective of embodiment 480.
Figure 109:
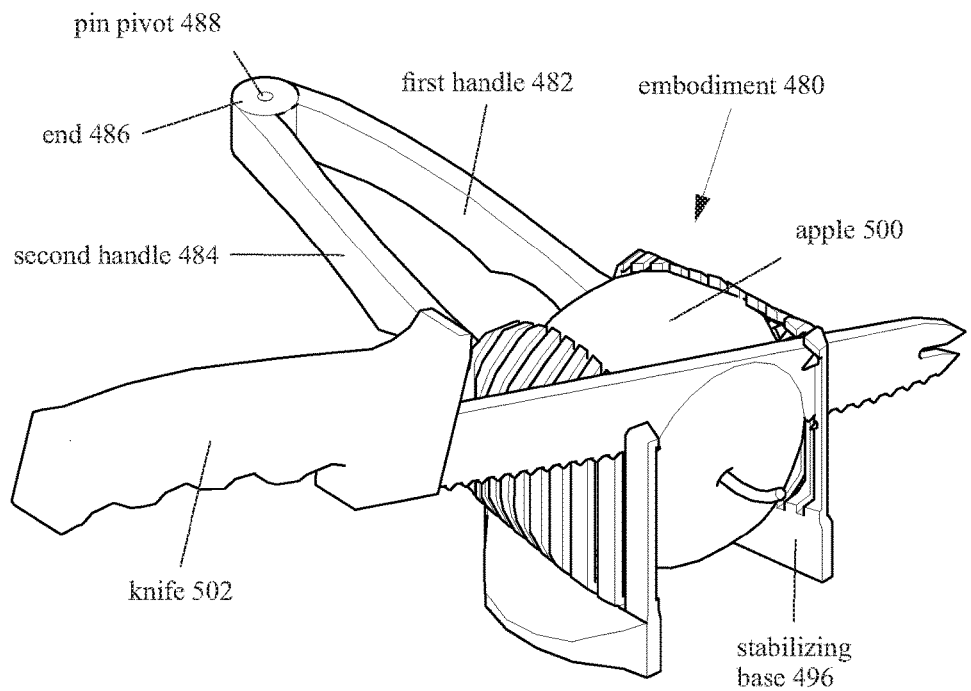
FIG. 109 is a perspective of embodiment 480 in use, and including knife 502 and apple 500.

Embodiment 480, FIGS. 108 and 109

FIGS. 108 and 109 show embodiment 480, which is a food holder configured to hold articles, as a non-limiting and non-exhaustive example, while they are being sliced.

Embodiment 480 is comprised of first handle 482 and second handle 484, each of which at end 486 is pivotally connected to the other.

As non-limiting and non-exhaustive examples, this may be done with outward 498 spring biased pin pivot 488, as shown in FIGS. 108 and 109, or with a U shaped piece of spring steel, or with a thinned out U-shaped plastic section, or by other suitable means.

Alternatively, first handle 482 and second handle 484 may move freely of one another, without any spring bias, or they may be spring biased toward one another.

At the opposite end from end 486 of first handle 482, is article holding jaw 490, which is comprised of: stabilizing base 496, which couples to, and secures, upward directed concave fingers 492, some or all of which have first set of spikes 493. Some, none, or all of concave fingers 492, may also have second set of spikes 494.

Second handle 484 is essentially a mirror image of first handle 482.

In use, a user places the article to be sliced, such as by way of a non-limiting and non-exhaustive example, apple 500, shown in FIG. 109, and pushes first handle 482 and second handle 484 toward one another, causing first set of spikes 493 and possibly second set of spikes 494, and their mirror imaged counterparts, to impale apple 500.

Thereafter, knife 502 may slice apple 500, using upward directed concave fingers 492, and their mirror imaged counterparts, as slicing guides, as shown in FIG. 109.

This structure may have several advantages over similar structures. As non-limiting and non-exhaustive examples:

One, first set of spikes 493 and second set of spikes 494, and their mirror imaged counterparts, provide structural support to solidly hold upward directed concave fingers 492 in their vertical dispositions, without being deflected by knife cutting pressures.

Second, first set of spikes 493 and second set of spikes 494, are configured to hold cut slices in place, in an organized manner, throughout the entire cutting process, without the slices individually falling apart on supporting surfaces while cutting is taking place.

Third, stabilizing base 496 may prevent the need of a cutting board, by holding knife 502 off from supporting surfaces.

And finally, by first handle 482 and second handle 484 being long enough to keep hands away from article slicing, embodiment 480 may promote user safety.

Figure 110:
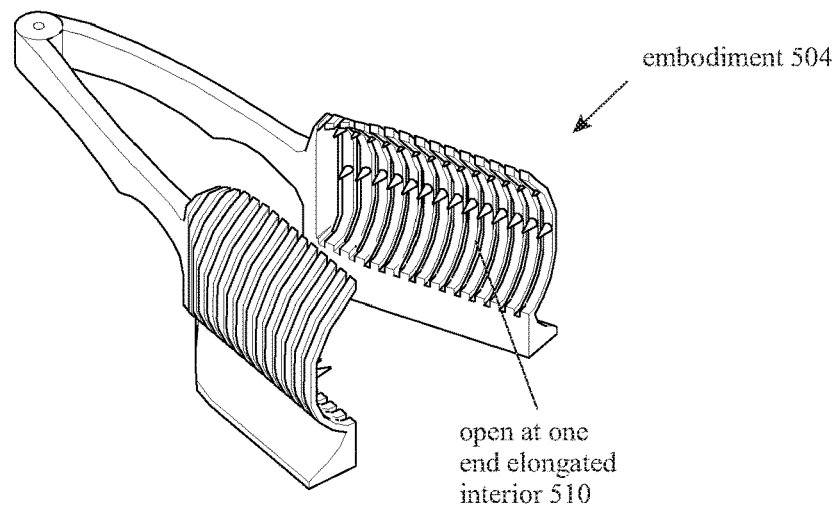
FIG. 110 is a perspective of embodiment 104.
Figure 111:
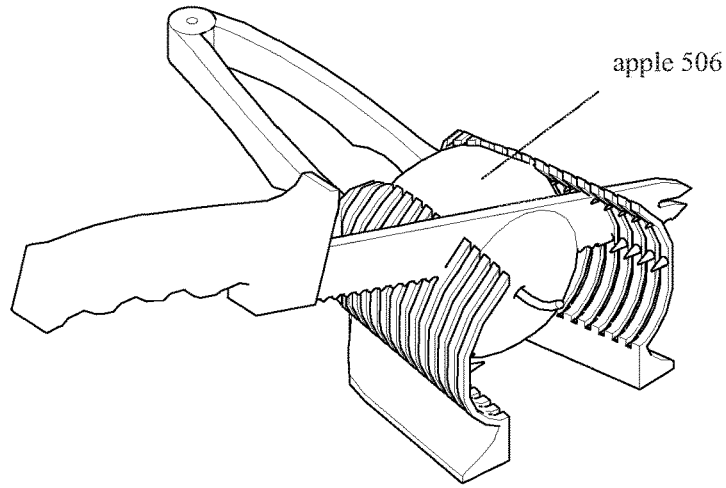
FIG. 111 is a perspective of embodiment 504 in use.
Figure 112:
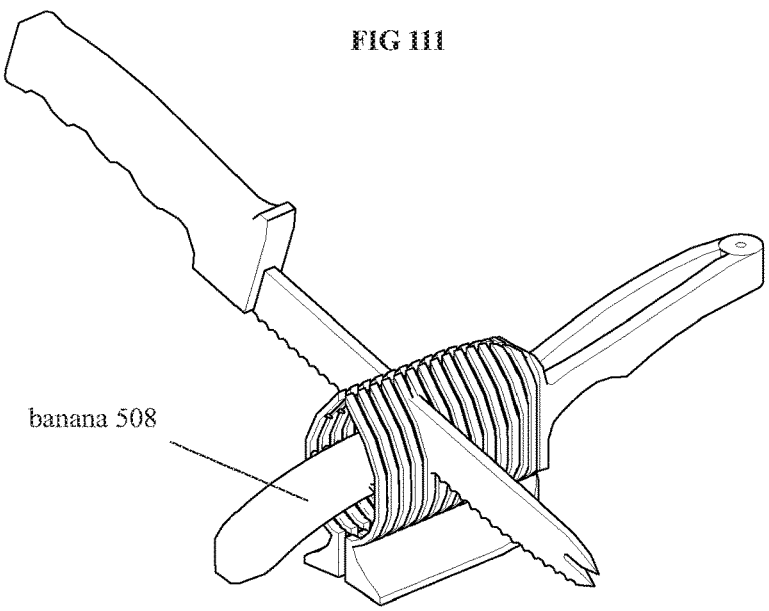
FIG. 112 is a perspective of embodiment 504 in use.

Embodiment 504, FIGS. 110, 111, and 112

FIGS. 110 through 112 show embodiment 504 which is a variant of embodiment 480, and has been modified to handle rounded articles, such as by way of a non-limiting and non-exhaustive example, apple 506, shown in FIG. 111, as well as elongated articles, such as banana 508, shown in FIG. 112.

As non-limiting and non-exhaustive examples, rounded articles may also include such items as: oranges, pears, lemons, strawberries, etc.

Also as non-limiting and non-exhaustive examples, elongated articles may also include such items as: cucumbers, squash, hotdogs, sausage, carrots, celery, etc.

Embodiment 504 differs from embodiment 480 primarily because instead of having ellipsoidal interior 503 formed by upward directed concave fingers 492 found in embodiment 480, embodiment 504 has open at one end elongated interior 510.

Figure 113:
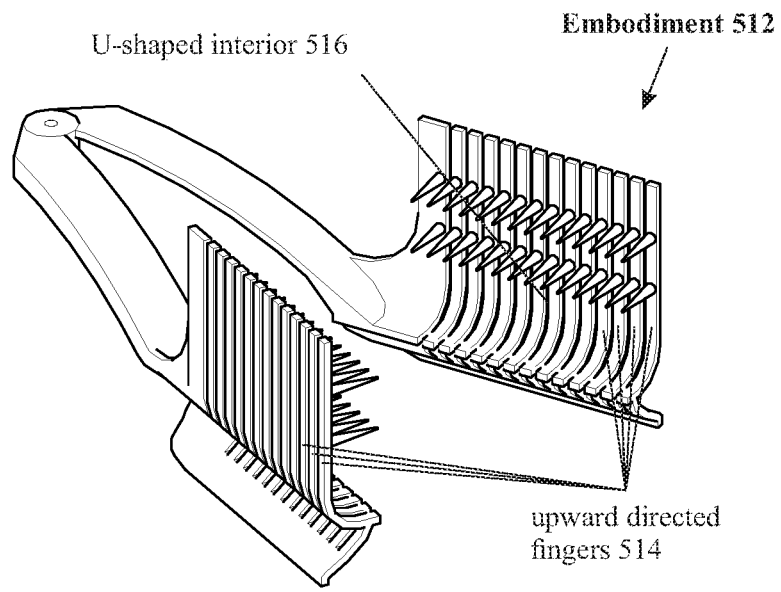
FIG. 113 is a perspective of embodiment 512.
Figure 114:
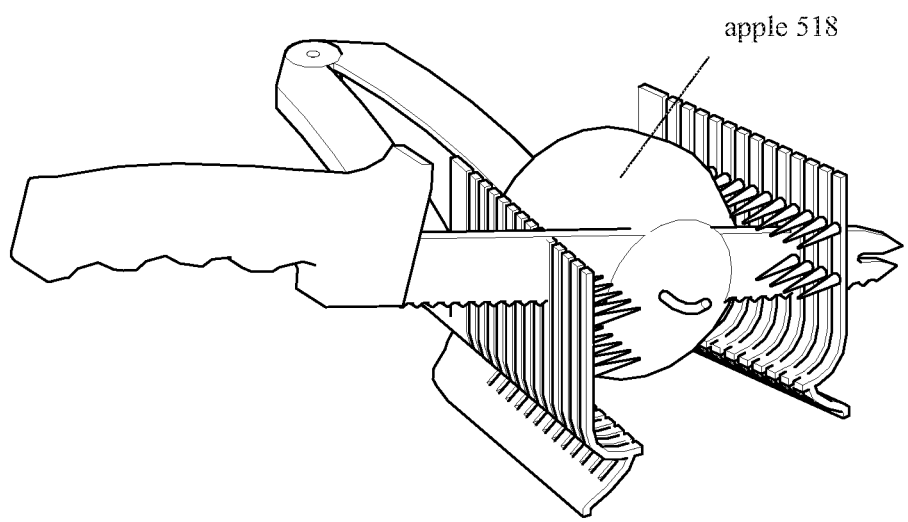

Embodiment 512, FIGS. 113 and 114

FIGS. 113 and 114 show embodiment 512 which is a variant of embodiment 480.

Whereas upward directed concave fingers 492 in embodiment 480 form ellipsoidal interior 503, in embodiment 480; in embodiment 512, analogous upward directed fingers 514 form open at both ends as well as at its top, U-shaped interior 516, which better adapts to holding not just rounded articles, such as apple 518 shown, and/or elongated articles, but also tall or slab shaped articles such as beef steaks, and pork chops.

Figure 115:
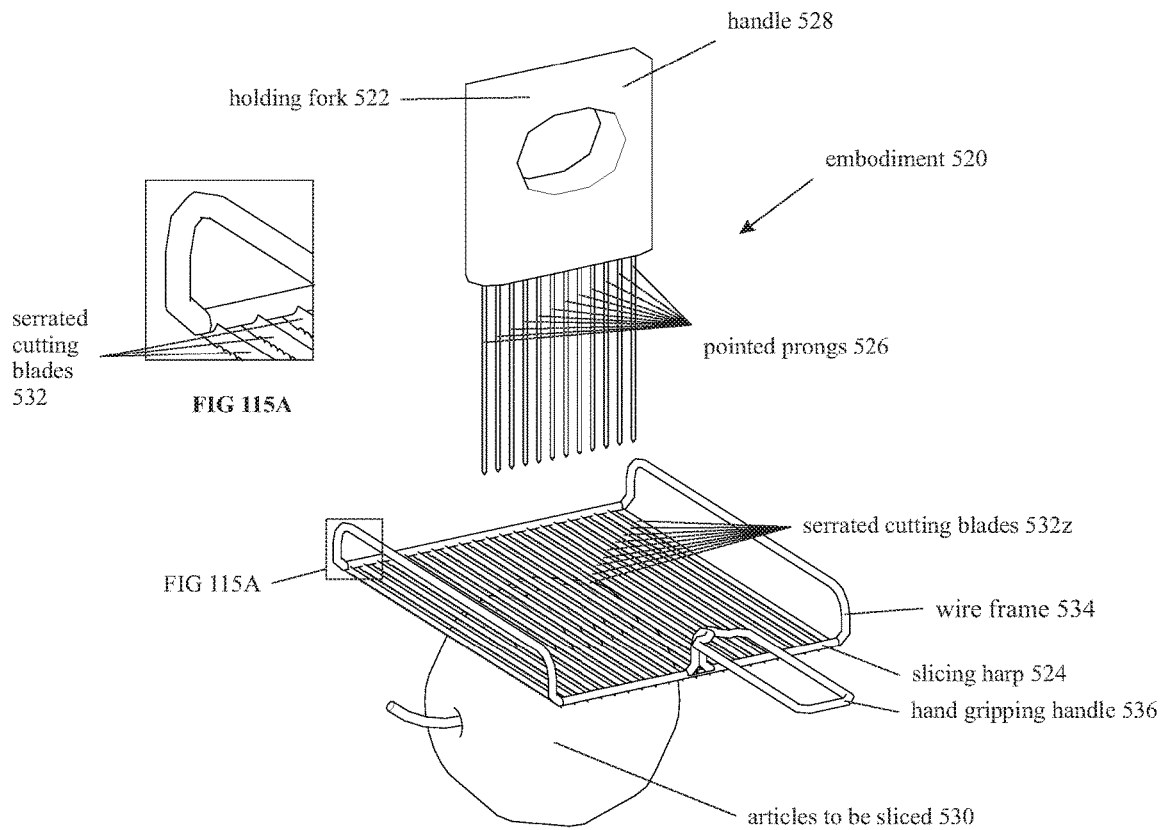
Figure 116:
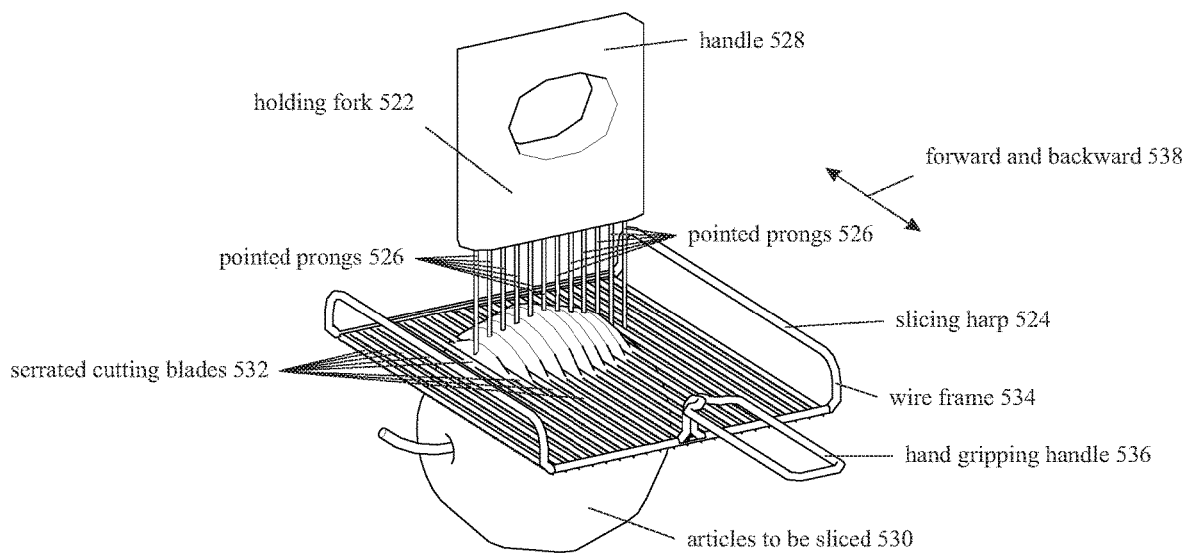

Embodiment 520, FIGS. 115 and 116

FIGS. 115 and 116 show embodiment 520, which is a slicing apparatus.

Embodiment 520 is comprised of holding fork 522, and slicing harp 524.

Holding fork 522 has handle 528 which fixedly mounts pointed prongs 526 which are spaced at regular fixed intervals, and are configured to impale articles to be sliced 530.

Slicing harp 524 has serrated cutting blades 532 which are spaced at the same regular fixed intervals as pointed prongs 526, and are mounted on wire frame 534. Wire frame 534 is configured to include hand gripping handle 536.

In use, slicing harp 524 is placed on top of article to be sliced 530, as shown in FIG. 115. Pointed prongs 526 of holding fork 522 are then inserted into article to be sliced 530 midway between serrated cutting blades 532, and slicing harp 524 is then moved forward and backward 538, causing article to be sliced 530 to be sliced, as shown best in FIG. 116.

After such slicing, individual slices remain together and organized by being pierced and held by pointed prongs 526.

Serving the slices involves only pushing them off of pointed prongs 526.

Embodiment 540, FIGS. 117 and 118

FIGS. 117 and 118 show embodiment 540 which may replace lids shown earlier herein, including, but not necessarily limited to: lid 102, lid 160, lid 302, and embodiment 408.

Embodiment 540 allows maximum airflow out of dehydrator 542. It has an additional advantage of minimizing surfaces on which exiting moist air might undesirably condense and drip on articles which are being dehydrated below.

It has a further advantage of helping to prevent insects and debris from getting inside of dehydrator 542.

Embodiment 540 is comprised of: outer frame 544, which frames and mounts screening 546. Screening 546 is fine enough to prevent objects larger than a 0.1 inch in diameter sphere from passing through it. As non-limiting and non-exhaustive examples, screening 546 might be constructed from plastic or metal window screening, or from other suitable materials.

Screening 546 covers at least 75% of the top surface area of lid 545. Lid 545 includes both frame 544 and screening 546.

In use, embodiment 540 is used by a user in a manner similar to other lids shown herein.

Embodiment 548, FIGS. 119 and 120

Embodiment 548 is similar to embodiment 540, except embodiment 548 uses grille 552 to replace screening 546. This may lower fabrication costs.

Fineness of the grille may prevent objects larger than a 0.2 inch in diameter sphere from entering into dehydrator 542.

Figure 121:
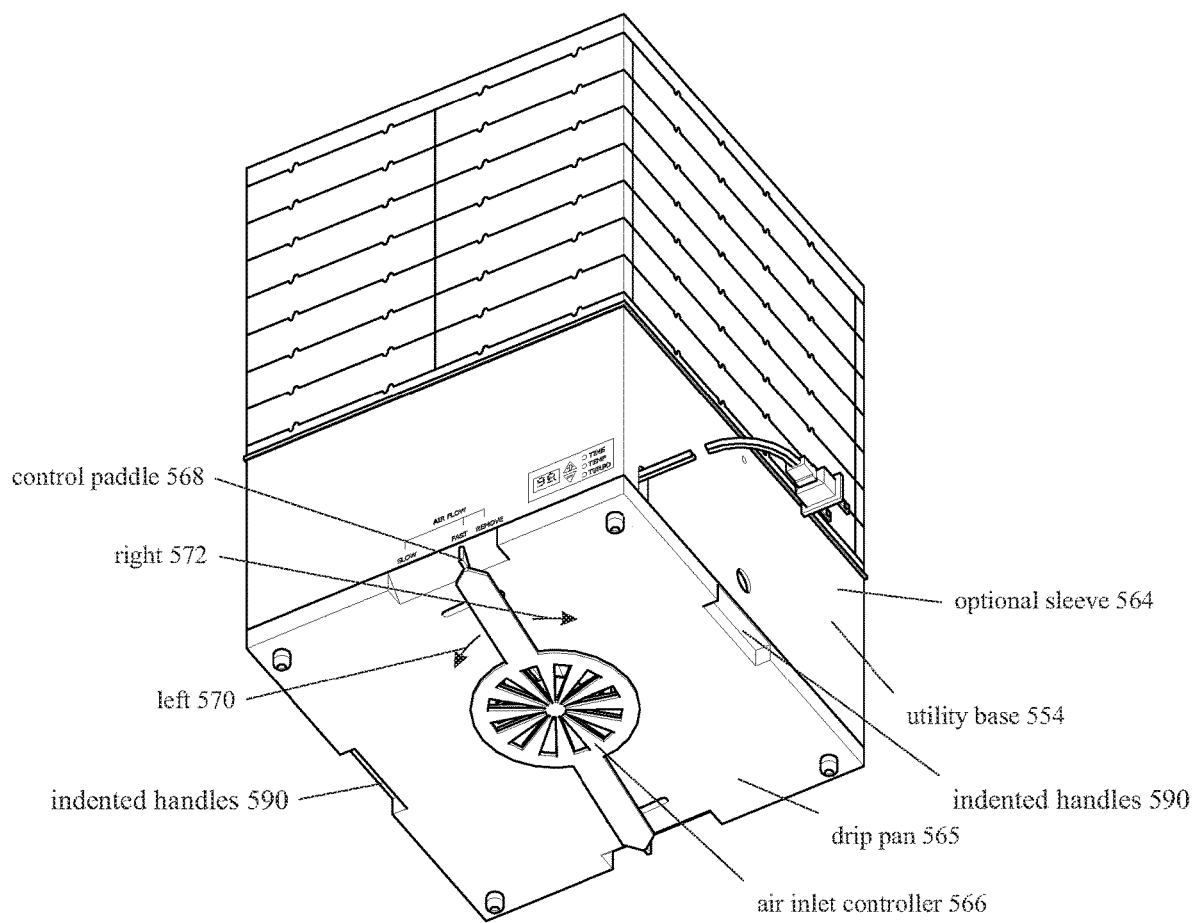
Figure 122:
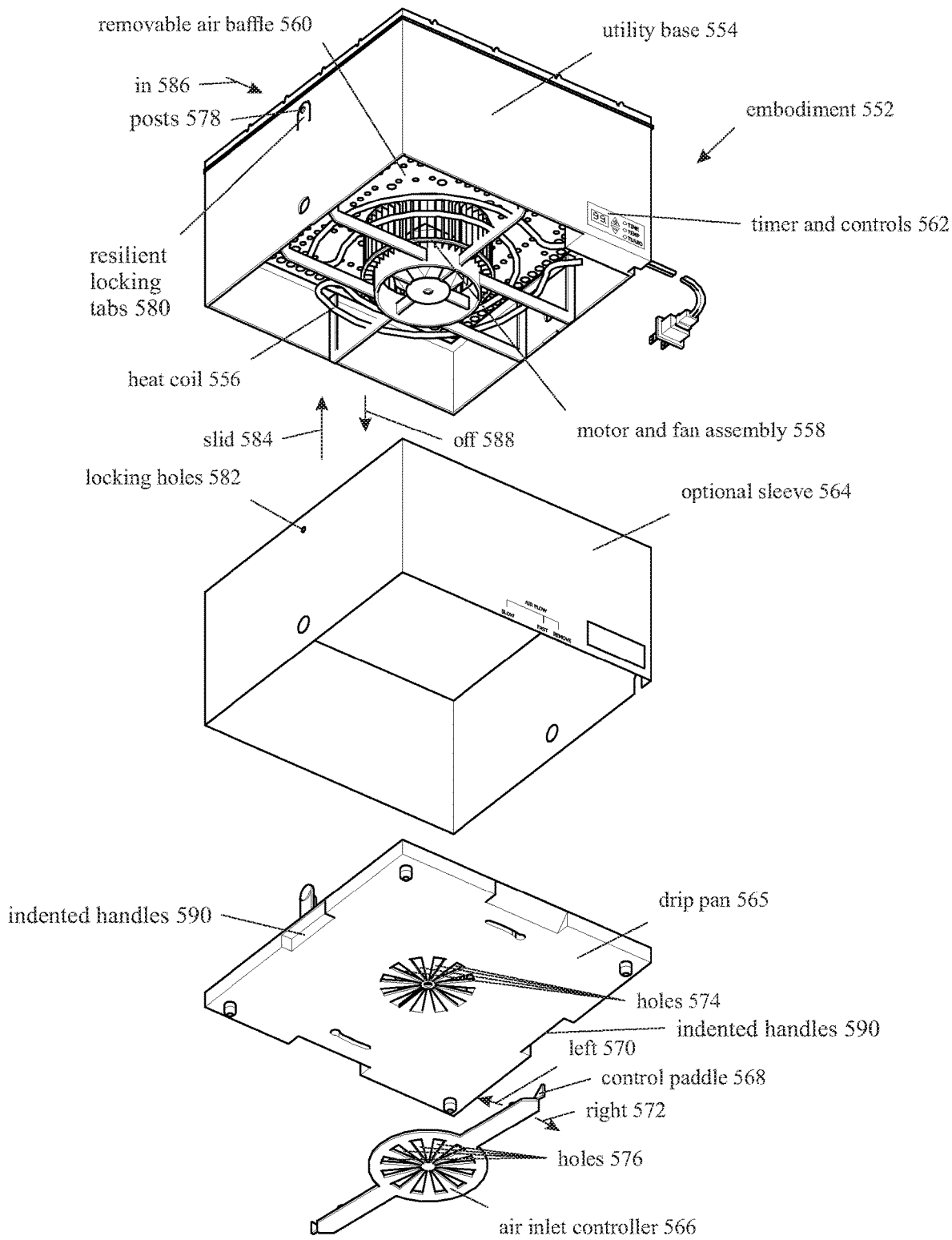
Figure 123:
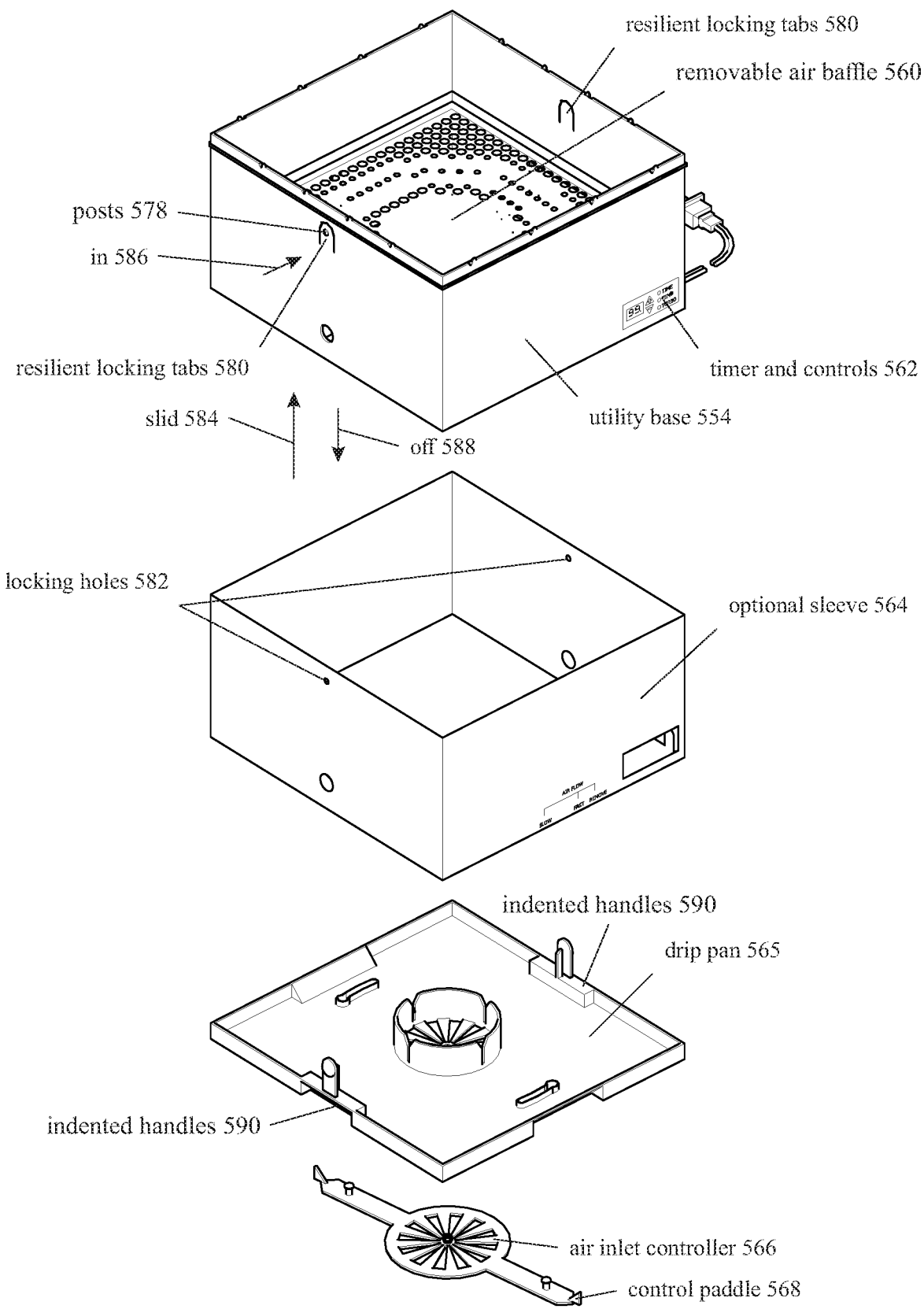
Figure 124:
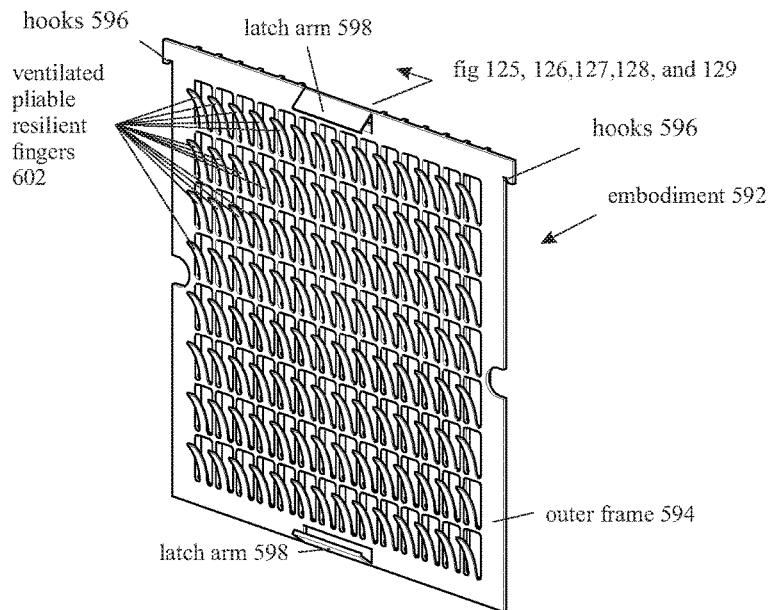

Embodiment 552, FIGS. 121, 122, and 123

FIGS. 121 through 123 show embodiment 552, which comprises: utility base 554, drip pan 565, and air inlet controller 566.

Utility base 554 includes heat coil 556, and may also, but not necessarily, include: motor and fan assembly 558, removable air baffle 560, sleeve 564, and timer and controls 562.

Air inlet controller 566, acts like a rotary damper on a wood stove, and controls the amount of air which is allowed to enter into utility base 154.

Air inlet controller 566 may be used in combination with any of the lids shown herein, including, but not necessarily limited to: lid 102, lid 160, lid 302, embodiment 408, embodiment 540, or any other suitable lid.

As specific non-limiting and non-exhaustive examples, when used with embodiment 540, air inlet controller 566, may solely restrict airflow. Or, air inlet controller 566 may be used in combination with embodiment 408 and in tandem they both will control airflow.

Air inlet controller 566 represents an inexpensive way to control dehydration conditions.

In use, a user pushes control paddle 568 left 570 or right 572 to respectively allow less or more air into utility base 554. Such movements misalign and align respectively holes 574 in drip pan 565, with holes 576 in air inlet controller 566.

Air inlet controller 566 is removable by pushing control paddle 568 to its furthest right 572 position and pulling down on air inlet controller 566, and lifting it away from the bottom of drip pan 565.

Air inlet controller 566 is symmetrical such that rotating it 180° about a central vertical axis, will result in no difference in air inlet controller 566's outer form. By providing fewer opportunities for mistakes, this may make user reinstallation of air controller 566 to drip pan 565 easier.

Sleeve 564 slides onto utility base 554 to at least easily change the outer appearance of embodiment 552. As non-limiting and non-exhaustive examples, it may have several versions with different colors, and/or graphic treatment, etc.

Posts 578 on resilient locking tabs 580 disposed on two sides of utility base 554 are configured to engage locking holes 582 on sleeve 564, when sleeve 564 is slid 584 onto utility base 554, with the combined result being shown in FIG. 121.

Removing sleeve 564 from utility base 554 is done by putting finger pressure on post 578 and pushing in 586 (FIGS. 122 and 123) until post 578 becomes disengaged from locking hole 582, and after such disengagement, pulling sleeve 564 off 588 (FIGS. 122 and 123) of utility base 554.

Indented handles 590, on opposite sides of drip pan 565 at least facilitate lifting and handling of the dehydrator unit, and sub-assemblies and sub components thereof, including during use, storage, or at other times.

Embodiment 592, FIGS. 124 Through 135

FIGS. 124 through 135 show embodiment 592, which is a panel to hold various articles, including, but not limited to, articles to be dehydrated.

Embodiment 592 is comprised of: outer frame 594, which includes hooks 596, latching arms 598, latch catch 600, and ventilated pliable resilient fingers 602.

Outer frame 594 surrounds, intertwines, and supports ventilated pliable resilient ribs 602.

Embodiment 592 has several modes for supporting articles, including, but not limited to, articles to be dehydrated.

As non-limiting and non-exhaustive examples, FIGS. 126, 127, 130 and 131 show how articles 604 (FIG. 130) can be held between first panel 606, and second panel 608 by connecting top and bottom latch arms 598 to top and bottom latch catches 600 respectively, as shown particularly in FIG. 126, while articles 604 are between first panel 606 and second panel 608, as shown in FIGS. 126, 127, 130 and 131.

Top latch arm 598 is mirror imaged by bottom latch arm 598, and bottom latch catch 600 is a mirror image of top latch catch 600.

Ventilated pliable resilient fingers 602, on second panel 608, in this face-to-back panel disposition (FIGS. 126, 129, 130, and 131), are biased to press against articles 604, and thus help hold articles 604 in place against the back of outer frame 594 of first panel 606.

FIG. 132 shows another mode in which embodiment 592 can support articles, including, but not limited to, articles to be dehydrated 610. Here articles 610 are placed between the back of ventilated pliable resilient fingers 602, and the front of outer frame 594.

FIG. 133 shows how hooks 596 on the upper corners of outer frames 594, engaging notched hanging rails 612 on vertical shelf support 614, allow outer frames 594 to be vertically suspended, including in both of the article handling modes described directly above.

FIG. 134 shows how embodiment 592 can hold articles, including, but not necessarily limited to, articles to be dehydrated 616, horizontally on the tips of pliable resilient fingers 602. This may increase free air flow around articles 616, and thus may at least promote more efficient dehydrating.

FIG. 135 shows how embodiment 592 can hold articles, including, but not limited to articles to be dehydrated 618, behind pliable resilient fingers 602. Because articles to be dehydrated 618 may be disposed diagonally, as shown in FIG. 135, articles may overlap, and thus provide more efficient usage of panel surface area.

FIGS. 128 and 125 show how embodiments 592 can be compactly stacked back-to-front by interleaving into one another. This may be done for storage (at least FIGS. 3, 4, 11, 34, etc.) or for other purposes.

Embodiment 592 may be fabricated in many different ways, using a variety of materials. As non-limiting and non-exhaustive examples: it may be stamped from materials, including, but not limited to stainless steel, plated steel, aluminum, or other suitable materials; or it may be injection or compression molded using materials such as plastics, including but not limited to, polypropylene, ABS, polycarbonate, or other suitable materials; or it may be fabricated using other suitable processes and materials.

What have been described herein are various embodiments of present inventions. Many variations of these embodiments will be obvious to one knowledgeable in the art. As such, all such legally equivalent variations are hereby incorporated as part of the claimable teachings herein.

The invention claimed is:

1. A device comprising:
a base portion including an input configured to receive warm air;
a plurality of generally flat, perforated, trays, each tray, configured to receive warm air from the input;
a plurality of generally vertical side walls, each wall circumnavigating and supporting an associated perforated horizontal tray when the trays are installed horizontally;
each perforated tray configured to be removable from its associated circumnavigating generally vertical side wall;
each tray configured to be vertically supported by the base portion when the trays are installed vertically;
each generally vertical side wall being articulable to transition between an open position circumnavigating and supporting the perforated tray and a closed position removed from the generally flat perforated tray wherein the generally vertical side wall has a smaller total length-plus-width-plus-depth relative to the open position;
a rectangular rigid base portion and an associated, rectangular drip tray disposed at a lower portion thereof and four vertical base walls disposed perpendicularly to the drip tray, the base portion configured to support a vertically aligned stack of the vertical side walls when in the open position; and
the rectangular rigid base portion further configured to store each of the vertical side walls in an interior thereof when the vertical side walls are in the closed position.

2. The device of claim 1 wherein each individual shelf assembly is configured to stack above another individual shelf assembly when the trays are installed horizontally.

3. The device of claim 1, further including a lid configured to couple to, and to span across, an upper opening of the generally vertical side wall when the generally vertical side wall is in its open position, and the lid having an adjustable air egress portal which is covered to restrict water passage there through.

4. The device of claim 1, further including a lid configured to couple to and span across the upper rim of the generally vertical side wall when the generally vertical side wall is in its open position, and the lid having an adjustable air egress portal including openings which prevent objects larger than 0.1 inch diameter from entering the air egress opening.

5. The device of claim 1, further including a countdown timer configured to impede input of warm air at the end of a user designated interval.

6. The device of claim 1 further comprising
the input having an air inlet, including a static opening, which is variably blocked by a manually adjusted dynamic cover.

7. The device of claim 6, further including the manually adjusted dynamic cover being configured to rotate in order to variably block the static opening.

8. The device of claim 7 further comprising an adjustable vent cover configured to nest on a top of an uppermost vertical side wall when the vertical side walls are in a stacked configuration.

9. The device of claim 8 wherein the rectangular rigid base portion is further configured to store each of the trays in an interior thereof concurrently with the vertical side walls are in a closed position.

10. The device of claim 9 wherein the adjustable vent cover is further configured to cover an upper opening of the rectangular rigid base portion when the trays and vertical side walls are stored therein.

11. The device of claim 1 wherein each individual shelf assembly is configured to stack adjacent to another individual shelf assembly when the trays are installed vertically.

12. The device of claim 11 wherein each shelf assembly includes a plurality of projections configured to secure food when the trays are installed vertically.

* * * * *